US010728717B2

(12) United States Patent
Chiussi et al.

(10) Patent No.: US 10,728,717 B2
(45) Date of Patent: Jul. 28, 2020

(54) APPLICATION MANAGEMENT APPLICATION

(71) Applicant: GADGET SOFTWARE, INC., Newark, NJ (US)

(72) Inventors: Fabio M. Chiussi, Long Branch, NJ (US); Parameshwar Hegde, Westford, MA (US)

(73) Assignee: GADGET SOFTWARE, INC., Newark, NJ (US)

( * ) Notice: Subject to any disclaimer, the term of this patent is extended or adjusted under 35 U.S.C. 154(b) by 0 days.

(21) Appl. No.: 16/032,519

(22) Filed: Jul. 11, 2018

(65) Prior Publication Data
US 2018/0324561 A1 Nov. 8, 2018

Related U.S. Application Data

(63) Continuation of application No. 14/256,359, filed on Apr. 18, 2014, now Pat. No. 10,051,444.

(51) Int. Cl.
*G06F 15/16* (2006.01)
*H04W 4/12* (2009.01)
(Continued)

(52) U.S. Cl.
CPC .............. *H04W 4/12* (2013.01); *G06F 8/656* (2018.02); *H04W 4/60* (2018.02); *G06F 8/35* (2013.01); *G06F 8/36* (2013.01); *G06F 8/71* (2013.01)

(58) Field of Classification Search
CPC ...... H04L 67/34; H04L 41/34; H04W 4/0003; H04W 4/001
See application file for complete search history.

(56) References Cited

U.S. PATENT DOCUMENTS 8,392,453 B2 * 3/2013 Baluja ................. G06F 17/2735
707/771
10,051,444 B2 * 8/2018 Chiussi ................... H04W 4/12
(Continued)

OTHER PUBLICATIONS

International Search Report dated Jul. 20, 2015 for corresponding PCT Application PCT/US2015/026323.
(Continued)

*Primary Examiner* — Yves Dalencourt
(74) *Attorney, Agent, or Firm* — Miles & Stockbridge P.C.

(57) ABSTRACT

A System Solution automatically generates a set of Native and Non-Native Application Clients which include updating functionality capable of generating update commands to instruct the System Solution to generate an updated set of Native and Non-Native Application Clients. Using the generated Application Clients, an employee of a Business Entity coupled with the System Solution instructs the System Solution to create a new updated set of Native and Non-Native Application Clients that are automatically downloaded to devices used by the customers of the Business Entity. The System Solution also automatically generates an Update Command Dictionary which, when downloaded to a Manager Client Device, allows an employee of the Business Entity to use a General Third Party Application, such as a SMS, email, or messaging application commonly available on a mobile device, to generate update commands to instruct the System Solution to generate an updated set of Native and Non-Native Application Clients.

20 Claims, 26 Drawing Sheets

(51) Int. Cl.
*G06F 8/656* (2018.01)
*H04W 4/60* (2018.01)
*G06F 8/35* (2018.01)
*G06F 8/36* (2018.01)
*G06F 8/71* (2018.01)

(56) References Cited

U.S. PATENT DOCUMENTS

| | | |
|---|---|---|
| 2004/0024878 A1 | 2/2004 | Makimoto et al. |
| 2008/0147788 A1 | 6/2008 | Omoigui |
| 2008/0167128 A1 | 7/2008 | Roshak et al. |
| 2009/0252102 A1 | 10/2009 | Seidel et al. |
| 2011/0004945 A1 | 1/2011 | Kurokawa |
| 2011/0078532 A1 | 3/2011 | Vonog et al. |
| 2013/0174137 A1 | 7/2013 | Kim |
| 2014/0095547 A1 | 4/2014 | Guo et al. |
| 2014/0245162 A1 | 8/2014 | Deibler et al. |
| 2015/0154067 A1* | 6/2015 | Rho .................. G06F 11/1008 714/773 |
| 2015/0254067 A1 | 9/2015 | Nigam |

OTHER PUBLICATIONS

Written Opinion of the International Searching Authority dated Jul. 20, 2015 for corresponding PCT Application PCT/US2015/026323. Any information that are not included with this Information Disclosure Statement can be found in U.S. Appl. No. 14/256,359.

* cited by examiner

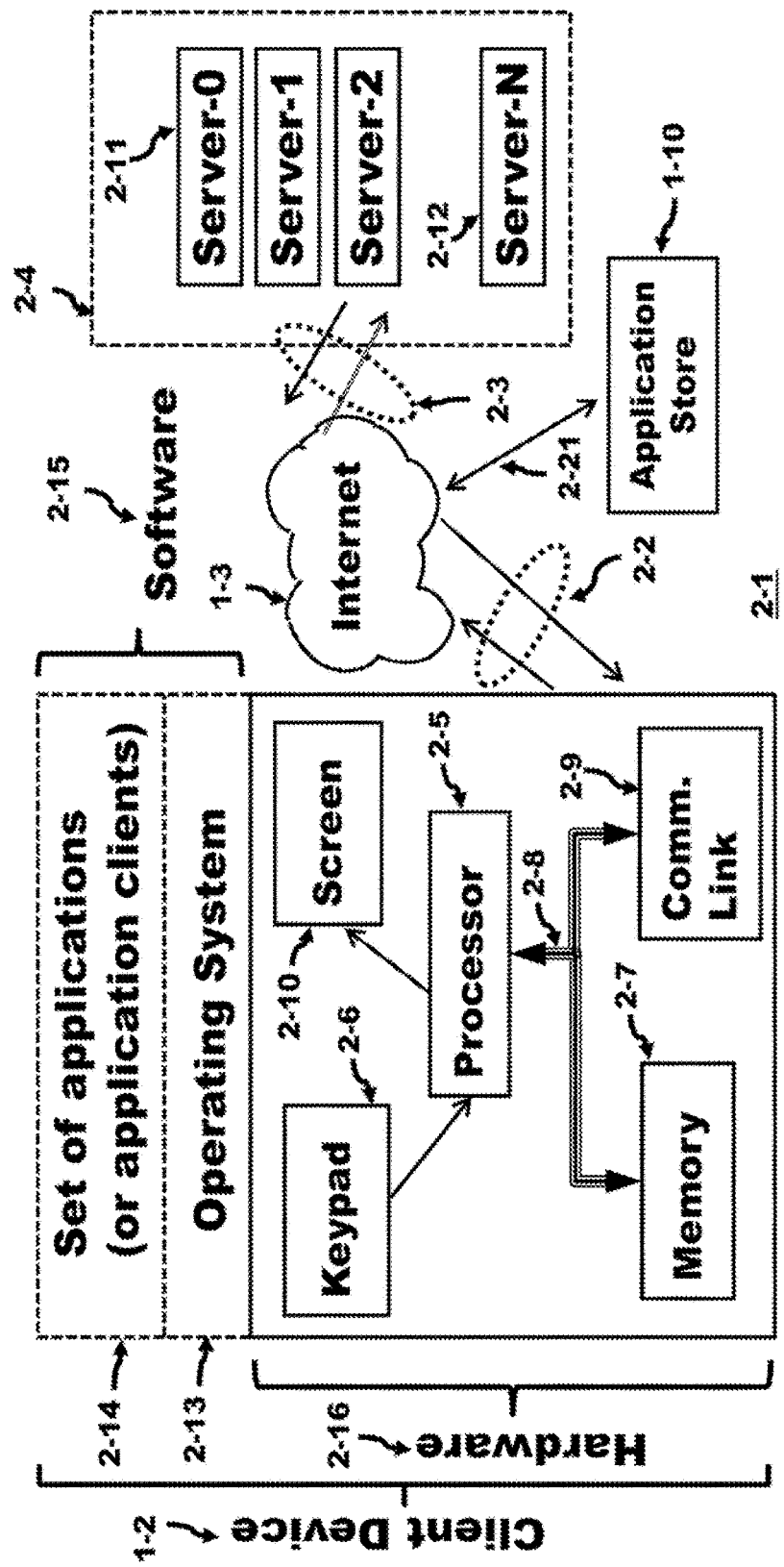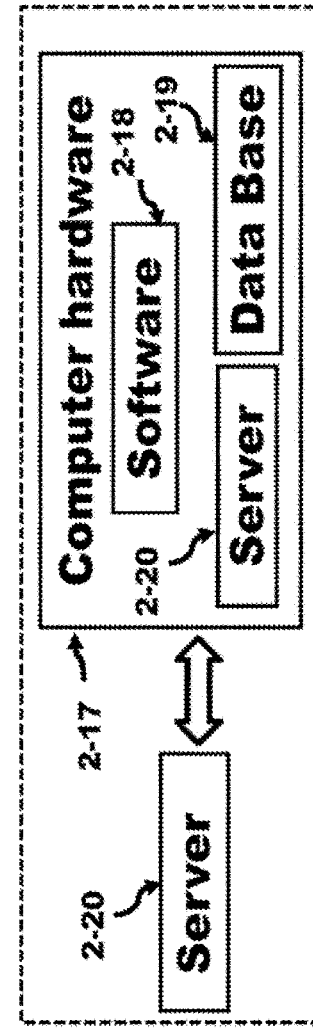
FIG. 2A (prior art)
FIG. 2B (prior art)

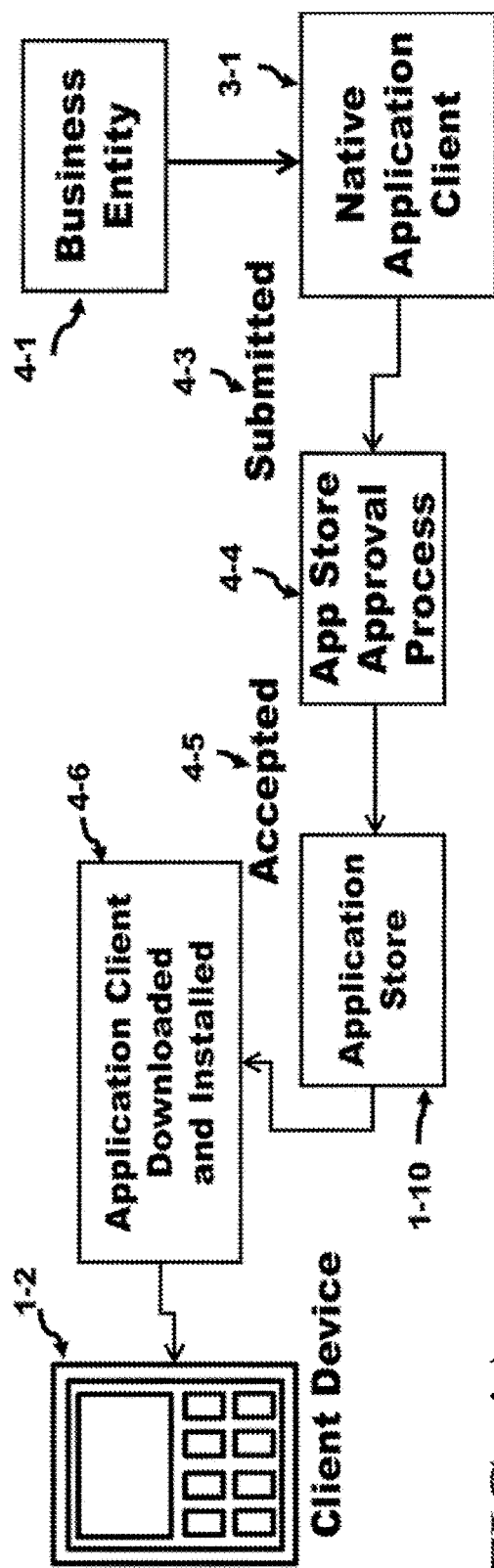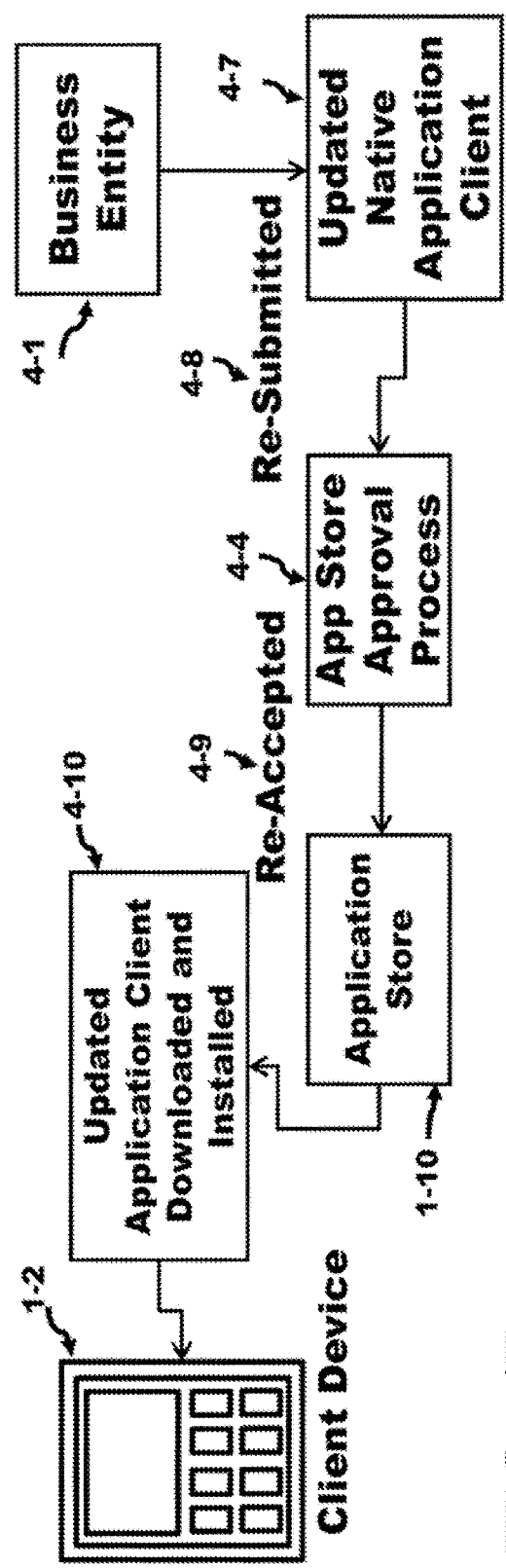
FIG. 4A (prior art)
FIG. 4B (prior art)

APPLICATION MANAGEMENT APPLICATION

CROSS-REFERENCE TO RELATED APPLICATIONS

This application is a continuation of U.S. patent application Ser. No. 14/256,359, filed on Apr. 18, 2014, which issued as U.S. Pat. No. 10,051,444 on Aug. 14, 2018, the contents of which are herein incorporated by reference in its entirety.

The U.S. application Ser. No. 13/833,589 entitled "Apparatus for Single Workflow for Multi-Platform Mobile Application Creation and Delivery", Ser. No. 13/833,669 entitled "Method for Single Workflow for Multi-Platform Mobile Application Creation and Delivery", and Ser. No. 13/833,775 entitled "Dynamic User Interface Delivery System", all filed on Mar. 15, 2013, which are assigned to the same assignee as the present application and invented by the same inventors as the present application are incorporated herein by reference in its entirety.

BACKGROUND OF THE INVENTION

The internet is a communication system that interconnects the world. The internet has been structured to provide connectivity to billions of users with laptops, notebooks, desktops, Internet Enabled TV sets, cellular phones, smartphones like the IPHONE™ ANDROID™ and BLACKBERRY™, wearable devices, and tablets. The internet 1-3 connects a Client Device 1-2 to a server 1-4 and the server to the same Client Device as illustrated in 1-1 of FIG. 1A or to another Client Device (not illustrated). The Client Device 1-2 can have at least one display screen 1-8 that can be a touch sensitive screen, pen based or both. The screen can display various icons or be attached to a physical keypad 1-9. As illustrated in 1-1, the Client Devices are physical and can be either mobile, such as cellular phones, smartphones, wearable devices, and tablets, or non-mobile, such as laptops, desktops, and TV sets, The Client Devices 1-2 are coupled to the internet by wired (a physical interconnect), wirelessly (waves through space), or both wired/wireless networks. The wireless connectivity can be cellular (3G, 4G, etc.), Wi-Fi, Bluetooth, WiMax, etc. The Client Device 1-2 runs the Application Client which is the actual application software running on device.

FIG. 1A also shows an Application Store 1-10 connected to the Internet. The Application Store 1-10 makes application clients available for download to the Client Devices. There is a plurality of Application Stores, each of the Application Stores dedicated to make available for download Application Clients for a certain type of Client Device or Client Device Operating System. For example, the APPLE™ Application Store makes Application Clients for the IPHONE™ and IPAD™ available for download, the ANDROID™ Application Store makes Application Clients for smartphones and tablets running the ANDROID™ Operating System available for download, etc. There are Application Stores dedicated to support mobile Client Devices (for example, the IPHONE™/IPAD™ APPLE™ Application Store, the BLACKBERRY™ Application Store, etc.), and Application Stores dedicated to support non-mobile Client Devices (for example, the MAC™ APPLE™ Application Store, which makes applications for APPLE™ computers running the MAC™ Operating System available for download).

The Cloud uses the network of the internet to offer services to users by using a combination of hardware and software embedded in the network. For example, ADOBE™ and MICROSOFT™ offer the ability of using their software programs via the Cloud, while other companies offer storage capabilities via the Cloud to their customers. An Application Client can be in the Cloud, but in this case the Client Device is a "virtual" Client Device. The "virtual" Client Device has a way to provide access to the Application Client running in the cloud via a physical Client Device. For example, as in the example listed in 1-5 of FIG. 1B, a web browser 1-6 running on the physical Client Device 1-2 and coupled to the client/server 1-7 in the Cloud via the Internet accesses the Application Client running in the Cloud, which performs the actual application software. For the Cloud, there are two cases: the entire Application Client runs in the Cloud, or a small portion of the Application Client runs on a physical Client Device while most of the logic runs in the Cloud.

FIG. 2A illustrates a system 2-1 with the hardware 2-16 and software 2-15 of a Client Device 1-2. The Client Device 1-2 is coupled to the Internet 1-3 via wireline connection or Radio Frequency (RF) wireless transmission network (wired/wireless) 2-2 and further coupled to a bank of servers 2-4 via a second interconnection 2-3 that can be wired or wireless. The communication link is a receiver and a transmitter known as a transceiver and is coupled to either a wired connector or an antenna (not illustrated) for the wireline connection or RF wireless transmission network, respectively. In general, these links: wired, wireless, cellular, internet, etc. are called the Communication network. The Communication network couples all components together. The server's bank 2-4 comprises server-0 2-11 to server-N 2-12. The bank contains at least one server and these servers can be localized, coupled by an Intranet, or be physically separated from one another, coupled by the Internet. The Operating System (OS) 2-13 running in the Client Device is closely coupled with the hardware 2-16, especially in case of Mobile Client Devices 1-2. The hardware 2-16 comprises at least one processor 2-5 operating under the Operating System 2-13. The processor 2-5 is coupled to at least one memory 2-7 and at least one communication link 2-9 via at least one bus 2-8. At least one communication link 2-9 couples the Client Device to the outside world through a wired and/or wireless interconnection via the transceiver. The Client Device offers the user at least one mode of input and one mode of output. One mode of input to the Client Device 1-2 is via the touch based keypad 2-6 or through voice control (not illustrated). The screen 2-10 can be a touch sensitive screen and provide a second mode of input. The screen 2-10 can provide an output response or sound can provide a second mode of output known as voice output (not illustrated). Other hardware components such as MEMS, power supplies, etc. are not mentioned but are well-known by those skilled in the art. A set of applications or Application Clients 2-14 run on the Client Device are coupled to the Operating System 2-13. The Client Device is one of a plurality of Client Devices coupled to the Internet 1-3. An Application Store 1-10 is connected 2-21 to the Internet.

FIG. 2B illustrates that when the term server 2-20 is used, this server is a sub-set representation of a Computer hardware 2-17, which can contain software 2-18, a database 2-19 and the server 2-20 itself. Other components not illustrated are the memory, power supply, etc. One skilled in the art is knowledgeable of other components contained in this device and will not be described further. All servers used in this specification are substantially the same as the server 2-20.

Furthermore, a plurality of servers and a plurality of databases can be embedded in the Computer hardware 2-17.

The term "Client Device" encompasses the device being Mobile, Non-Mobile, or located in the Cloud. However, in some cases, for further distinction within this document the term "Mobile Client Device" will be used for mobile devices, "Non-Mobile Client Device" will be used for non-mobile devices and "Cloud Client Device" will be used for the device formed in the Cloud.

FIG. 3A and FIG. 3B present two different types of Application Clients. This distinction is especially relevant in the case of mobile Client Devices, but is also applicable to non-mobile Client Devices. FIG. 3A shows a Native Application Client 3-1 and how it relates to the layered stacks of the hardware/software representation of a Client Device 1-2. The Native Application Client 3-1 is an executable which runs directly on the Operating System 2-13 of the Client Device 1-2, which in turn runs on the hardware 2-16 of the Client Device 1-2. The Operating System 2-13 provides a set of system libraries 3-5, which the Native Application Client uses 3-2. The Native Application Client 3-1 is compiled to run on the Operating System of the Client Device. The Native Application Client needs to be downloaded to the Client Device and installed on the Client Device in order to run on the Client Device.

FIG. 3B shows a Non-Native Application Client 3-1h and how it relates to the layered stacks of the hardware/software representation of a Client Device 1-2a. The Non-Native Application Client 3-1h does not run directly on the Operating System 2-13h of the Client Device, but instead uses a web browser 3-3 installed on the Client Device in order to run. The Non-Native Application Client 3-1h is written in a programming language that is understood by the web browser running on the Client Device. The most common example of such a language is HTML5. The web browser running on the Client Device contains a HTML5 parser 3-4 that is used to interpret the code of the Non-Native Application Client 3-1h. The Non-Native Application Client 3-1h does not depend on the Client Device 1-2a since it does not run directly on the Operating System 2-13h but instead uses the web browser 3-3 running on the Client Device 1-2a. The Non-Native Application Client 3-1h can run on any Client Device 1-2a that runs a web browser 3-3 capable of understanding the language which the Non-Native Application Client is written in. The web browser 3-3 may depend on the Client Device 1-2a, but the Non-Native Application client does not depend on the Client Device. The Operating System 2-13h runs on the hardware 2-16h.

An approval and download process in the Application Store is illustrated in FIG. 4A. A Business Entity 4-1 creates a new application which comprises a new Native Application Client 3-1. The new Native Application Client 3-1 is submitted 4-3 to the Application Store 1-10 for an approval process 4-4. Once the new Native Application Client is accepted 4-5, information is passed to the Application Store 1-10 to make the new Native Application Client available for download and installation 4-6 into a Client Device 1-2. A Client Device 1-2 which desires the Native Application Client 3-1 downloads the Native Application Client from the corresponding Application Store 1-10. For example, an IPHONE™ downloads its desired Native Application Client from the APPLE™ Application Store, an ANDROID™ device downloads its desired Native Application Client from the ANDROID™ Application Store, etc. Once the Native Application Client is downloaded to the Client Device, it is installed on the Client Device so it can run on the Operating System of the Client Device. The client now contains a "native" application coupled to the Operating System 2-13 (see FIG. 2A and FIG. 3A) of the Client Device. The Native Mobile Application Client executable depends on the Operating System (OS) as an iPhone would require a different executable than an ANDROID™ phone.

If the Business Entity 4-1 makes a change to the Native Application Client 3-1 as illustrated in FIG. 4B, the Updated Native Application Client 4-7 must be re-submitted 4-8 to the Application Store approval process 4-4 and re-accepted 4-9 in order for the updated Native Application Client to be made available in the Application Store 1-10 for download and installation 4-10. A Client Device 1-2 which desires the updated Native Application Client 4-7 must download 4-10 the updated Native Application Client again from the Application Store 1-10 and re-install the Native Application Client on the Client Device 1-2. The process of updating an existing Native Application Client takes considerable time and effort. The Business Entity 4-1 must re-submit the Native Application Client to the Application Store, which requires considerable time and effort since the submission procedure is typically laborious and time-consuming. The Application Store must expend funds to re-approve the new executable and the approval process may take considerable time. Once accepted, the store must distribute the new Native Application Client to the Client Device. A Client Device 1-2 which desires the updated Native Application Client must go back to the Application Store 1-10 and download the updated version of the Native Application Client and re-install it on the Client Device 1-2. The existing Native Application Client 3-1, if running on the Client Device 1-2, must be stopped and deleted from the memory of the Client Device 1-2 in order for the updated Native Application Client 4-10 to be installed on the Client Device 1-2. An existing Native Application Client 3-1 cannot be updated while it is running on the Client Device 1-2. An existing Native Application Client 3-1 cannot manage the update process, but must rely on an update manager or an external installation manager software or update manager software running on the Operating System of the Client Device to delete the existing Native Application Client, download and re-install the updated Native Application Client 4-7, and complete the update process.

BRIEF SUMMARY OF THE INVENTION

It is a first objective of one of the embodiments of the invention to provide a System Solution to generate a set of Native and Non-Native Application Clients that offers the Business Entity means to instruct the System Solution to generate an updated set of Native and Non-Native Application Clients which are directly downloaded, without resubmitting the new version of the Application Client to the Application Store, to mobile and non-mobile devices used by the customers of the business entity. Using these inventive ideas, employees of the Business Entity are able to update the Native and Non Native Application Clients used by the customers of the Business Entity directly from their mobile devices, using an employee version of the Application Clients that need to be updated.

It is a second objective of one of the embodiments of the invention to provide a System Solution to generate an Update Command Dictionary that, when downloaded to mobile devices of employees of the Business Entity, offers the Business Entity means to instruct the System Solution to generate an updated set of Native and Non-Native Application Clients which are directly downloaded, without resubmitting the new version of the Application Client to the Application Store, to mobile and non-mobile devices used by the customers of the business entity. Using these inventive ideas, employees of the Business Entity are able to update the Native and Non Native Application Clients used by the customers of the Business Entity directly from their mobile devices, using General Third Party Applications commonly available in any smartphone or mobile device, such as an SMS application, an email application, or a messaging application.

In accordance with one preferred embodiment of the invention, a Business Entity such as a retailer, a manufacturer, a school, a museum, a franchise, or an individual desires an application capable of running on a Mobile or Non Mobile Devices and that the Mobile Application Client be at least one of a Native Mobile Application Client and a Non-Native Mobile Application Client. As a further distinction, the Business Entity desires that the Native and Non Native Application Clients have the capability, when used by employees of the Business Entity, of instructing a System Solution to generate an updated set of Native and Non Native Application Clients. In this way, employees of the Business Entity can change the Native and Non Native Application Clients that are downloaded to the customers or users of the Business Entity directly from their smartphones or mobile devices and in a very efficient "what you see is what you get" manner.

In accordance with this preferred embodiment of the invention, a method and apparatus comprising a System Solution with at least one first server coupled to at least one computing device, a Message Processing Server to process messaging input generated by Manager Client Devices, a Data Model, and an Automatic Application Generator automatically generates an Application consisting of several Application Components including Updating Applications for the Application Clients. A Business Entity defines a Service Representation and Business Entity Data and an Automatic Data Model Generator automatically generates a Data Model used by an Automatic Application Generator to automatically generate all the Application Components. The generated Application Components include an Application Server, a set of Native Mobile Application Clients, a set of Native Non-Mobile Application Clients, a set of Non-Native Application Clients, Client Server Protocols, Dashboards, and Other Application Components. The Native and Non Native Mobile and Non Mobile Application Clients created include functionality to instruct the System Solution to update the Native and Non Native Mobile and Non Mobile Application Clients. The term Updating Application is used to refer to the Native and Non Native Mobile and Non Mobile Application Clients that include the functionality to update the Native and Non Native Mobile and Non Mobile Application Clients The generated Dashboards and the set of Native and Non Native Mobile and Non Mobile Application Clients can be used to modify the generated Native and Non Native Mobile and Non Mobile Application Clients.

Another preferred embodiment of the invention is a method and an apparatus comprising a Manager Client Device running a Native or Non Native Mobile Updating Application and coupled to a System Solution via a communication mechanism. Using the Native or Non Native Mobile Updating Application, the manager who is part of the Business Entity generates Update Commands to instruct the System Solution to generate Updated Native and Non-Native Application Clients running on Client Devices of the customer of users of the Business Entity which are coupled to the System Solution via a communication mechanism.

In accordance with another preferred embodiment of the invention, the Native and Non Native Mobile Clients generated by the System Solution contain System Solution Generated Mobile Client Functionality. The Updating Application is a separate Application Client which comprises the same System Solution Generated Mobile Client Functionality contained in the System Solution Generated Mobile Client and additional Updating Functionality capable of generating update commands to update the System Solution Generated Mobile Clients.

In accordance with another preferred embodiment of the invention, there is a single Application Client which can operate both as the System Solution Generated Mobile Client and the Updating Application. In other words, the System Solution Generated Mobile Client and the Updating Application are both contained in a single Application Client. The Single Structure contains both the System Solution Generated Mobile Client Functionality and the Updating Functionality. A Security Mechanism exposes the Updating Functionality to the Managers and employees of the Business Entity.

In accordance with this preferred embodiment of the invention, the Security Mechanism comprises a username and password. Only the managers with knowledge of the correct username and password can access the Updating Functionality. Note that in this configuration, the single Application Client created by the System Solution is an Application Client capable of creating and updating itself.

In accordance with another embodiment of the invention, the Updating Applications generate Messaging Input that contains Update Commands. The Messaging Input is processed by the System Solution and used to generate the Dynamically Updated Data Model, which in turn is used to generate the updated Native and Non Native Application Clients that are directly downloaded to the devices used by the customers or users of the Business Entity.

In accordance with another preferred embodiment of the invention a Business Entity desires that the Native and Non Native Application Clients generated by a System Solution and downloaded to the mobile devices used by the customers or users of the Business Entity can be modified by employees of the Business Entity by using General Third Party Applications commonly found on smartphones and mobile devices, such as a SMS application, an email application, or a messaging application.

In accordance with this preferred embodiment of the invention, a method and apparatus comprising a System Solution with at least one first server coupled to at least one computing device, a Message Processing Server to process messaging input generated by Manager Client Devices, a Data Model, and an Automatic Application Generator automatically generates an Application consisting of several Application Components including an Update Command Dictionary. A Business Entity defines a Service Representation and Business Entity Data and an Automatic Data Model Generator automatically generates a Data Model used by an Automatic Application Generator to automatically generate all the Application Components. The generated Application Components include an Application Server, a set of Native Mobile Application Clients, a set of Native Non-Mobile Application Clients, a set of Non-Native Application Clients, Client Server Protocols, Dashboards, and Other Application Components. The created Update Command Dictionary, once downloaded to a Manager Client Device, allows an employee of the Business Entity to use a General Third Party Application such as a SMS application, an email application, or a messaging application to instruct the System Solution to update the Native and Non Native Mobile and Non Mobile Application Clients directly downloaded to the devices of the customers or users of the Business Entity. The generated Dashboards and the generated Update Command Dictionary in conjunction with a General Third Party Application can be used to modify the generated Native and Non Native Mobile and Non Mobile Application Clients.

Another preferred embodiment of the invention is a method and an apparatus comprising a System Solution in which the Update Command Dictionary is generated and updated using the generated Dashboards under the control of the System Solution.

In another preferred embodiment of the invention, a General Third Party Application is used by an employee of a Business Entity in conjunction with a Downloaded Update Command Dictionary running on a Manager Client Device. The General Third Party Application generates General Application Messaging Input that contains Update Commands. The General Application Messaging Input is processed by the System Solution and used to generate a Dynamically Updated Data Model. The System Solution processes the General Application Messaging Input using a Decoder and an Update Command Dictionary corresponding to the specific messaging input received. Once the General Application Messaging Input is decoded and the Update Command is processed by the System Solution, the System Solution generates the Dynamically Updated Data Model to execute the desired Update Command.

In another preferred embodiment of the invention the Update Command Dictionary is an SMS Command Dictionary, the General Third Party Application is a General SMS Application, the Manager Client Device is coupled to the system solution via a SMS communication mechanism, the General Application Messaging Input is a SMS Messaging Input, and the Decoder used by the System Solution is a SMS Decoder.

In another preferred embodiment of the invention the Update Command Dictionary is an Email Command Dictionary, the General Third Party Application is a General Email Application, the Manager Client Device is coupled to the system solution via an Email communication mechanism, the General Application Messaging Input is an Email Messaging Input, and the Decoder used by the System Solution is an Email Decoder.

In another preferred embodiment of the invention the Update Command Dictionary is an Application Dependent Command Dictionary, the General Third Party Application is a General Messaging Application, the Manager Client Device is coupled to the system solution via an Application Dependent communication mechanism, and the General Application Messaging Input is an Application Dependent Messaging Input, and the Decoder used by the System Solution is an Application Dependent Decoder.

In another preferred embodiment of the invention validation procedures are executed in the Manager Client Devices to insure that the Manager did not enter an erroneous Update Command.

In another preferred embodiment of the invention, validation procedures are executed in the apparatus comprising the System Solution to insure that the Manager did not enter an erroneous Update Command.

In another preferred embodiment of the invention, the System Solution, once it completes the desired change as defined by the received Update Command, sends an acknowledgement message to the Manager Client Device to let the employee of the Business Entity that the update has been completed and downloaded to the devices of the customers or users of the Business Entity coupled with the System Solution.

Another embodiment of one of the present inventions is a method of using a System Solution to allow a first application running on a first client device to generate and download an updated application on a second client device comprising the steps of: running the first application on the first client device; coupling the first client device and the second client device to the System Solution, wherein the System Solution comprises at least one computing device and at least one server, downloading a dictionary of update commands from the System Solution to the first client device; using the first client device to send an update command selected from the dictionary of update commands to the System Solution; using the System Solution to generate the updated application from the update command; and downloading the updated application from the System Solution to the second client device, further comprising the steps of: running a second application on the second client device; and replacing the second application running on the second client device with some or all of the updated application transparently, wherein the updated application comprises a Page Surface and a Page Foundation, wherein only the Page Surface of the updated application is updated. The method further comprising the steps of: sending the update command via a communication mechanism, wherein the communication mechanism is selected from the group consisting of Short Message Service (SMS), email, Application Dependent Messaging, chat, messenger and Voice-to-Text, further comprising the steps of: translating the update command via the System Solution to a corresponding update to be added to the updated application, wherein the first application is a General Third Party Application. The method wherein the first client device is a Manager Client Device and the second client device is a Manager Client Device or Customer Client Device.

Another embodiment of one of the present inventions is a method of using a System Solution to apply a dictionary to a general third party application and to create an updated application comprising the steps of: running the general third party application on a first client device; coupling the first client device to the System Solution, wherein the System Solution comprises at least one computing device, an existing data model, and at least one server; downloading a dictionary having update commands from the System Solution to the first client device; using the general third party application running on the first client device to send an update command selected from the dictionary to the System Solution; using a decoder and the update command on the System Solution to generate an updated data model replacing the existing data model; and using the updated data model to create the updated application. The method further comprising the steps of: running a second client device with an application; downloading the updated application from the System Solution to the second client device; and replacing the application running on the second client device with the updated application transparently, wherein the updated application comprises a Page Surface and a Page Foundation, wherein only the Page Surface of the updated application is updated. The method further comprising the steps of: sending the update command via a communication mechanism, wherein the communication mechanism is selected from the group consisting of Short Message Service (SMS), email, Application Dependent Messaging, chat, messenger and Voice-to-Text, further comprising the steps of: decoding the value using the decoder selected from the group consisting of SMS, email, Application, chat, messenger and Voice-to-Text dependent decoders. The method further comprising the steps of: translating the update command into the updated data model by using the dictionary selected from the group consisting of SMS, email, Application, chat, messenger and Voice-to-Text command dictionaries, further comprising the steps of: using the System Solution to generate the Dynamically Updated (DU) Data Model to execute the desired Update Command to create the updated application selected from the group consisting of DU Native Mobile Application Clients (AP), DU Native Non-Mobile AP, DU Non-Native Mobile AP, DU Non-Mobile AP, DU Cloud AP, and DU Application Components.

Another embodiment of one of the present inventions is an apparatus of the System Solution comprising: a first application configured to run on a first client device; the first client device and a second device coupled to the System Solution, wherein the System Solution comprises at least one computing device and at least one server, a dictionary having update commands downloaded from the System Solution to the first client device; an update command selected from the dictionary sent from the first client device to the System Solution; the System Solution configured to generate an updated application from the update command; and a second client device configured to receive the updated application from the System Solution, further comprising: a second application configured to run on the second client device, wherein the second application running on the second client device is replaced with some or all of the updated application transparently, wherein the updated application comprises a Page Surface and a Page Foundation, wherein only the Page Surface of the updated application is updated. The apparatus further comprising: a communication mechanism configured to send the update command, wherein the communication mechanism is selected from the group consisting of Short Message Service (SMS), email, Application Dependent Messaging, chat, messenger and Voice-to-Text, further comprising: a corresponding update translated from the update command by the System Solution and added to the updated application, wherein the first application is a General Third Party Application.

BRIEF DESCRIPTION OF THE DRAWINGS

Please note that the drawings shown in this specification may not necessarily be drawn to scale and the relative dimensions of various elements in the diagrams are depicted schematically. The inventions presented here can be embodied in many different forms and should not be construed as limited to the embodiments set forth herein. Rather, these embodiments are provided so that this disclosure will be thorough and complete, and will fully convey the scope of the invention to those skilled in the art. In other instances, well-known structures and functions have not been shown or described in detail to avoid unnecessarily obscuring the description of the embodiment of the invention. Like numbers refer to like elements in the diagrams.

FIG. 2A shows a Client Device with a coupling to a bank of servers, an Application Store, and the internal hardware/software structure of the Client Device.

FIG. 2B depicts a more detailed description of a server being a subset of Computer hardware with software, a Database and the server.

FIG. 4A shows the flow of how a Native Application Client is approved and downloaded by an Application Store to a Client Device.

FIG. 4B illustrates the flow of how a new Updated Native Application Client is approved and downloaded by an Application Store to a Client Device.

DETAILED DESCRIPTION OF THE INVENTION

Figures 1A, 1B:
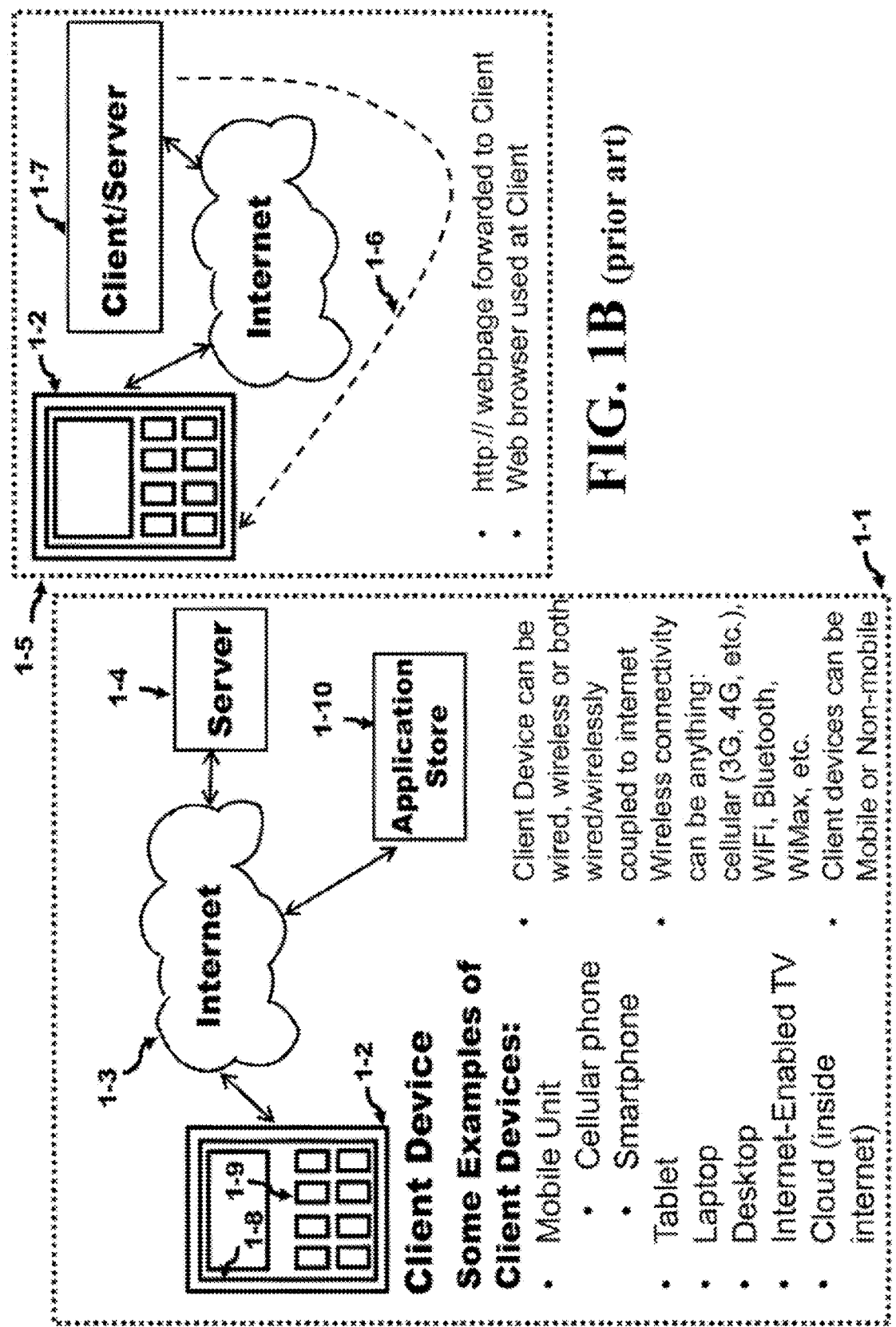
FIG. 1A depicts a Client Device coupled to a server and an Application Store and provides some examples of Client Devices.
FIG. 1B depicts a Client Device coupled to a client/server.
Figures 3A, 3B:
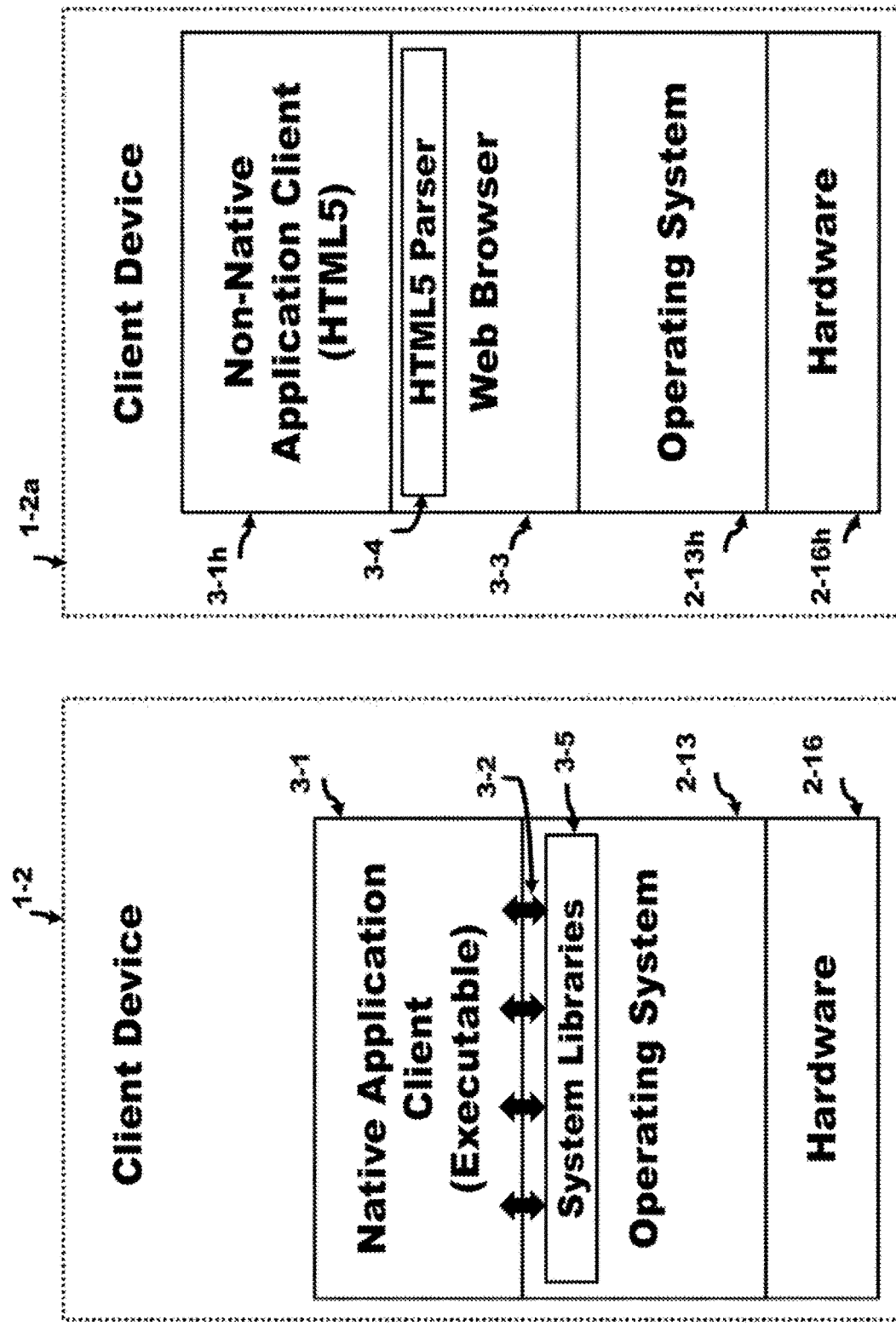
FIG. 3A presents a Native Application Client and how it relates to the layered stacks of the hardware/software representation of a Client Device.
FIG. 3B illustrates a Non-Native Application Client and how it relates to the layered stacks of the hardware/software representation of a Client Device.

The System Solution offers the ownership, control and beneficial use of this inventive idea. The System solution offers the beneficial use to the Business Entity by providing Applications, Updating Applications, and Update Command Dictionaries for the Business Entity. The Applications provided by the System Solution comprise a plurality of Application Components, and include Native Application Clients that run on Mobile, Non-Mobile, and Cloud Client Devices. These Native Application Clients can be modified by the Business Entity using Dashboards and can be downloaded to the Client Devices without the Business Entity having to submit the modified Native Application Client to the corresponding Application Store. The Updating Applications allow the Business Entity to modify the Application Clients. The Update Command Dictionaries allow the Business Entity to use General Third Party Applications to modify the Application Clients. The System Solution is the owner of all Application Components automatically generated by the System Solution. The System Solution creates and hosts Applications for different Business Entities (each Business Entity is a System Solution customer). The System Solution provides a complete environment for the creation, hosting, updating, and management of the Applications, Updating Applications, and Update Command Dictionaries. The Application Servers generated by the System Solution for all Business Entities are hosted in a multi-tenant environment in the Cloud, but each Business Entity "feels" like it is provided a dedicated Application Server. The System Solution architecture also applies with minor changes to a scenario where the System Solution Application Server run on dedicated servers owned by the Business Entity, rather than in the Cloud. In this scenario, the System Solution has access to control and offer beneficial use for those servers that are coupled to the Cloud.

Business Entities deploy their Applications to reach Consumers (i.e., the customers of that Business Entity served by System Solution). The Consumers are the primary End Users of the Application Clients generated by the System Solution. The Business Entities are the End Users of the Dashboards, Update Applications, Update Command Dictionaries, and the Application Server that the System Solution provides to each Business Entity for managing the corresponding Application.

Mobile Client Devices (cellular phones, smartphones, wearable devices, and tablets) and Non-Mobile Client Devices (laptops, desktops, and Internet-enabled TV sets) are coupled to the internet by wired (a physical interconnect), wirelessly (waves through space), or any combination of the two networks. The wireless connectivity can be cellular (3G, 4G, etc.), Wi-Fi, Bluetooth, WiMax, etc. The network interconnecting these components is called the Communication network. The Client Device has the Application Client which is the actual application software running on device.

The term "Mobile" when used alone or in a larger phrase "Mobile Client Devices" can also imply the terms Mobile, Non-Mobile or in the Cloud. The term Mobile Client at times will be referred to as the Client Device. The term Application highlights the fact that the application built by the System Solution comprises a plurality of Application Components, and includes a portion of the Application that runs on the Client Device (the Application Client) and a portion of the application that runs on a server (the Application Server). The term "Application Client" refers to the portion of the application running on the Client Device and is used to refer to both Native and Non-Native Application Client. The term "Application Client" encompasses the Application Client running on a mobile Client Device, a non-mobile Client Device or even in the Cloud. The term "Mobile Application Client" will be used for both Native and Non-Native Application Clients running on a mobile Client Device, but it also applies to Client Devices that are non-mobile or in the Cloud. The Cloud can run a portion of the Application Client in the server while the remaining portion of the Application Client can run on the Client Device, simultaneously. The Application Client can be a part of the software running on the mobile or non-mobile Client Device or can be partially in the Cloud. In all cases, the Client Devices provide the End User with at least one mode of input and at least one mode of output through which the End User navigates and interacts with the Application Client.

Each Application includes a family of Application Clients. Each Application Client corresponds to a certain Client Device. The family of Application Clients includes a set of Native Mobile Application Clients, one per mobile platform. The set of Native Mobile Application Clients may include an Updating Application Client. Alternatively, each Native Mobile Application Client in the set of Native Mobile Application Clients may include updating functionality that can be enabled by a security mechanism. The family of Application Clients also includes a set of Native Non-Mobile Application Clients, one per non-mobile platform. The family of Application Clients also includes Non-Native Mobile and Non-Mobile Application Clients, and Application Clients residing in the Cloud. The Non-Native Application Clients and the Native Non-Mobile Application Clients may include corresponding Updating Application Clients. Alternatively, each Non-Native Application Client or Native Non-Mobile Application Client may include updating functionality that can be enabled by a security mechanism. Some examples of the mobile platforms include the IPHONE™, IPAD™, ANDROID™ phones, or tablets while the non-mobile platforms include the Apple Mac Operating System and the Microsoft Windows Operating System. For convenience, we use the term Mobile Application Client (or more succinctly Mobile Client) to refer to any Mobile Client in the family of Mobile Clients corresponding to an Application generated by the System Solution.

Figure 5A:
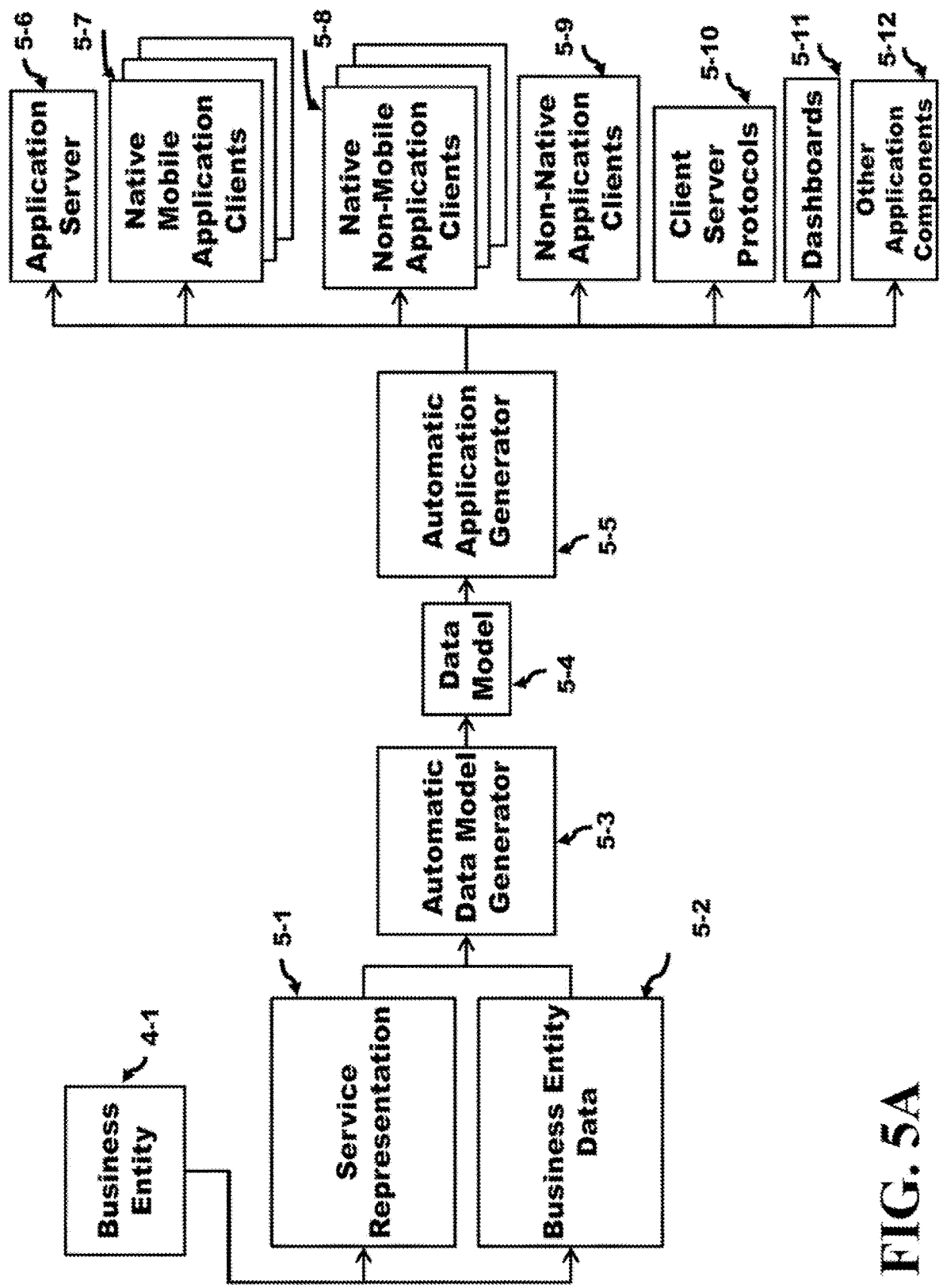
FIG. 5A depicts a description of automatically generating client applications using a System Solution in accordance with the present invention.

FIG. 5A depicts a method and apparatus to automatically generate an Application consisting of several Application Components. A Business Entity 4-1 defines a Service Representation 5-1 and Business Entity Data 5-2. An Automatic Data Model Generator 5-3 takes the Service Representation 5-1 and the Business Entity Data 5-2 as inputs and automatically generates a Data Model 5-4. Using the generated Data Model 5-4, an Automatic Application Generator 5-5 automatically generates all the Application Components. The generated Application Components include an Application Server 5-6, a set of Native Mobile Application Clients 5-7, a set of Native Non-Mobile Application Clients 5-8, a set of Non-Native Application Clients 5-9, Client Server Protocols 5-10, Dashboards 5-11, and Other Application Components 5-12. The set of Native Mobile Application Clients 5-7 comprises a Native Application Client executable for each mobile Client Device that the Native Mobile Application Client is desired to run on. The set of Native Non-Mobile Application Clients 5-8 comprises a Native Non-Mobile Application Client executable for each non-mobile Client Device that the Native Non-Mobile Application Client is desired to run on. The method and apparatus depicted in FIG. 5A is explained in detail in the U.S. patent application Ser. No. 13/833,589 titled "Apparatus for Single Workflow for Multi-Platform Mobile Application Creation and Delivery" and in U.S. patent application Ser. No. 13/833,669 titled "Method for Single Workflow for Multi-Platform Mobile Application Creation and Delivery" both filed on Mar. 15, 2013, which are incorporated in reference in their entirety. Also, Appendix A in this specification provides a Glossary of terms. What is relevant in this application is that Native Mobile Application Clients 5-7, Native Non-Mobile Application Clients 5-8, and Non-Native Application Clients 5-9 are automatically generated from the Service Representation 5-1 and Business Entity Data 5-2. Further, the generated Dashboards 5-11 can be used to modify the generated Native Mobile Application Clients 5-7, Native Non-Mobile Application Clients 5-8, and Non-Native Application Clients 5-9.

The process of updating a Native Application Client is time consuming, costly, and laborious, and it cannot be performed "on the fly" while the Native Application Client is running on the Client Device. When the Business Entity updates the Native Application Client, it has to re-submit the new version of the Native Application Client for approval to the Application Store, which is a time-consuming, costly, and laborious process. Because of such a required process, there is a considerable lag from the time the Business Entity updates the Native Application Client to the time the new version of the Native Application Client is made available for download in the Application Store. Further, a Client Device which desires the new version of the Native Application Client must go back to the Application Store to again download and re-install the Native Application Client. If the existing Native Application Client is running on the Client Device, it must first be stopped and deleted before the new version of the Native Application Client is installed. The Native Application Client cannot be updated "on the fly" while it is running on the Client Device. The update and re-installation process is a time-consuming and inconvenient process. The user experience of the Native Application Client is disrupted while the Native Application Client is terminated and re-installed.

Figure 5B:
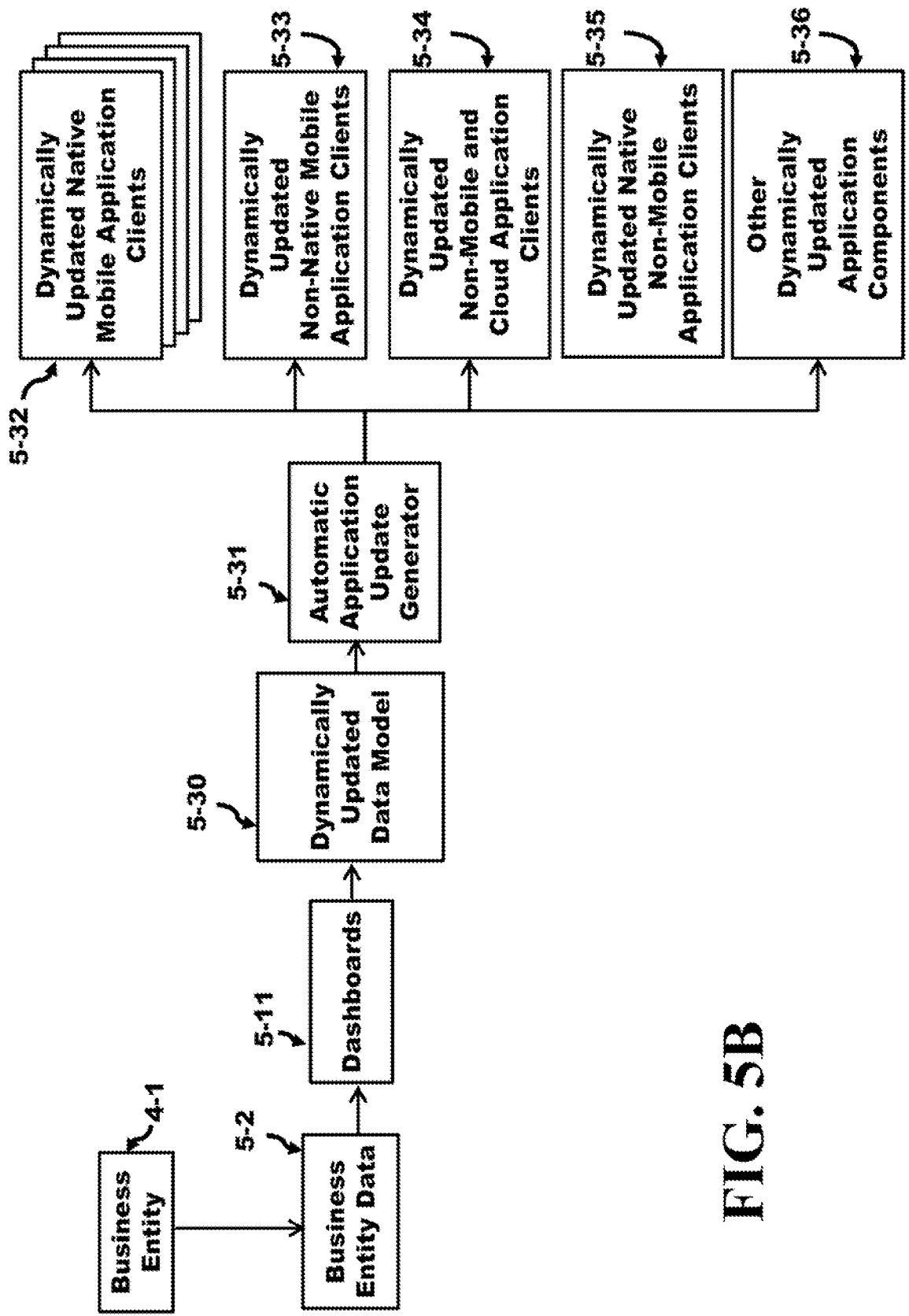
FIG. 5B depicts a description of dynamically updating client applications using Dashboards generated by a System Solution in accordance with the present invention.

FIG. 5B presents a Dynamic Layer Update flow which shows how the created Native Application Clients can be modified by the Business Entity 4-1 using the newly created Dashboards 5-11. The Dashboards 5-11 that are automatically created in FIG. 5A are used by the Business Entity 4-1 to add, delete, or modify content, features, and services contained in the Native and Non-Native Application Clients and replace the existing set of Application Clients in the Client Devices 1-2. The System Solution allows the Business Entity 4-1 to modify the Data Model 5-4 and generate new Dynamic Layers. The Business Entity 4-1 using the Dashboards 5-11 generates the Dynamically Updated Data Model 5-30 which is then applied to the Automatic Application Update Generator 5-31 which is a sub-set of the Automatic Application Generator 5-5. The output of the Automatic Application Update Generator 5-31 generates a set of Dynamically Updated Native Mobile Application Clients 5-32, a set of Dynamically Updated Native Non-Mobile Application Clients 5-33, Dynamically Updated Non-Native Mobile Application Client 5-35, Dynamically Updated Non-Native Non-Mobile and Cloud Application Clients 5-34 and Other Dynamically Updated Application Components 5-36. Once this sequence has been established, the Business Entity can manipulate the Business Entity Data 5-2 applied to the Dashboards 5-11 and can continuously and automatically update the various Application Clients that this particular system generates.

Figure 5C:
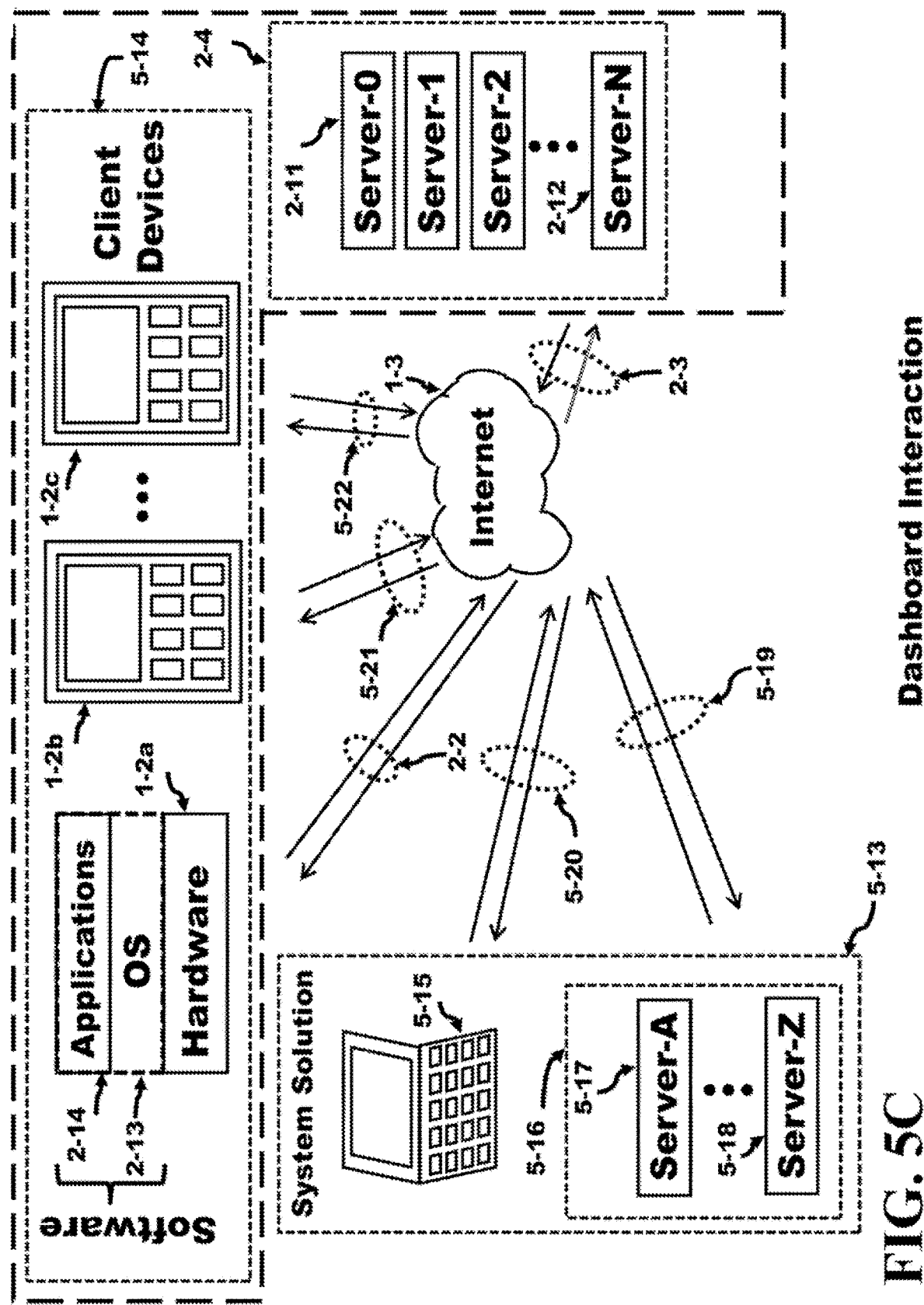
FIG. 5C depicts dashboards generated by a System Solution which update client applications running on client devices in accordance with the present invention.

FIG. 5C illustrates a System Solution 5-13 coupled to a Business Entity 5-1. At least one of System Solution Computing devices 5-15 and at least one System Solution servers 5-16 that comprises Server-A 5-17 through Server-Z 5-18 is coupled to the Business Entity 5-1 though the Internet 1-3. An Automatic Creation Application Server with a corresponding Automatic Creation Database is a sub-set of the server bank 5-16. It is understood that the Applications 2-14 running on the OS 2-13 of the Client Devices 1-2a, 1-2b, and 1-2c in Client Devices 5-14 are generated by the server (Single Application Server) under the control of the System Solution 5-13. The System Solution servers 5-16 can also be located in the Cloud, in the vicinity of the Computing devices 5-15 or a combination of any therein. The System Solution 5-13 couples to the Internet via a plurality of interconnects, for example, 5-19, 5-20, 2-2, 5-21, 5-22 and 2-3. This interconnection can be a wireline or wireless and is part of the Communication network. The System Solution 5-13 creates through the Internet 1-3 Application servers, appropriate Server/client protocols, Databases Server for the Business Entities, Dashboards, security insurances, etc., with the server bank 2-4 that comprises Server-0 2-11 through server-N 2-12 via interconnect 2-3. The generated Applications for Native or Non-Native Clients are applied to Client Devices 1-2a via interconnect 2-2, Client Device 1-2b via interconnect 5-21 and Client Device 1-2c via interconnect 5-22. These Client Devices can be mobile, non-mobile or in the Cloud and have a software and hardware similar to that explained in FIG. 2A. For the latter, some of the application is split between the Cloud and the Client Device. At all times, the System Solution 5-13 is monitoring the interactions between the Clients Devices and the Application servers, appropriate Server/client protocols, Databases Server for the Business Entities, Dashboards, security insurances, etc. via the interconnects to and between the Internet 1-3.

The automatically generated Applications and updated Applications are both generated in FIG. 5C. The generated Applications apply to Native as well as non-Native devices. All desired Services are also included in the automatically generated Applications. The updated Applications may be generated by the Business Entity through the use of the Dashboard (to be discussed shortly) provided by the System Solution 5-13 allowing the Business Entity 5-1 to change a portion of the application or for the Dashboard under the control of the System Solution 5-13 to alter the entire "look." For the updated Applications there may be no need to re-apply to the Application store 1-10 for approval.

Figure 6A:
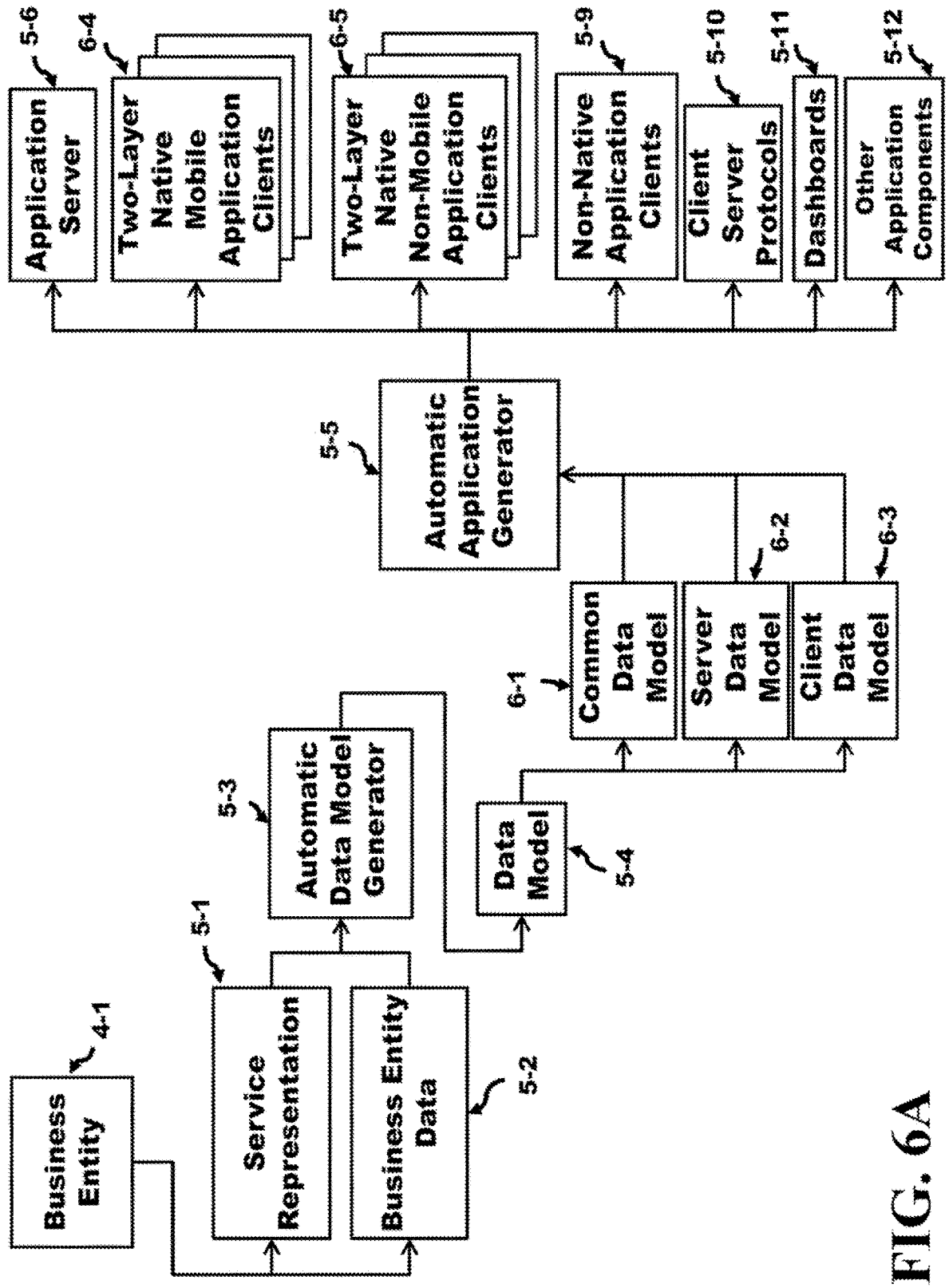
FIG. 6A illustrates a Two-Layer Automatic Application Client Generator in accordance with the present invention.

FIG. 6A depicts a method and apparatus to automatically generate an Application consisting of several Application Components including a set of Two-Layer Native Mobile Application Clients 6-4 and a set of Two-Layer Native Non-Mobile Application Clients 6-5. The method and apparatus described in FIG. 6A has similarities with the method and apparatus depicted in FIG. 5A, which is explained in detail in the U.S. patent application Ser. No. 13/833,589 titled "Apparatus for Single Workflow for Multi-Platform Mobile Application Creation and Delivery" and in U.S. patent application Ser. No. 13/833,669 titled "Method fir Single Workflow for Multi-Platform Mobile Application Creation and Delivery" both filed on Mar. 15, 2013, which are incorporated in reference in their entirety. Also, Appendix A in this specification provides a Glossary of terms. However, the method and apparatus described in FIG. 5A generates a set of Native Mobile Application Clients 5-7 and a set of Native Non-Mobile Application Clients 5-8. The method and apparatus described in FIG. 6A generates a set of Two-Layer Native Mobile Application Clients 6-4 and a set of Two-Layer Native Non-Mobile Application Clients 6-5.

A Business Entity 4-1 defines a Service Representation 5-1 and Business Entity Data 5-2. An Automatic Data Model Generator 5-3 takes the Service Representation 5-1 and the Business Entity Data 5-2 as inputs and automatically generates a Data Model 5-4. The data outputs of the Data Model presents data to the inputs of the Automatic Application Generator in a well-organized structure. The Data Model 5-4 then generates a Common Data Model 6-1, a Server Data Model 6-2 and a Client Data Model 6-3. Using the generated Common Data Model 6-1, Server Data Model 6-2, and Client Data Model 6-3, an Automatic Application Generator 5-5 automatically generates all the Application Components. The generated Application Components include an Application Server 5-6, a set of Two-Layer Native Mobile Application Clients 6-4, a set of Two-Layer Native Non-Mobile Application Clients 6-5, a set of Non-Native Application Clients 5-9, Client Server Protocols 5-10, Dashboards 5-11, and Other Application Components 5-12. The set of Two-Layer Native Mobile Application Clients 6-4 comprises a Two-Layer Native Application Client executable for each mobile Client Device that the Native Mobile Application Client is desired to run on. The set of Two-Layer Native Non-Mobile Application Clients 6-5 comprises a Two-Layer Native Non-Mobile Application Client executable for each non-mobile Client Device that the Native Non-Mobile Application Client is desired to run on. The generated Dashboards 5-11 can be used to modify the Dynamic Layer of the generated Two-Layer Native Mobile Application Clients 6-4 and Two-Layer Native Non-Mobile Application Clients 6-5. The generated Dashboards 5-11 can also be used to modify the generated Non-Native Application Clients 5-9. The Dashboards are installed on a plurality of servers coupled to the Internet. The Business Entity using the Dashboard and Business Entity Data via the System Solution to automatically generate an Updated Data Model. The generated Application Server 5-6 can be used to make the modified Dynamic Layer of the generated Two-Layer Native Mobile Application Clients 6-4 and Two-Layer Non-Native Mobile Application Clients 6-5 available for download to the Client Device 1-2. The generated Client Server Protocols 5-10 can be used to download the modified Dynamic Layers to the Client Device 1-2.

Figure 6B:
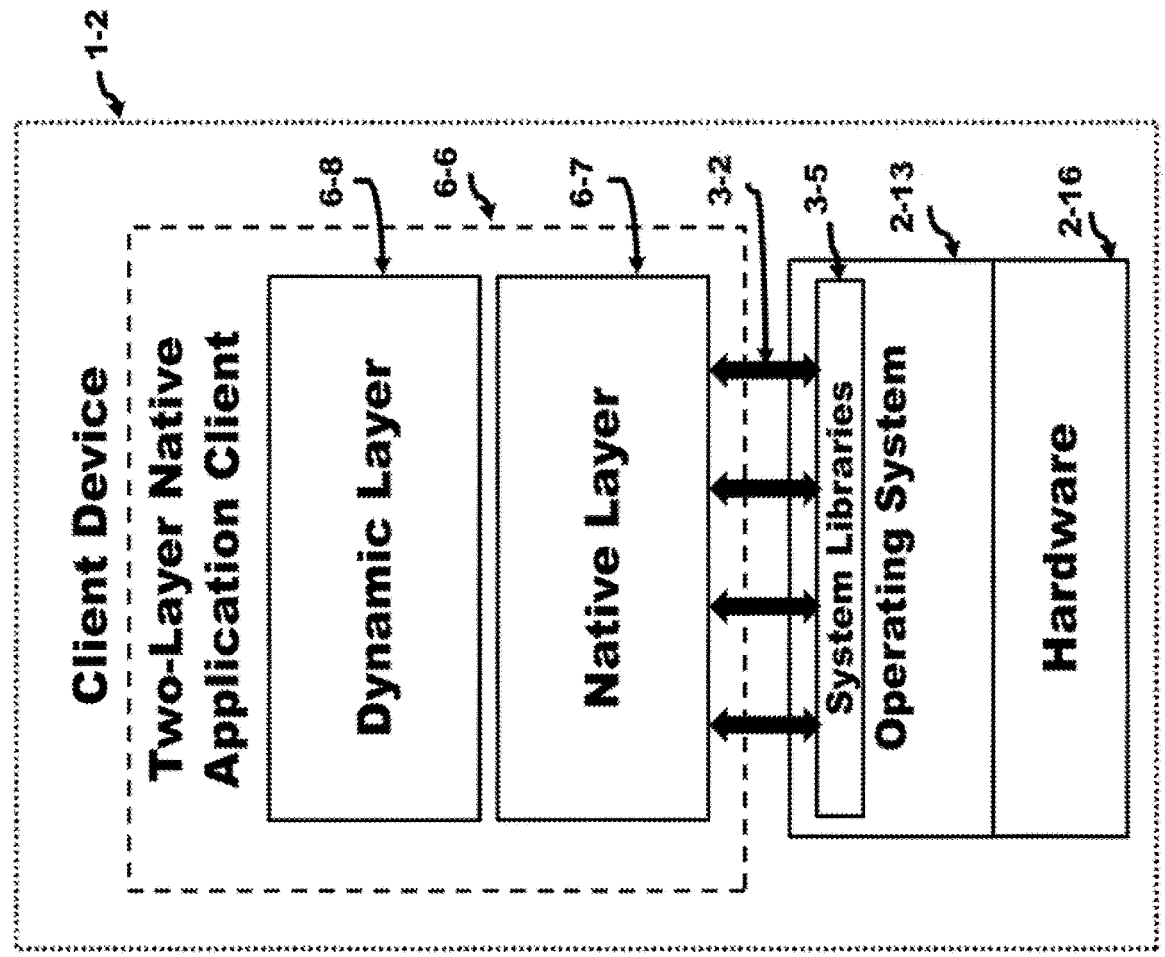
FIG. 6B shows a Two-Layer Application Client in a Client Device in accordance with the present invention.

FIG. 6B depicts a Two-Layer Native Application Client 6-6 which is a Native Application Client that consists of two layers: a Dynamic Layer 6-8 and a Native Layer 6-7. The Native Layer 6-7 runs 3-2 directly on the Operating System 2-13 of the Client Device 1-2 by using the system libraries 3-5 that are part of the Operating System 2-13. The Operating System in turn runs on the hardware 2-16. The Dynamic Layer 6-8 does not run directly on the Operating System 3-5, but instead runs on the Native Layer 6-7 by making use of software libraries and functional blocks provided in the Native Layer 6-7. The Native Layer 6-7 and the Dynamic Layer 6-8 together implement the functionality and user experience offered by the Two-Layer Native Application Client 6-6. The Native Layer 6-7 is an executable that depends on the Client Device 1-2 and needs to be downloaded and installed on the Client Device 1-2 using an installation manager external to the Two-Layer Native Application Client 6-6. The Native Layer 6-7 needs to be downloaded from the Application Store. The Dynamic Layer 6-8 does not need to be downloaded from the Application Store, but can be downloaded directly from an Application Server that is part of the System Solution. We use the term "Dynamic Native Application Client" as synonymous of the term "Two-Layer Native Application Client."

Figure 7:
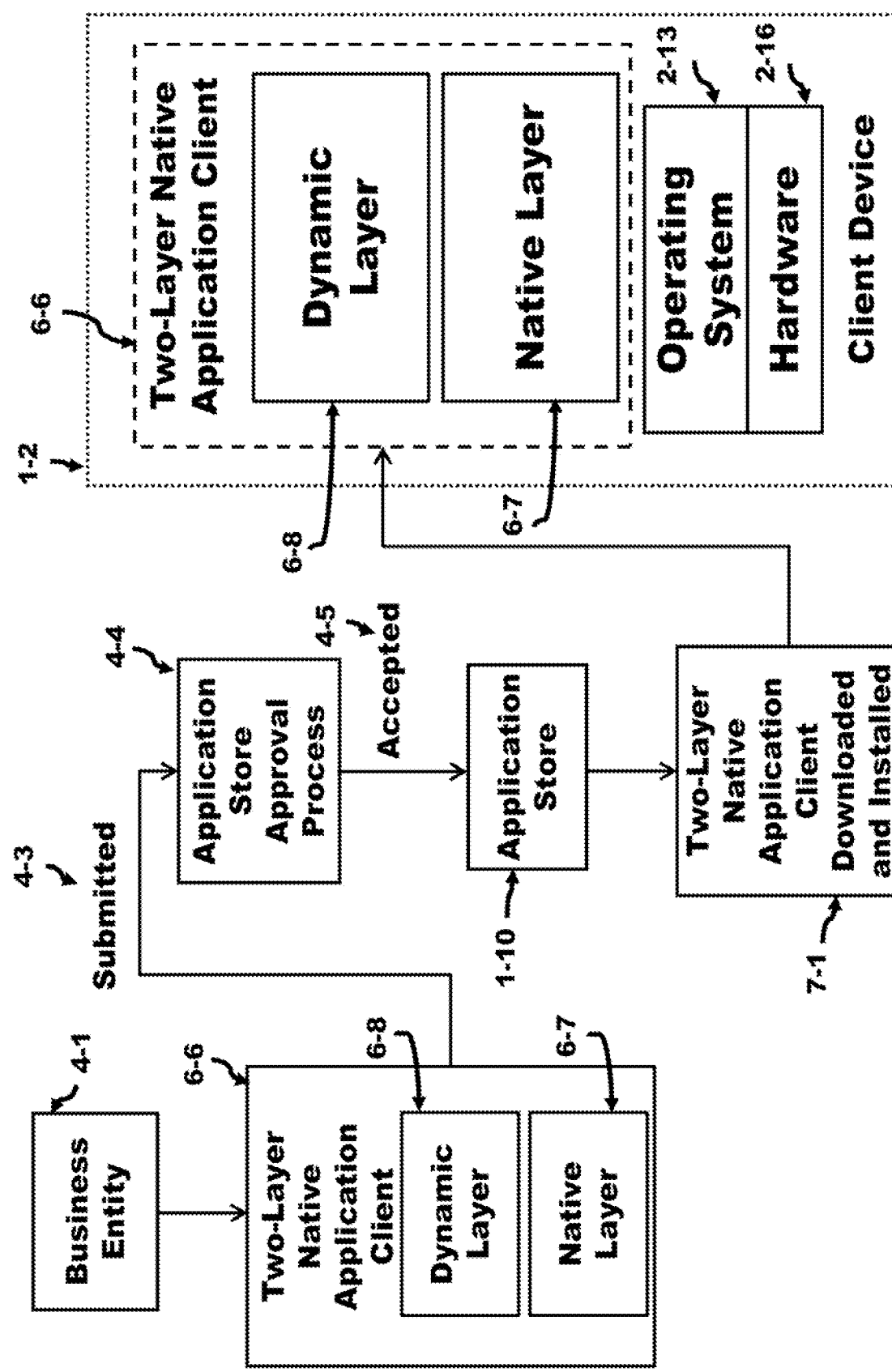
FIG. 7 presents a Business Entity submitting a Two-Layer Application Client for approval and download to an Application Store for availability to other Device Clients in accordance with the present invention.

FIG. 7 illustrates the process of downloading the Two-Layer Native Application Client 6-6 to a Client Device 1-2 for the first time. This process is similar to the process of downloading a Native Application Client 3-1 to the Client Device depicted in FIG. 4A. A Business Entity 4-1 creates a new application which comprises a Two-Layer Native Application Client 6-6. The Two-Layer Native Application Client 6-6 has a Dynamic layer 6-8 and a Native Layer 6-7. The new Two-Layer Native Application Client 6-6 is submitted 4-3 to the Application Store 1-10 for an approval process 4-4. Once the new Two-Layer Native Application Client is accepted 4-5, information is passed to the Application Store 1-10 to make the new Two-Layer Native Application Client available for download 7-1 into a Client Device 1-2. A Client Device 1-2 which desires the Two-Layer Native Application Client 6-6 downloads the Two-Layer Native Application Client from the corresponding Application Store 1-10. For example, an IPHONE™ downloads its desired Native Application Client from the APPLE™ Application Store, an ANDROID™ device downloads its desired Native Application Client from the ANDROID™ Application Store, etc. Once the Two-Layer Native Application Client is downloaded to the Client Device, it is installed 7-1 on the Client Device so it can run on the Operating System 2-13 of the Client Device. The Operating System in turn runs on the hardware 2-16. The Two-Layer Native Mobile Application Client 6-6 executable depends on the Operating System (OS) as an iPhone would require a different executable than an ANDROID™ phone.

If the Business Entity modifies the Native Layer 6-7, the Business Entity needs to submit the new version of the Native Layer 6-7 to the Application Store for re-approval in order to make it available for download to the Client Device. In order to install the updated version of the Native Layer on the Client Device, the existing version of the Native Layer, if running on the Client Device 1-2, must be stopped and deleted from the memory of the Client Device 1-2 in order for the new version of the Native Layer to be installed on the Client Device. The Native Layer cannot be updated "on the fly" while the Native Application Client 3-1 is running on the Client Device 1-2.

Figure 8:
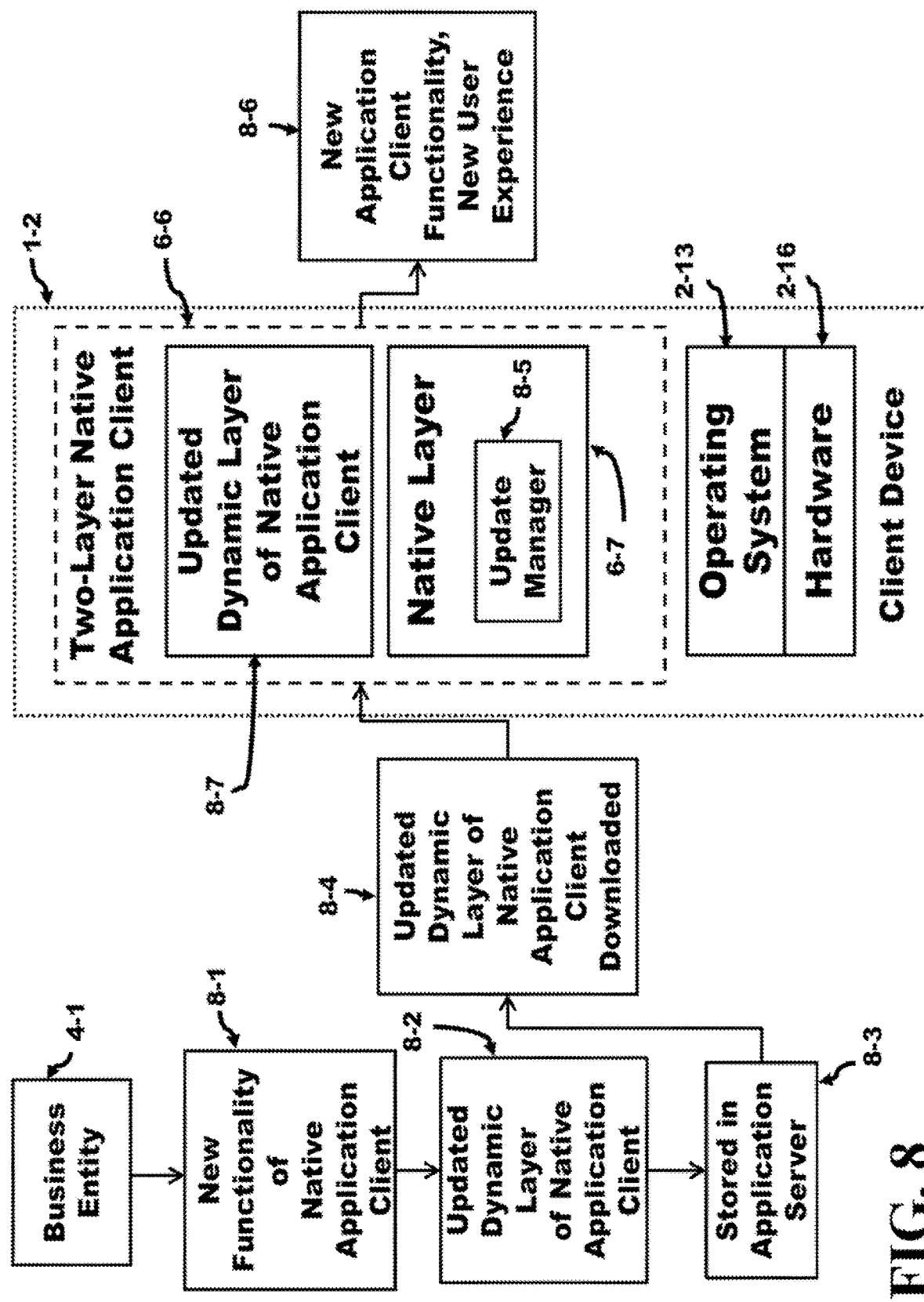
FIG. 8 shows a Business Entity submitting an Updated Dynamic Layer of a Native Application Client for availability to other Device Clients via an Application Server in accordance with the present invention.

FIG. 8 illustrates an embodiment of the process of downloading an updated Dynamic Layer 8-2 to the Client Device. If the Business Entity 4-1 desires a New Functionality of the Native Application client 8-1, the Business Entity 4-1 modifies the Dynamic Layer 6-8 by using the Dashboard 5-11 by filling in the entries to create an Updated Dynamic Layer 8-2, the Updated Dynamic Layer 8-2 is available for download directly from an Application Server 8-3 that is part of the System Solution or is owned by the Business Entity. The Application Server 5-6 was created in the method and apparatus illustrated in FIG. 6A. The new version of the Updated Dynamic Layer 8-2 of the previous Dynamic Layer 6-8 is made available for download to the Client Device without having the Business Entity submit it for approval to the Application Store 1-10. The updated Dynamic Layer 8-4 is downloaded and installed 8-4 in the Client Device 1-2 while the Two-Layer Native Application Client 6-6 is running on the Client Device. The update of the existing Dynamic Layer can be achieved using an update manager 8-5 that is internal in the Native Layer 6-7 of the Two-Layer Native Application Client 6-6. Once the Updated Dynamic Layer 8-7 is installed on the Client Device 1-2, the new application client functionality and new user experience 8-6 is provided to the end user. As before, the Operating System 2-13 running on the hardware 2-16 in the Client Device 1-2.

The Two-Layer Native Application Client 6-6 provides several benefits. The Business Entity can change the functionality of the Two-Layer Native Application Client 6-6 without resubmitting the Native Application Client to the approval process of the Application Store, which is laborious and time consuming. The functionality of the Two-Layer Native Application Client 6-6 can be changed "on the fly" while the Native Application Client is running on the Client Device, without disrupting the user experience offered by the Native Application Client. The updated Dynamic Layer 8-2 can be downloaded and installed in the Client Device "automatically" by the Two-Layer Native Application Client using an update manager 8-5 internal to the Native Layer 6-7 of the Two-Layer Native Application Client 6-6. Thus, the Two-Layer Native Application Client 6-6 can be updated "transparently" without requiring any action from the end user. The internal update manager 8-5 can make sure that the Dynamic Layer running on the Client Device 1-2 is always the latest version of the Dynamic Layer 8-7, by querying the Application Server asking whether there is a newer version of the Dynamic Layer than the version of the Dynamic Layer 8-7 currently running on the Client Device, and downloading and installing the latest version when it is made available by the Business Entity 4-1. The updated Dynamic Layer 8-2 is downloaded from an Application Server owned by the System Solution or by the Business Entity, rather than having to be downloaded from the Application Store 1-10.

An Application Client includes both a Native Application Client and a Two-Layer Native Application Client. The Application Client comprises a plurality of Pages. The Pages are presented to the end user via a User Interface. Buttons in each Page allow the end user to "navigate" from one Page to another. Each Page contains a sub-set of the plurality of Buttons. Each Button connects one Page to another Page in the Application Client. When the Application Starts on the Client Device, a pre-configured Page in the plurality of Pages is displayed to the end user. Then, the end user navigates to the other Pages using the Buttons. We use the term "Navigation Element" as a synonymous of Button to refer to the fact that "Buttons" may assume other forms on the User Interface, to connect one Page to another. Navigation Elements or Buttons include buttons themselves, tabs, navigation bars, tappable elements such as an address, a thumbnail, or a piece of text that when tapped navigates the end user to another Page. Buttons or Navigation Elements can even be "implicit," i.e., not be shown explicitly to the end user. For example, an "implicit" button may navigate the user from one Page to another Page, after a certain time lapses or if a certain event occurs.

A Button or Navigation Element on the User Interface is presented on a Starting Page. If the end user taps or clicks the Button, it "navigates" to the Ending Page, meaning that the Application Client displays the User Interface of the Ending Page to the end user. The Buttons and the links that are provided among the plurality of Pages in the Application Client constitute the "Application Flow" of the Application Client. The Application Flow is an important part of the user experience that the Application Client offers to the end user.

A Page for a Two-Layer Native Application Client comprises a plurality of Elements. In turn, each Element comprises a plurality of Sub-Elements. The term "Element" refers to any "part" or block of a Page. For example, one of the Elements may be the Page itself, a UI Region (i.e., a portion of the Page), a widget, a building block, a piece of content, a navigation structure, a button, a tab, etc. Examples of Sub-Elements include a Background, a Content, Pictures, text, shape, text box, video, position, format, etc. A Background which is typically an image covering the entire area of the Element. The other possibilities includes a Content which includes Pictures and Text, a Picture which is an image, a Shape, a Text Box which is an imaginary "box" defining an area where text is displayed, a Video, a Position which consists of a X-Coordinate and a Y-Coordinate, a Size which consists of a Width and a Height, a Text, and a Format which may include a Font, a Font Size, an Alignment, and a Font Color for a Text Box. For a given Element, not all Sub-Elements may exist or even apply. Sub-Elements are used only in an "as needed fashion" to provide finer granularity in identifying the "parts of the Two-Layer Native Application Client 6-6 that should become part of the Dynamic Layer 8-7 in order to optimize Client/Server communication and Two-Layer Native Application Client dynamic behavior.

One or more of Elements are associated with a function, an action, or data. They are called Actionable Elements. For example, a line of text containing the Expiration Date of a Promotion is an Actionable Element, which is used by the Application Client to validate whether that Promotion is still active or needs to be retired. One or more of Elements are associated with data that should be filled. They are called Fillable Elements. There are three types of Fillable Elements. A Locally Fillable Element contains data that should be filled locally (i.e., using logic and data available in the Application Client) when the Element is displayed. For example, a Service which greets the Consumer by first name, may use a text Fillable Element which gets filled by the end user's first name. A Server Fillable Element contains data that should be filled by the Application Server. The Application Client may request the data from the Application Server using a Client/Server protocol. An Input Element is a Fillable Element which receives an end user's action that needs to be communicated to the Application Client or Application Server. One or more of Elements are Navigation Elements or Buttons.

The Page can also include one or more Navigation Rule. A Navigation Rule is associated with a Navigation Element or button and defines the "navigation" provided by the Navigation Element. The Page includes Native Logic which consists of an Orchestration, a set of Native Client Functional Blocks and an Update Manager 8-5.

A Page can be in one of two Page State. A Page in "In Use" Page State is a Page currently displayed to the end user by the Native Application Client. A Page in "Standby" Page State is a Page prepared in the Two-Layer Native Application Client for future use or use in the context of a certain Service, but not currently displayed to the Consumer.

Figure 9:
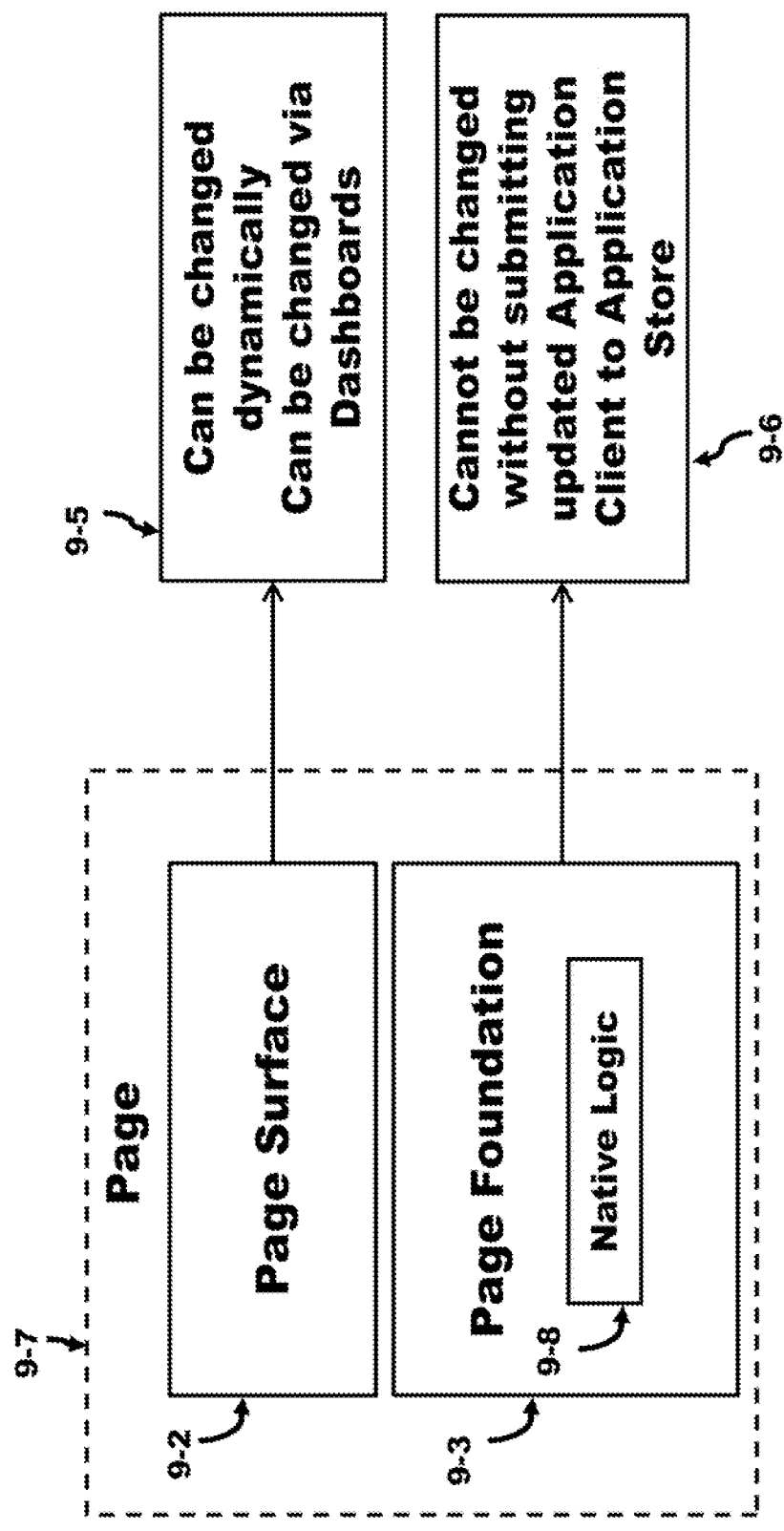
FIG. 9 illustrates the notion of a Page Surface and a Page Foundation in accordance with the present invention.

FIG. 9 depicts a Page 9-7 in the Two-Layer Native Application Client 6-6 which consists of a Page Surface 9-2 and a Page Foundation 9-3. The Page Surface "can be changed dynamically and can be changed via Dashboards or via an Updating Application (to be described)" 9-5. The Page Foundation "cannot be changed without submitting the updated Application Client to Application Store" 9-6. The Page Surface 9-2 is part of the Dynamic Layer 6-8. The Page Foundation 9-3 is part of the Native Layer 6-7 and includes the Native Logic 9-8. The Dynamic Layer 6-8 of the Two-Layer Native Application Client 6-6 consists of the Page Surfaces 9-2 of all the Pages comprised in the Two-Layer Native Application Client 6-6. The Native Layer 6-7 of the Two-Layer Native Application Client 6-6 consists of the Page Foundations 9-3 of all the Pages comprised in the Two-Layer Native Application Client 6-6.

Figure 10:
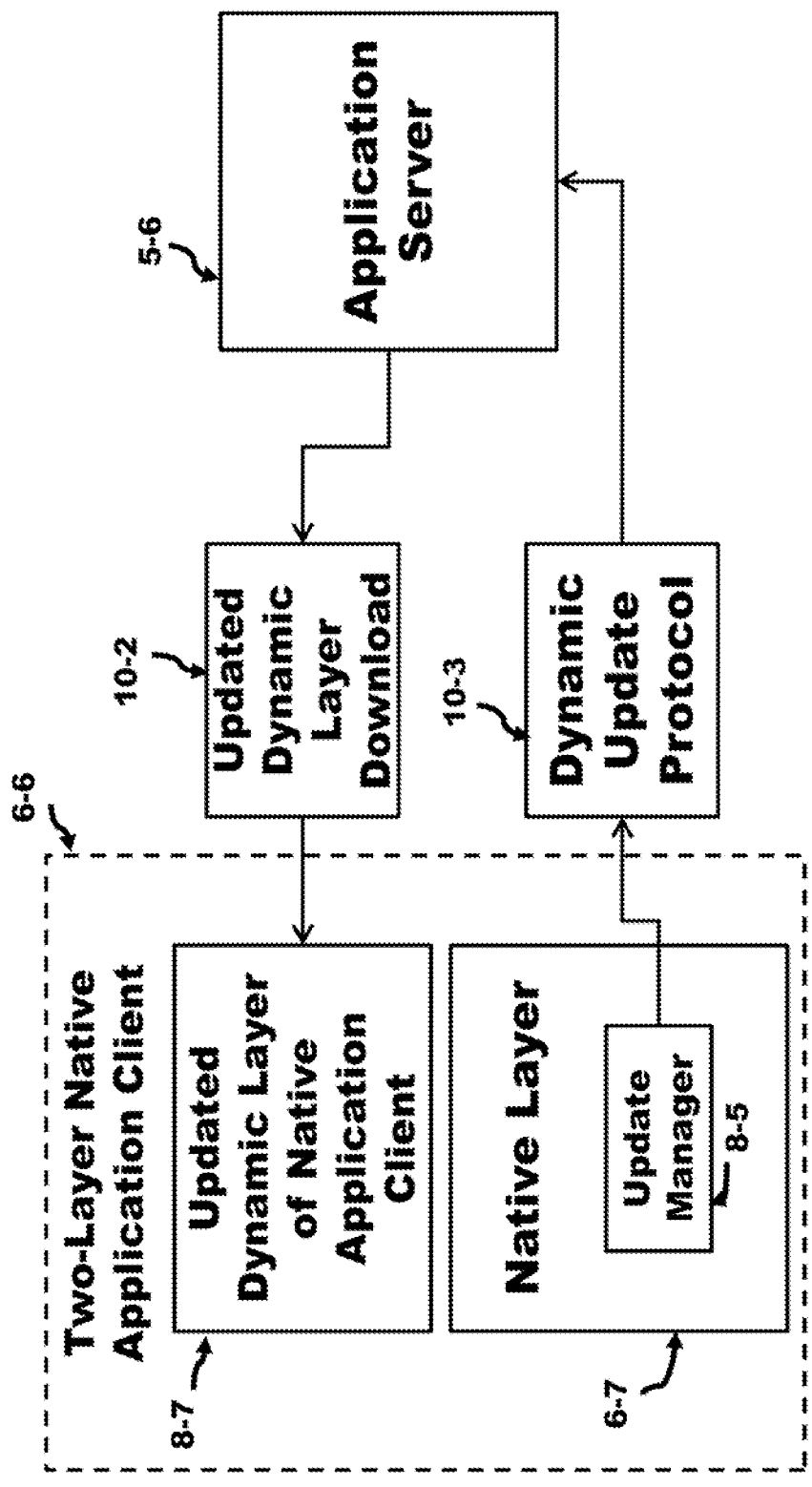
FIG. 10 shows an Update Manger continuously checking for Updates on an Application Server in accordance with the present invention.

FIG. 10 shows an update process with which the Update Manager 8-5 contained in the Native Layer 6-7 of the Two-Layer Native Application Client 6-6 queries the Application Server 5-6 while the Two-Layer Native Application Client 6-6 is running on the Client Device 1-2 to check if a newer version of the Dynamic Layer that is currently running on the Client Device 1-2 is available in the Application Server 5-6. For this purpose, the Update Manager 8-5 uses a Dynamic Update Protocol 10-3, which is part of the generated Client Server Protocols 5-10. When a newer version of the Dynamic Layer becomes available in the Application Server 5-6, it is downloaded to the Client Device using the Updated Dynamic Layer Download 10-2, and the Updated Dynamic Layer 8-7 is run on the Client Device 1-2.

Figure 11:
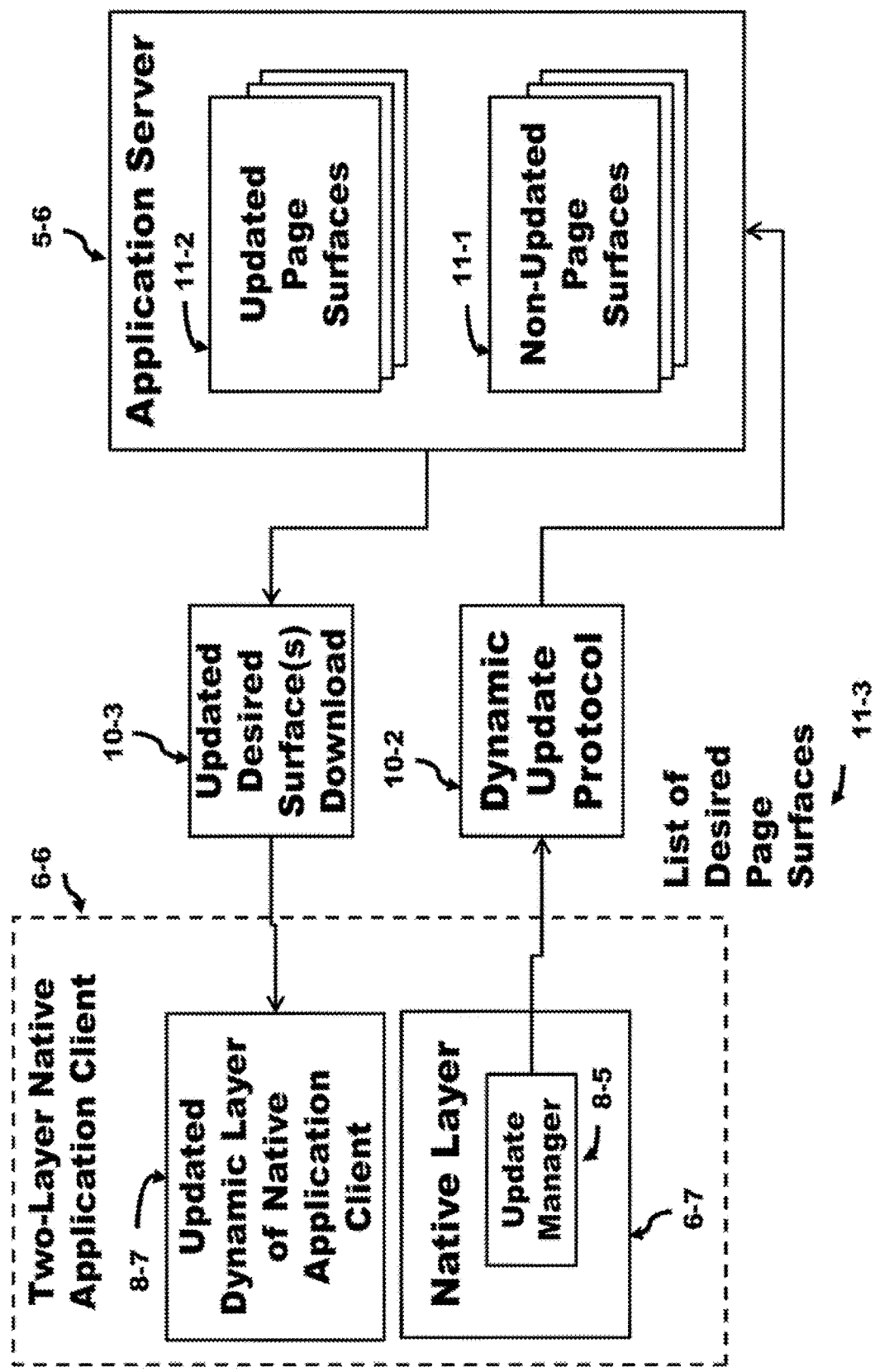
FIG. 11 illustrates updating Surfaces that have changed in accordance with the present invention.

FIG. 11 shows an optimized alternative to the process described in FIG. 10. In this alternative process, when the Update Manager 8-5 contained in the Native Layer 6-7 of the Two-Layer Native Application Client 6-6 queries the Application Server 5-6 using the Dynamic Update Protocol 10-2 to check whether a newer version of the Dynamic Layer that is currently running on the Client Device 1-2 is available in the Application Server 5-6. The newer portion of the Dynamic Layer is in Updated Page Surfaces 11-2 while the unaltered or previous version of the Dynamic Layer is in Non-Updated Page Surfaces 11-1. The Application Client also provides a List of the Desired Page Surfaces 11-3 that are needed to be displayed to the end user. When a newer version of the Dynamic Layer becomes available in the Application Server 5-6, only the Page Surfaces included in the List of Desired Page Surfaces 11-3 are downloaded using the Updated Desired Surface(s) Download 10-3, and the Updated Dynamic Layer 8-7 is run on the Client Device 1-2. Using this optimized alternative, the bandwidth usage and communication between the Client Device 1-2 and the Application Server 5-6 is optimized, and the memory storage of the Client Device 1-2 is optimized, since the entire Dynamic Layer does not need to be downloaded to the Two-Layer Native Application Client 6-6. Only the Page Surfaces that have changed and that are desired by the end user need to be downloaded to the Two-Layer Native Application Client 6-6. An even more optimized second alternative to this process downloads only the Elements, Sub-Elements, and Navigation Parameters that have been updated in the Desired Page Surfaces. The second alternative is an optimal update process of the Two-Layer Native Application Client 6-6.

Figure 12A:
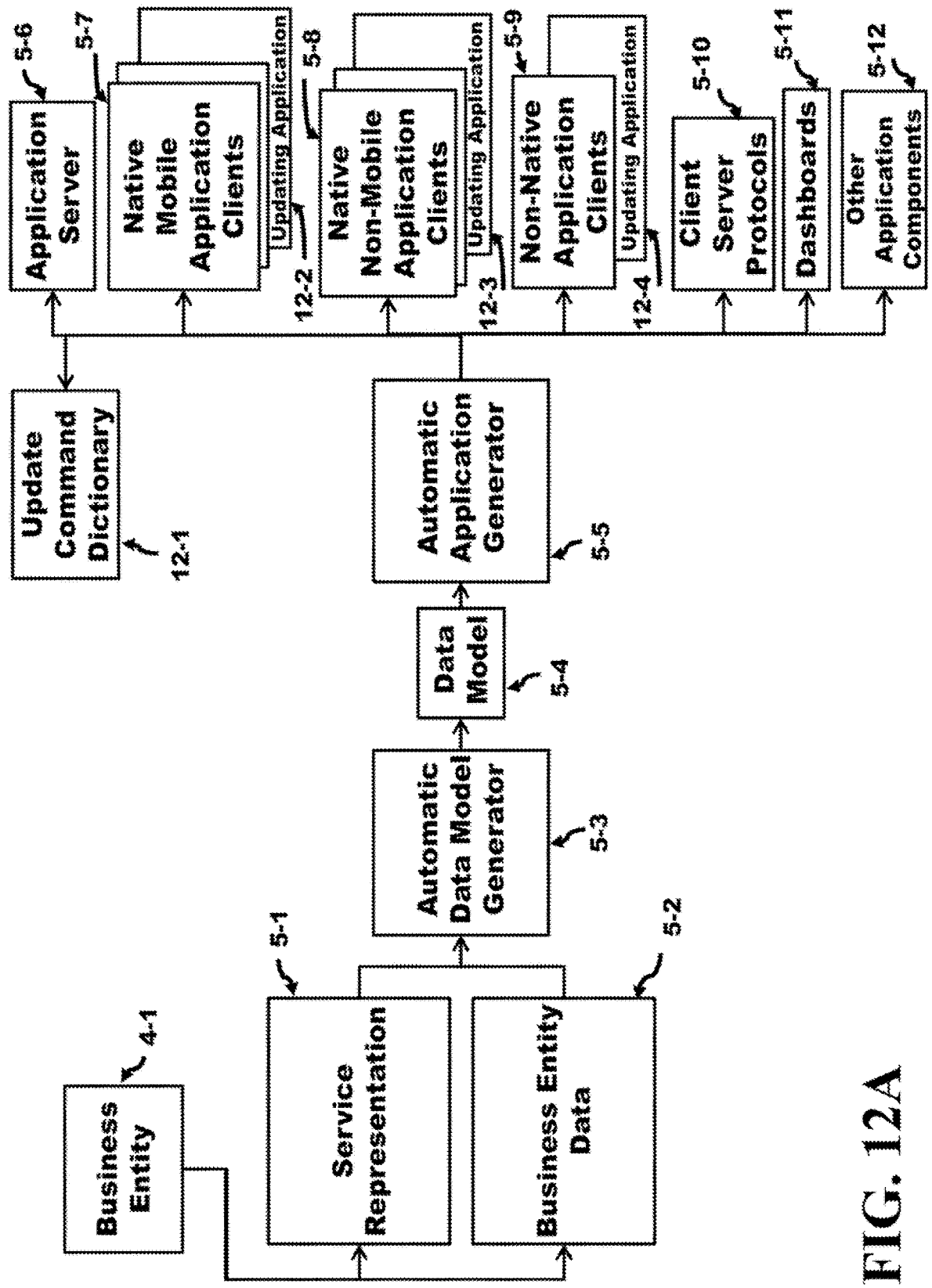
FIG. 12A illustrates a System Solution capable of automatically generating Native and Non-Native Application Clients and corresponding Updating Applications as well as an Update Command Dictionary in accordance with the present invention.

FIG. 12A depicts a method and apparatus to automatically generate an Application consisting of several Application Components including Updating Applications for the Application Clients and an Update Command Dictionary. A Business Entity 4-1 defines a Service Representation 5-1 and Business Entity Data 5-2. An Automatic Data Model Generator 5-3 takes the Service Representation 5-1 and the Business Entity Data 5-2 as inputs and automatically generates a Data Model 5-4. Using the generated Data Model 5-4, an Automatic Application Generator 5-5 automatically generates all the Application Components. The generated Application Components include an Application Server 5-6, a set of Native Mobile Application Clients 5-7, a set of Native Non-Mobile Application Clients 5-8, a set of Non-Native Application Clients 5-9, Client Server Protocols 5-10, Dashboards 5-11, and Other Application Components 5-12. The set of Native Mobile Application Clients 5-7 comprises a Native Application Client executable for each mobile Client Device that the Native Mobile Application Client is desired to run on. The set of Native Non-Mobile Application Clients 5-8 comprises a Native Non-Mobile Application Client executable for each non-mobile Client Device that the Native Non-Mobile Application Client is desired to run on. Additional information regarding FIG. 12A is explained in detail in the U.S. patent application Ser. No. 13/833,589 titled "Apparatus for Single Workflow for Multi-Platform Mobile Application Creation and Delivery" and in U.S. patent application Ser. No. 13/833,669 titled "Method for Single Workflow for Multi-Platform Mobile Application Creation and Delivery" both filed on Mar. 15, 2013, which are incorporated in reference in their entirety. Also, Appendix A in this specification provides a Glossary of terms. What is relevant in this application is that an Updating Application 12-2 is created with the Native Mobile Application Clients 5-7, an Updating Application 12-3 is created with the Native Non-Mobile Application Clients 5-8, and an Updating Application 12-4 is created with the Non-Native Application Clients 5-9. The created Updating Applications are automatically generated from the Service Representation 5-1 and Business Entity Data 5-2. Further, the generated Dashboards 5-11 and now the three Updating Applications 12-2 through 12-4 can be used to modify the generated Native Mobile Application Clients 5-7, Native Non-Mobile Application Clients 5-8, and Non-Native Application Clients 5-9 as will be explained shortly. In addition, an Update Command Dictionary 12-1 is generated to provide a shorthand representation of possible desired update commands. The Update Command Dictionary 12-1 typically replaces a long instruction (difficult, at times, to type into a hand held mobile unit) with short numerical equivalents allowing for easy entry into a smartphone, for example. The Update Command Dictionary 12-1 allows the Business Entity 4-1 to use General Third Party Applications modify the generated Native Mobile Application Clients 5-7, Native Non-Mobile Application Clients 5-8, and Non-Native Application Clients 5-9 as will be explained shortly.

Figure 12B:
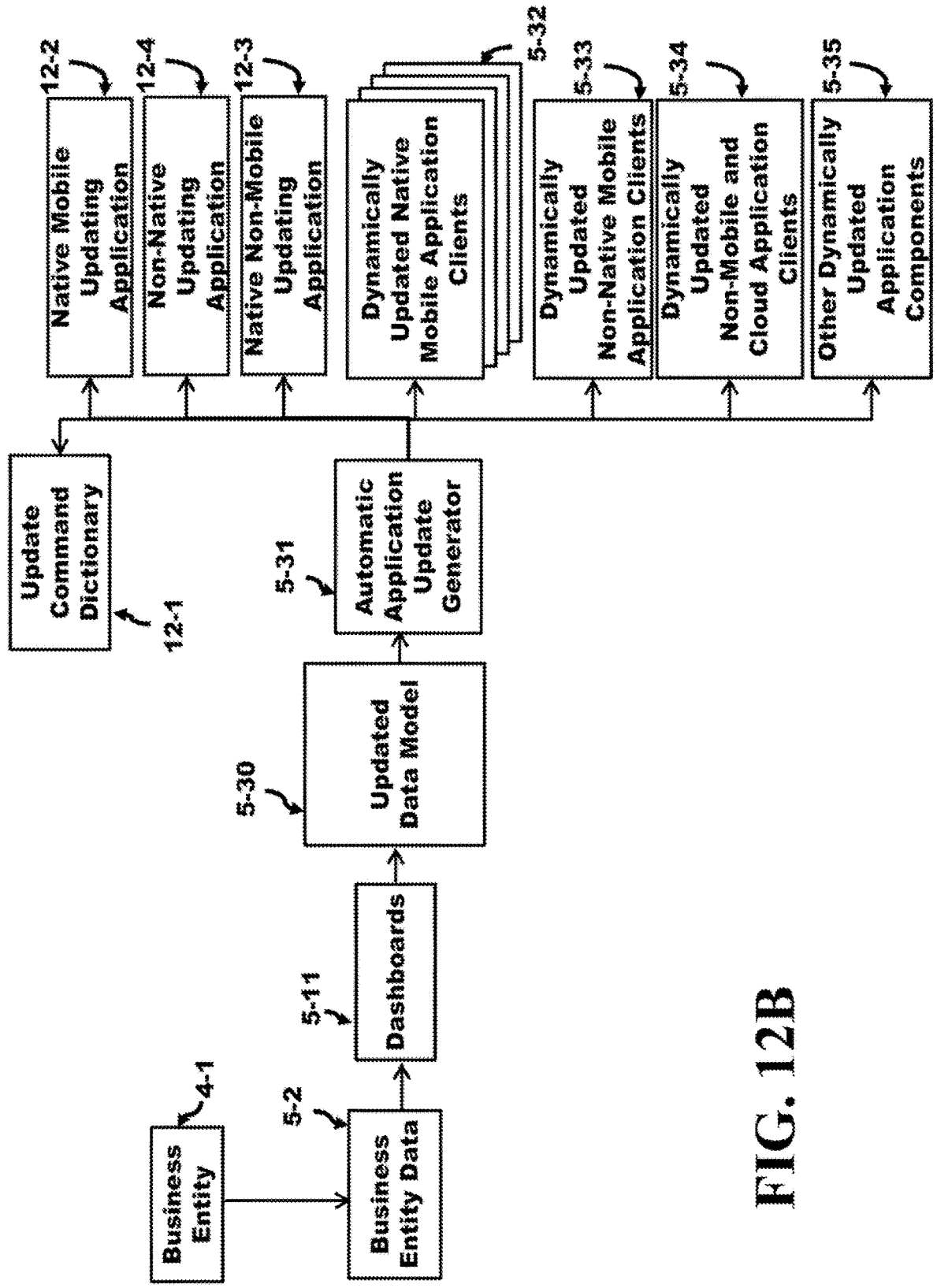
FIG. 12B illustrates Dashboards generated by a System Solution capable of dynamically updating Native and Non-Native Application Clients as well as generating corresponding Native and Non-Native Updating Applications and an Update Command Dictionary in accordance with the present invention.

FIG. 12B shows how the Updating Applications 12-2, 12-3, and 12-4 and the Update Command Dictionary 12-1 can also be generated using the Dashboards 5-11. As illustrated in FIG. 5B, the Native Application Clients can be modified by the Business Entity 4-1 using the Business Entity Data 5-2 and created Dashboards 5-11. The Business Entity 4-1 using the Dashboards 5-11 generates the Dynamically Updated Data Model 5-30 which is then applied to the Automatic Application Update Generator 5-31. The output of the Automatic Application Update Generator 5-31 generates a set of Dynamically Updated Native Mobile Application Clients 5-32, Dynamically Updated Non-Native Mobile Application Client 5-33, Dynamically Updated Non-Mobile and Cloud Application Clients 5-34 and Other Dynamically Updated Application Components 5-35. The Automatic Application Update Generator 5-31 can also generate a Native Mobile Updating Application 12-2, a Non-Native Updating Application 12-4, and a Native Non-Mobile Updating Application 12-3. Using these Updating Applications, the Business Entity 4-1 can further dynamically update the set of Native and Non-Native Application Clients. The Business Entity 4-1 would typically use this flow illustrated in FIG. 12B in the case where the Updating Applications do not already exist and were not already generated using the flow of FIG. 12A. The Business Entity 4-1 may also use the flow of FIG. 12B even if a set of Updating Applications was previously generated using the flow of FIG. 12A to generate new Updating Applications and replace the set of existing Updating Applications. For example, the Business Entity 4-1 may use this flow to generate new Updating Applications when a new Update Command is desired, which is not supported by the existing Updating Applications.

The Automatic Application Update Generator 5-31 can also generate an Update Command Dictionary 12-1, using which the Business Entity can use a General Third Party Application to further dynamically update the Application Clients. The Business Entity 4-1 would typically use this flow illustrated in FIG. 12B in the case where the Update Command Dictionary 12-1 does not already exist and was not already generated using the flow of FIG. 12A. The Business Entity 4-1 may also use the flow of FIG. 12B even if the Update Command Dictionary 12-1 was previously generated using the flow of FIG. 12A to generate a new the Update Command Dictionary 12-1 and replace the existing the Update Command Dictionary 12-1. For example, the Business Entity 4-1 may use this flow to generate a new the Update Command Dictionary 12-1 when a new Update Command is desired, which is not supported by the existing the Update Command Dictionary 12-1.

Figure 13A:
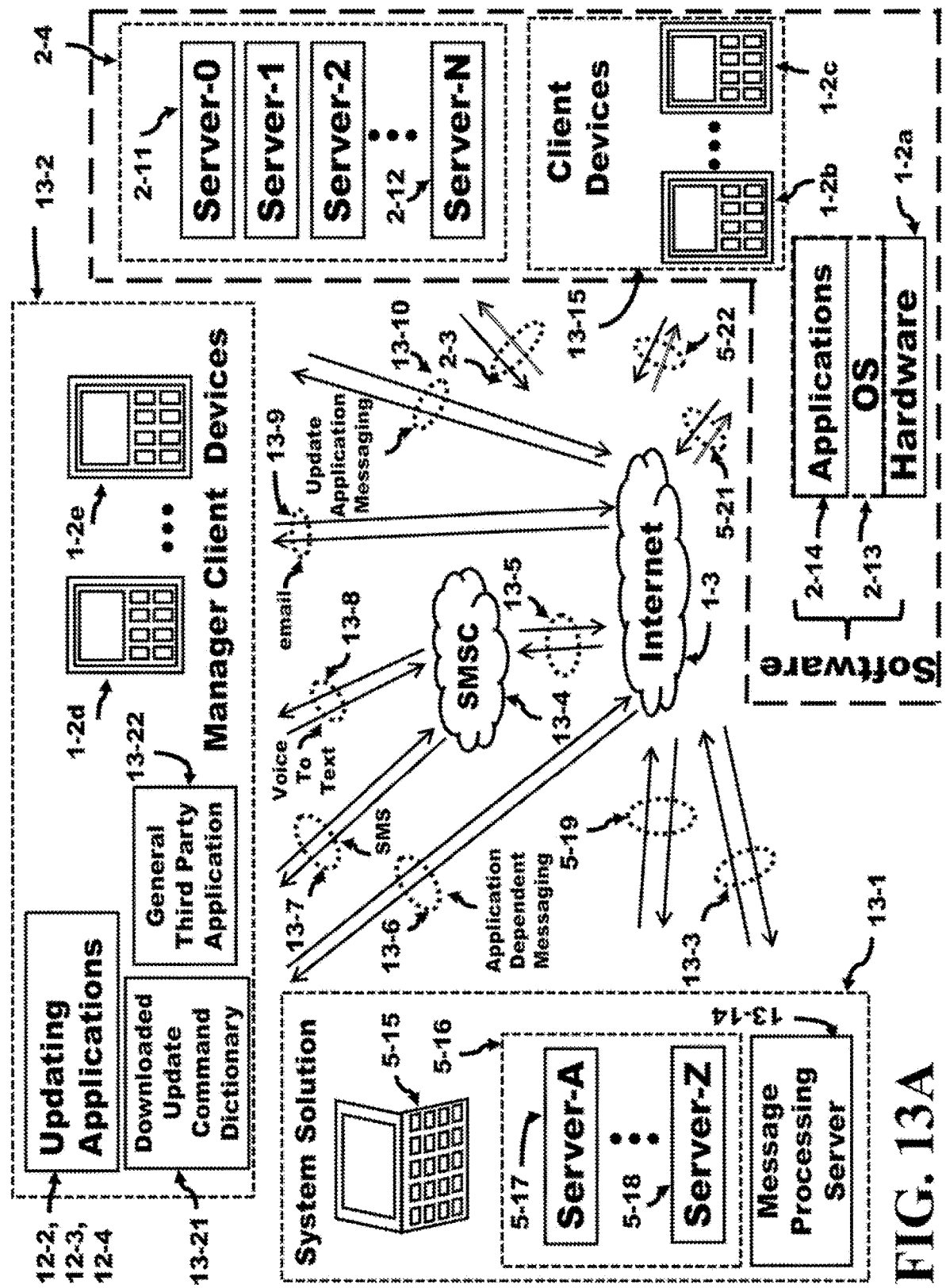
FIG. 13A illustrates Manager Client Devices running Updating Applications and using an Update Command Dictionary communicating with a System Solution via a variety of messaging mechanisms and capable of updating applications running on Client Devices in accordance with the present invention.

FIG. 13A illustrates a System Solution 13-1 coupled to a set of Manager Client Devices 13-2 comprising Manager Client Device 1-2d to Manager Client Device 1-2e. The Manager Client Devices in the set of Manager Client Devices 13-2 are illustrated communicating with the System Solution 13-1 to dynamically update the Application Clients running on the set of Client Devices 13-15 comprising Client Devices 1-2a to 1-2c. The Manager Client Devices in the set of Manager Client Devices 13-2 belong to the Business Entity 4-1 and are used by employees of the Business Entity, for example managers of stores belonging to the Business Entity 4-1. The Client Devices 1-2b to 1-2c in the set of Client Devices 13-15 belong to customers or users of the Business Entity 4-1. At least one of System Solution Computing devices 5-15 and at least one System Solution servers 5-16 that comprises Server-A 5-17 through Server-Z 5-18 is coupled to the Business Entity 4-1. An Automatic Creation Application Server with a corresponding Automatic Creation Database is a sub-set of the server bank 5-16. The System Solution servers 5-16 can also be located in the Cloud, in the vicinity of the Computing devices 5-15 or a combination of any therein. The Automatic Creation Application Server and Automatic Creation Database run the System Solution and the Dashboards described in FIG. 12A and FIG. 12B to automatically create and dynamically update Native and Non-Native Application Clients, Updating Applications 12-2, 12-3, 12-4, and Update Command Dictionary 12-1. The System Solution 13-1 comprises a Message Processing Server 13-14 to process messaging input generated by Manager Client Devices in the set of Manager Client Devices 13-2 and containing Update Commands destined to the System Solution 13-1. Update Commands are commands generated by the Managers employed by the Business Entity 4-1 using Updating Applications 12-2, 12-3, 12-4 or General Third Party Application 13-22 and Downloaded Update Command Dictionary 13-21. Update Commands specify desired updates in the Native and Non-Native Application Clients generated by the System Solution 13-1. The System Solution 13-1 processes the Update Commands and generates the Updated Data Model 5-30 used by the Automatic Application Update Generator to generate dynamically updated Native and Non-Native Application Clients. The System Solution 13-1 couples to the internet 1-3 via, for example, interconnects 5-19, 13-3, 2-2, 5-21, 5-22 and 2-3. These interconnections can be wireline, wireless or any combination therein and are part of the Communication network. The System Solution 13-1 creates through the Internet 1-3 Native and Non-Native Application Clients with the server bank 2-4 that comprises Server-0 2-11 through server-N 2-12. In turn, server bank 2-4 is coupled to Client Devices in the set of Client Devices 13-15 via interconnect 2-3 so dynamically updated Native and Non-Native Application Clients generated by the System Solution 13-1 can be downloaded in the Client Devices 13-15.

It is understood that the Applications 2-14 running on the OS 2-13 of the Client Devices 1-2a, 1-2b, and 1-2c in the set of Client Devices 3-15 are the Native and Non-Native Application Clients generated by System Solution 13-1 as described in FIG. 12A and FIG. 12B. The automatically generated Application Clients and updated Application Clients are both generated in the architecture illustrated in FIG. 13A. The generated Application Clients apply to Native as well as non-Native devices.

The Manager Client Devices 13-2 are coupled to the System Solution 13-1 through different communication mechanisms, depending on which type of applications are run on the Manager Client Devices. Examples of communication mechanisms comprises a messaging or SMS communication mechanism 13-7, an email communication mechanism 13-9, a voice to text communication mechanism 13-8, an application dependent messaging 13-6 and an Update Application Messaging 13-10. In case of the SMS communication mechanism 13-7, the Manager Client Devices 13-2 are coupled to a SMSC 13-4 which in turn is coupled to the Internet 1-3 and the System Solution 13-1 by communication mechanism 13-5. Update Application Messaging 13-10 is generated by Updating Applications 12-2, 12-3, 12-4. This allows the managers of the Business Entities 4-1 to use Updating Applications 12-2, 12-3, 12-4 or General Third Party Applications 13-22 and Downloaded Update Command Dictionary 13-21 to instruct the System Solution 13-1 to alter the appearance of the Application Clients. Thus, when a manager does not have access to a desktop or is on the move and mobile, a smartphone or any portable device with a small display screen can be used to allow the Manager to dynamically alter the Application Clients on the fly. In some cases, the Voice to Text feature can be utilized bypassing the requirement of a display screen on the Client Device. All commands can be entered and received verbally to/from the Client Device.

The Updating Applications 12-2, 12-3, 12-4 are downloaded onto the Manager Client Devices 13-2 (1-2d and 1-2e, for example) allowing the Business Entity 4-1 to change a portion of the application under the control of the System Solution 13-1 to alter the entire "look." Note that the Updating Application emulates the behavior of the Dashboards 5-11. For these updated Applications, there may be no need to re-apply to the Application store 1-10 for approval. These Applications are automatically downloaded unto the Client devices 1-2a, 1-2b and 1-2c. In other words, the Updating Application that was generated in FIG. 12A is an application that is used by the Business Entity to change or alter other Application Clients. The Update Command Dictionary 12-1 allows the Business Entity 4-1 to use a General Third Party Applications 13-22 such as an SMS application, an email application, or a messaging application commonly available on any smartphone or mobile device to generate Update Commands to alter Native and Non-Native Application Clients under the control of the System Solution 13-1. Note that the General Third Party Application 13-22 in conjunction with the Update Command Dictionary 12-1 emulates the behavior of the Dashboards 5-11. The System Solution 13-1 uses the Messaging Processing Server 13-14 to process and decode the Update Commands and implement the desired changes to the Native and Non-Native Application Clients.

Figure 13B:
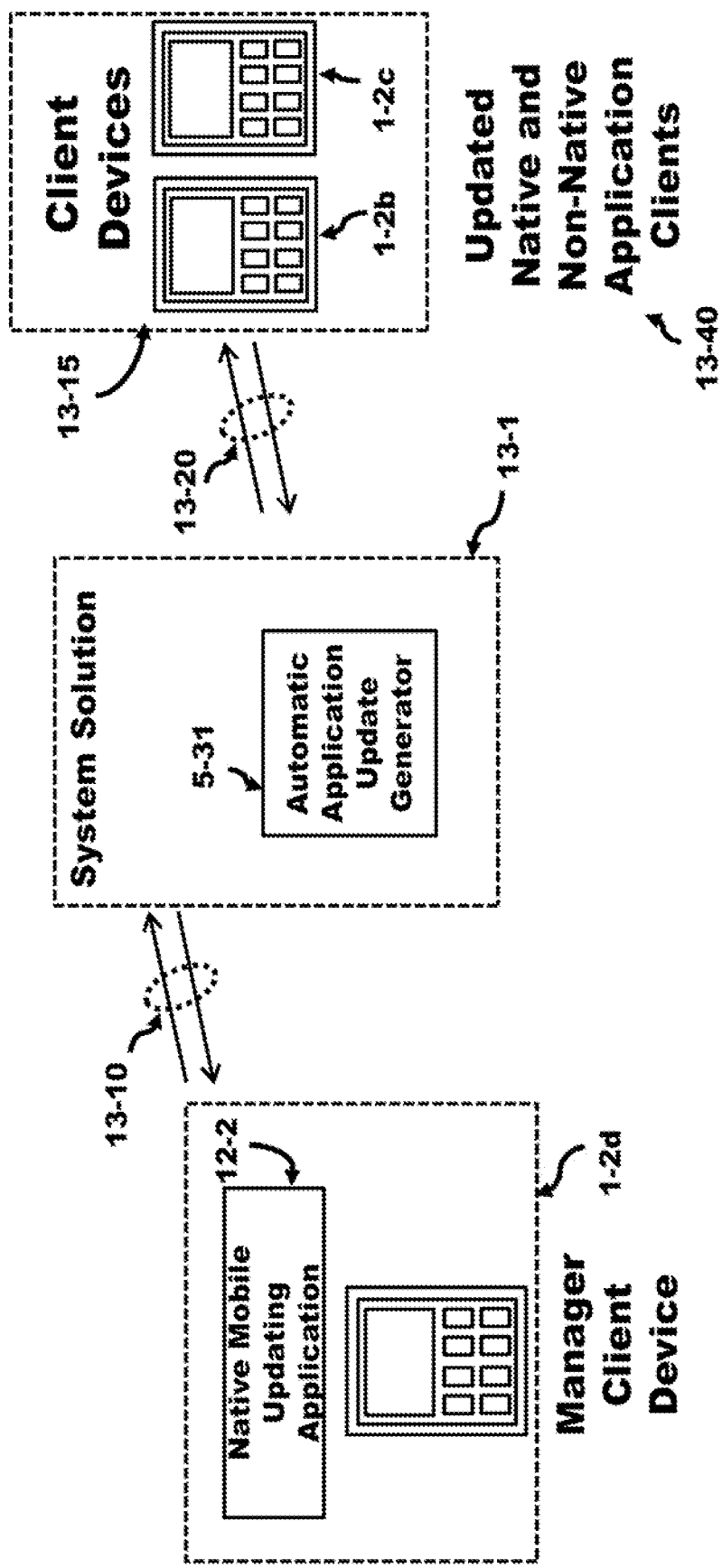
FIG. 13B illustrates a Manager Client Device running a Native Updating Application and communicating with a System Solution containing an Automatic Application Update Generator to update Native and Non-Native Application Clients running on Client Devices in accordance with the present invention.

FIG. 13B further illustrates a Manager Client Device 1-2d running a Native Mobile Updating Application 12-2 and coupled to the System Solution 13-1 via a communication mechanism 13-10. Using the Native Mobile Updating Application 12-2, the manager who is part of the Business Entity 4-1 generates Update Commands to instruct the System Solution 13-1 to generate Updated Native and Non-Native Application Clients 13-40 running on Client Devices 1-2b to 1-2c in the set of Client Devices 13-15 which are coupled to the System Solution 13-1 via a communication mechanism 13-20.

Figure 13C:
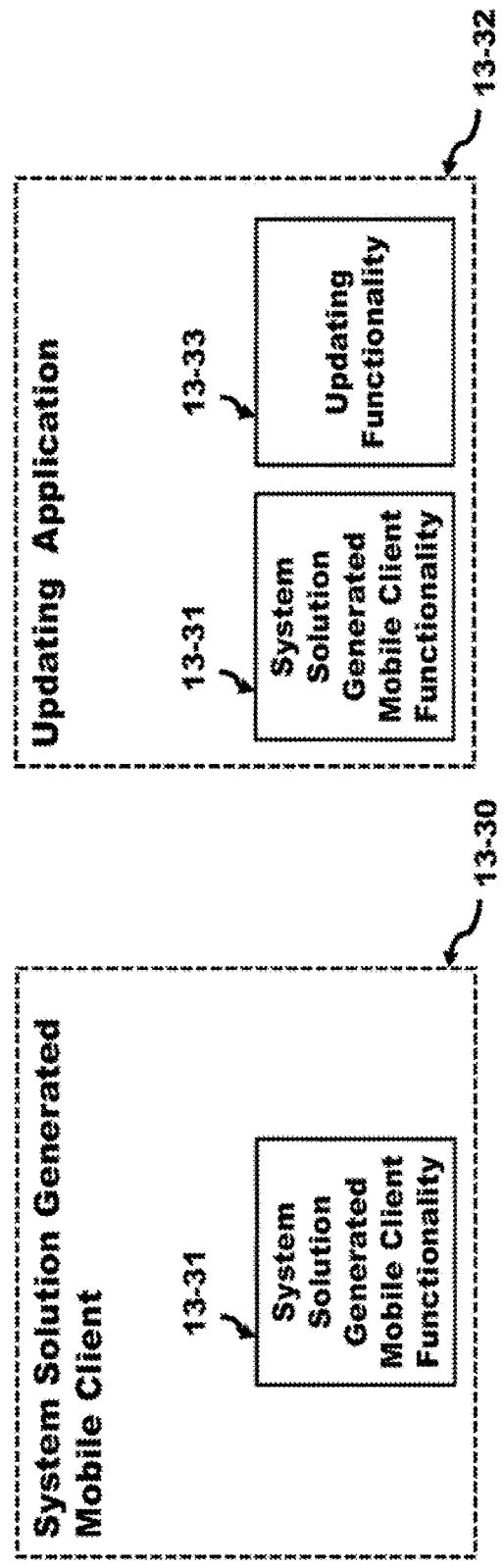
FIG. 13C illustrates a System Solution Generated Mobile Client and an automatically generated separate corresponding Updating Application in accordance with the present invention.

FIG. 13C illustrates the structure of an Updating Application 13-32 and its relationship with the System Solution Generated Mobile Client 13-30. The System Solution Generated Mobile Client 13-30 refers to any of the Native and Non Native Mobile Clients generated by the System Solution 13-1 as described in FIG. 12A. The System Solution Generated Mobile Client 13-30 contains System Solution Generated Mobile Client Functionality 13-31, which implements the desired functionality described by the Service Representation 5-1 and Business Entity Data 5-2 in FIG. 12A. The Updating Application 13-32 is a separate Application Client which comprises the same System Solution Generated Mobile Client Functionality 13-31 contained in the System Solution Generated Mobile Client 13-30 and additional Updating Functionality 13-33 capable of generating update commands to update the System Solution Generated Mobile Client 13-30.

Figure 13D:
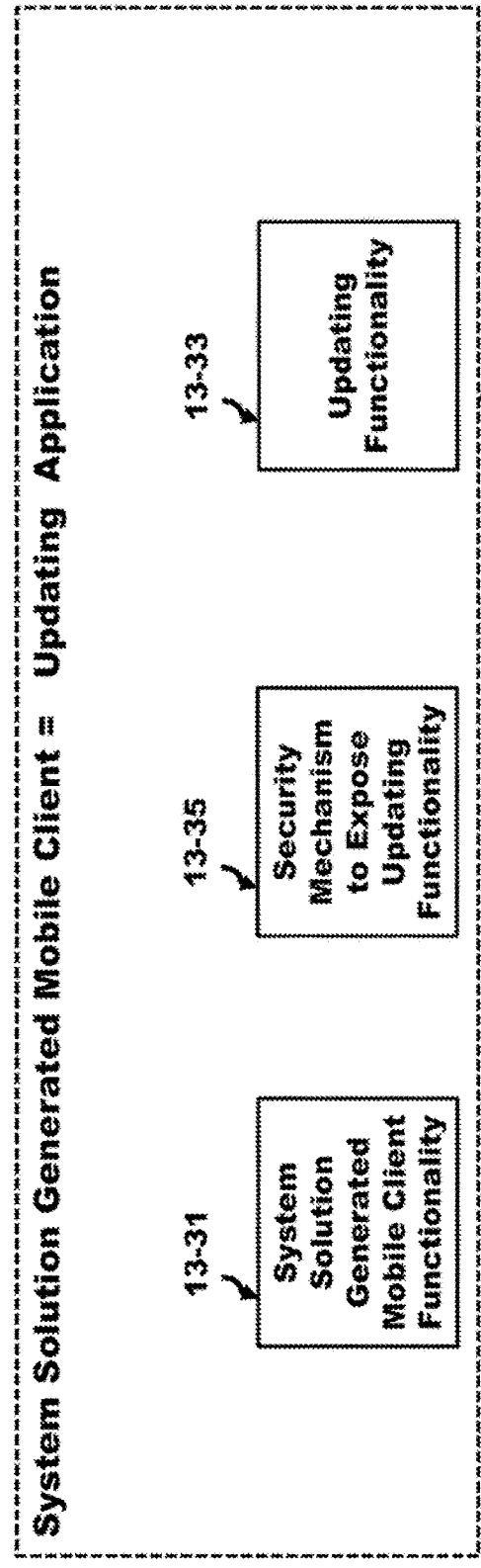
FIG. 13D illustrates a System Solution Generated Mobile Client equal to a corresponding Updating Application, with the updating functionality exposed by a security mechanism in accordance with the present invention.

FIG. 13D presents an alternative Single Structure 13-34 of an Application Client generated by the System Solution 13-1. In this case, there is a single Application Client which can operate both as the System Solution Generated Mobile Client 13-30 and the Updating Application 13-32. In other words, the System Solution Generated Mobile Client and the Updating Application are both contained in a single Application Client. The Single Structure 13-34 contains both the System Solution Generated Mobile Client Functionality 13-31 and the Updating Functionality 13-33. A Security Mechanism to Expose Updating Functionality 13-35 exposes the Updating Functionality 13-34 to the Managers and employees of the Business Entity 4-1. For example, the Security Mechanism to Expose Updating Functionality 13-35 may comprise a username and password. Only the managers with knowledge of the correct username and password can access the Updating Functionality 13-34. In this way, the same Application Client can be used by the customers of the Business Entity 4-1, who can only access the System Solution Generated Mobile Client Functionality 13-31 and by the employees of the Business Entity 4-1, who can access both the System Solution Generated Mobile Client Functionality 13-31 and the Updating Functionality 13-33. Note that in this configuration, the Combined Structure 13-34 which is created by the System Solution 13-1 as described in FIG. 12A is an Application Client capable of creating and updating itself.

Figure 13E:
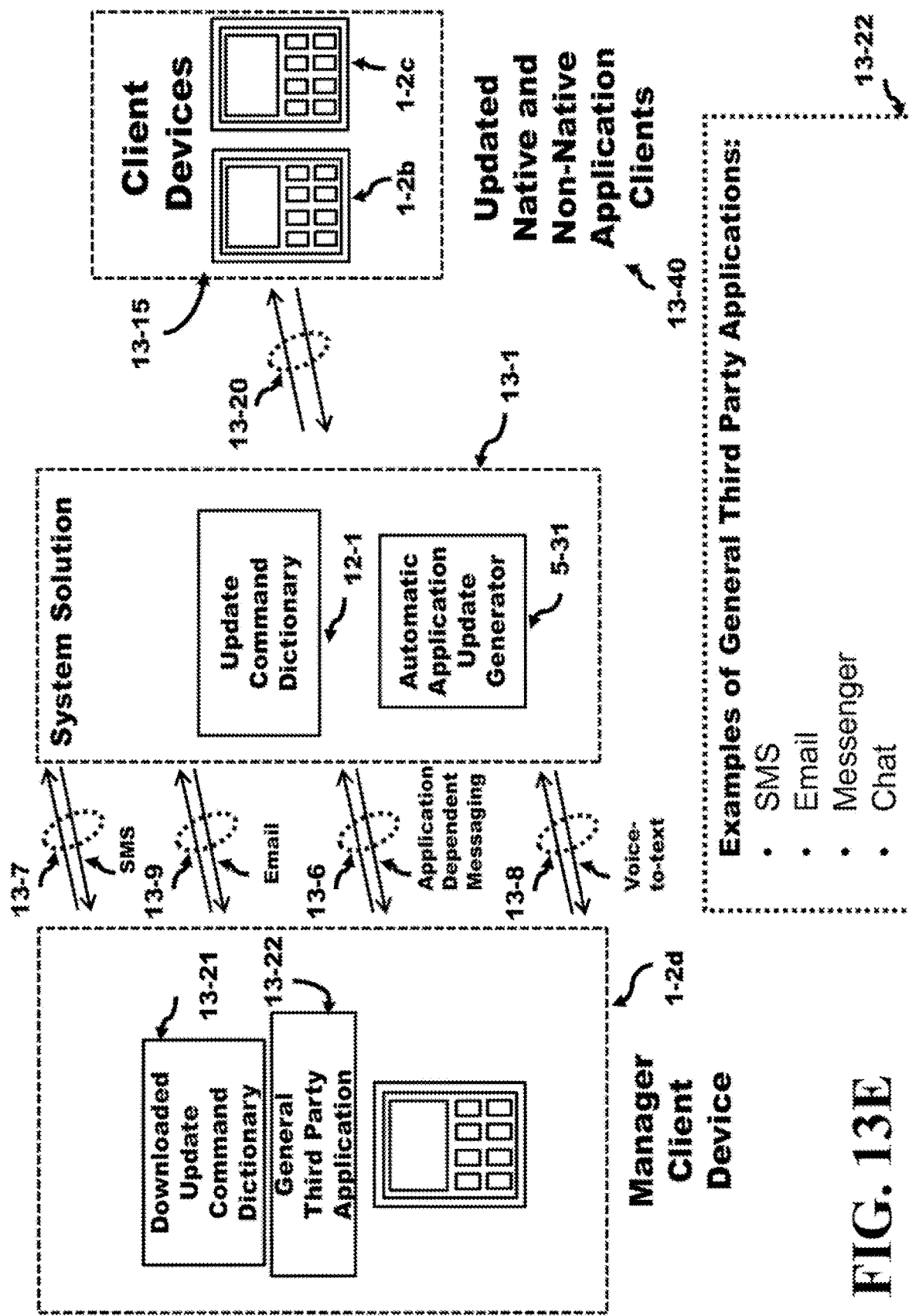
FIG. 13E illustrates a Manager Client Device running a General Third Party Application and containing a Downloaded Update Command Dictionary and communicating with a System Solution containing an Automatic Application Update Generator and an automatically generated Update Command Dictionary to update Native and Non-Native Application Clients running on Client Devices in accordance with the present invention.

FIG. 13E illustrates how the Update Command Dictionary 12-1 can be used in a Manager Client Device 1-2d to use a General Third Party Application 13-22 to generate the Updated Native and Non-Native Application Clients 13-40 generated by the System Solution 13-1 and running on Client Devices 1-2b to 1-2c in the set of Client Devices 13-15 coupled with the System Solution 13-1. A Downloaded Update Command Dictionary 13-21, which is a copy of the Update Command Dictionary 12-1, is downloaded to the Manager Client Device 1-2d. The download may consist of transferring a corresponding file from a server to the Manager Client Device 1-2d or sending an email to the Manager Client Device 1-2d. The Manager Client Device 1-2d is coupled to the System Solution 13-1 via a communication mechanism. The communication mechanism is typically dependent on the General Third Party Application 13-22 used on the Manager Client Device 1-2d. Examples of General Third Party Applications 13-22 are also shown in FIG. 13E. Examples comprise SMS Applications, Email Applications, Messenger Applications and Chat Applications. These types of applications are typically found in most smartphones and mobile devices. For example, a SMS application is coupled to the System Solution 13-1 via a SMS communication mechanism 13-7, an email application is coupled to the System Solution via an email communication mechanism 13-9, a voice-to-text application is coupled to the System Solution via a voice-to-text communication mechanism 13-8, and other applications may be coupled to the System Solution 13-1 via Application Dependent Messaging 13-6. In turn, the System Solution is set of Client Devices via a communication mechanism 13-20.

Figure 13F:
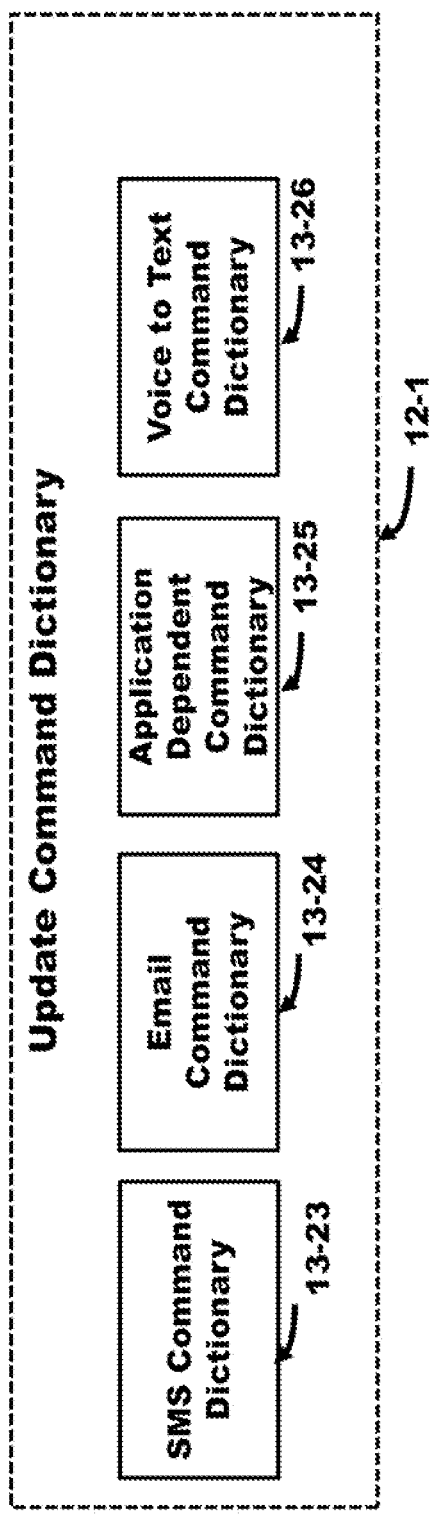
FIG. 13F illustrates examples of Update Command Dictionaries to work with different general third party applications in accordance with the present invention.

FIG. 13F presents examples of Update Command Dictionary 12-1 to be used with different General Third Party Applications. Typically, the Update Command Dictionary is dependent on the General Third Party Application used. For example, a SMS Command Dictionary 13-23 is used with a SMS Third Party Application, an Email Command Dictionary 13-24 is used with an Email Third Party Application, an Application Dependent Command Dictionary 13-35 is used with a specific Third Party Application, and a Voice to Text Command Dictionary 13-26 is used with a Voice to Text Third Party Application.

Figure 14A:
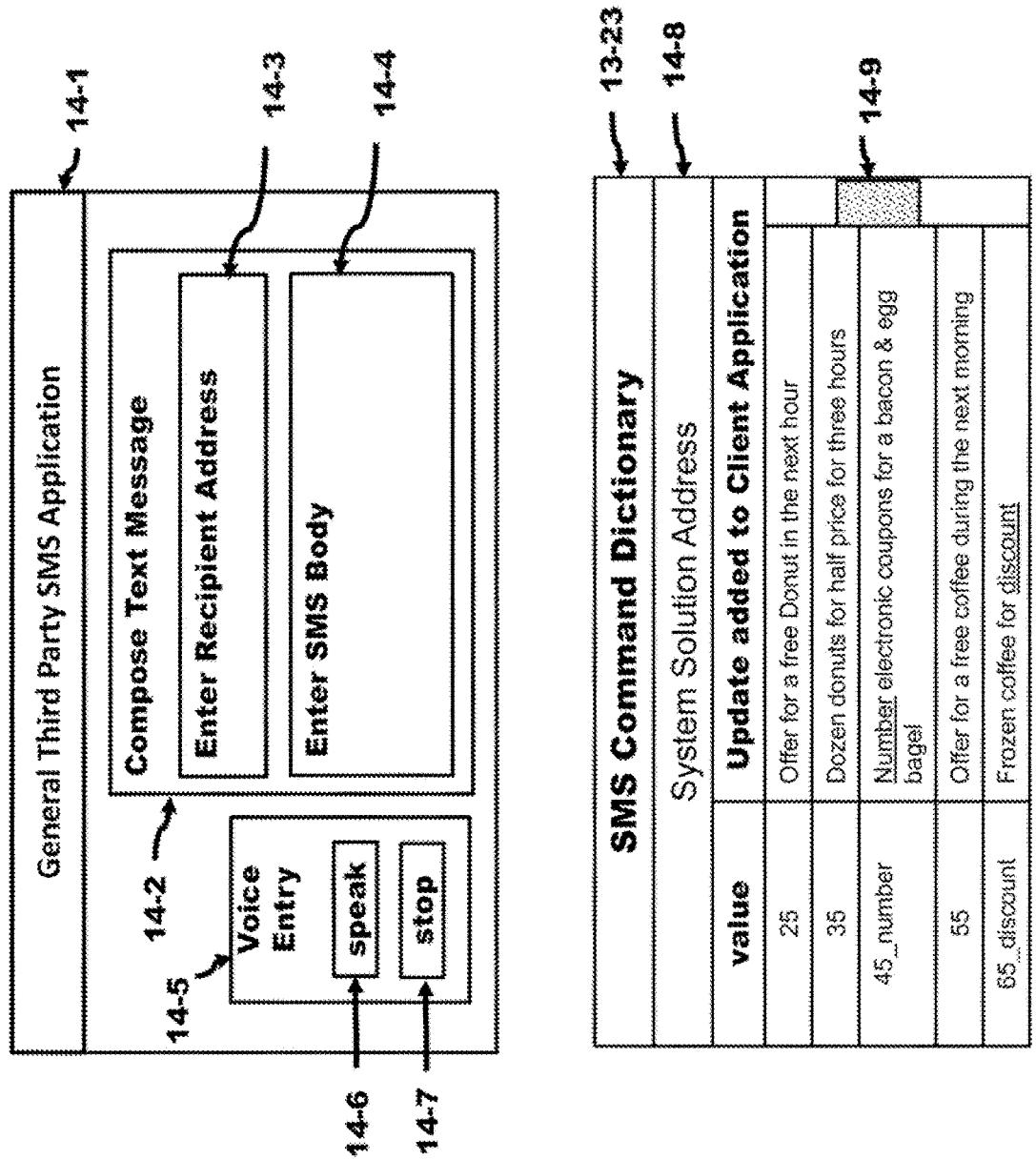
FIG. 14A illustrates a General Third Party SMS Application which allows entry of a text message and presents a SMS Command Dictionary that shows update commands in accordance with the present invention.

FIG. 14A depicts as an example the use of a General Third-Party SMS Application 14-1 to send Update Commands to the System Solution 13-1 in order to change the Native and Non-Native Mobile and Non-Mobile Application Clients generated by the System Solution 13-1. Third-party short messaging or SMS applications are available on most smartphones, tablets, and other mobile devices. The Manager or employee of the Business Entity 4-1 can use the SMS communication mechanism 13-7 which is a feature typically available on cellular network to send short messages containing Update Commands to the System Solution. The SMS communication mechanism 13-7 communicates with the Short Messaging Service Center (SMSC) 13-4, which in turn may relay the cellphone signal to the Internet via a communication mechanism 13-5. The message is sent to the Message Processing Server 13-14 which is part of the System Solution 13-1. Similarly, the same Update Commands can be generated by the smartphone or any mobile device which has a voice to text translator. Depending on the General Voice-to-Text Third-Party Application used, the voice to text communication mechanism 13-8 may be sent as text by the smartphone to the SMSC 13-4 or may be sent directly to the Internet 1-3, and from there eventually reaches the System Solution 13-1. Another possibility is to use an email application, which is also commonly found in a smartphone, table, or any other mobile device and use the email communication mechanism 13-9 to send the Update Commands to the System Solution 13-1 as email messages.

FIG. 14A depicts a General Third Party SMS Application 14-1 which comprises a display interface to Compose Text Message 14-2 that may be presented on a smartphone, tablet or an equivalent mobile device. The Compose Text Message 14-2 provides a display interface to Enter Recipient Address 14-3 and a display interface to Enter SMS Body 14-4. The General Third Party SMS Application may also include a Voice Entry 14-5 interface, to generate a SMS from a voice command, which may comprise a speak 14-6 and a stop 14-7 button. Different General Third Party SMS Applications 14-1 would have different layouts of the display interface and may have different features to enter and create the SMS message.

The General Third Party SMS Application 14-1 is available on the Manager Client Device 1-2d. By using a downloaded SMS Command Dictionary 13-23, the Manager can use the General Third Party SMS Application 14-1 to generate and send Update Commands to the System Solution 13-1 using the SMS Communication Mechanism 13-7. The SMS Command Dictionary 13-23 contains the System Solution Address 14-8, which is the phone number or short code that should be entered in the Enter Recipient Address 14-3 display interface in order to generate a SMS destined to the System Solution. The SMS Command Dictionary 13-23 may contain a scrollable table 14-9. Each row in the scrollable table 14-9 contains the format and values to generate a specific Update Command. In other words, each row in the scrollable table defines the syntax of the corresponding Update Command. Each row in the SMS Command Dictionary also contains an explanation of the Update Command, so the Manager can choose the desired Update Command and generate the corresponding SMS. For example, the table contains a value that should be entered in the Enter SMS Body 14-4 display interface to generate a specific Update Command. The Update Command may also require additional parameters that should be entered in the Enter SMS Body 14-4 display interface to generate the specific Update Command. Alternatively, the value that specifies the Update Command may be in the form of a phone number or a short code that should be entered in the Enter Recipient Address 14-3 display interface, and the corresponding parameters, if any, should be entered in the Enter SMS Body 14-4 display interface. For example, the numerical value "25" when sent in the body of a SMS, is the equivalent of typing out the Update Command "Generate Offer for a free donut in the next hour." Similarly, "45_number" when sent in the body of a SMS, where number can be replaced by a numerical value, is the equivalent of "Generate offer for 2 electronic coupons for a bacon and egg bagel" where the numerical value 2 was substituted for "number." Similarly, "65_discount" when sent in the body of a SMS, where discount can be replaced by a numerical value, is the equivalent of "Generate offer for $1 off the price of a frozen coffee" where the numerical value 1 was substituted for "discount." Once the SMS is generated and sent to the System Solution 13-1, the System Solution 13-1 uses the Automatic Application Update Generator 5-31 to update the Native and Non-Native Application Clients running on the Client Devices 1-2b to 1-2c used by the customers of the Business Entity 4-1.

Figure 14B:
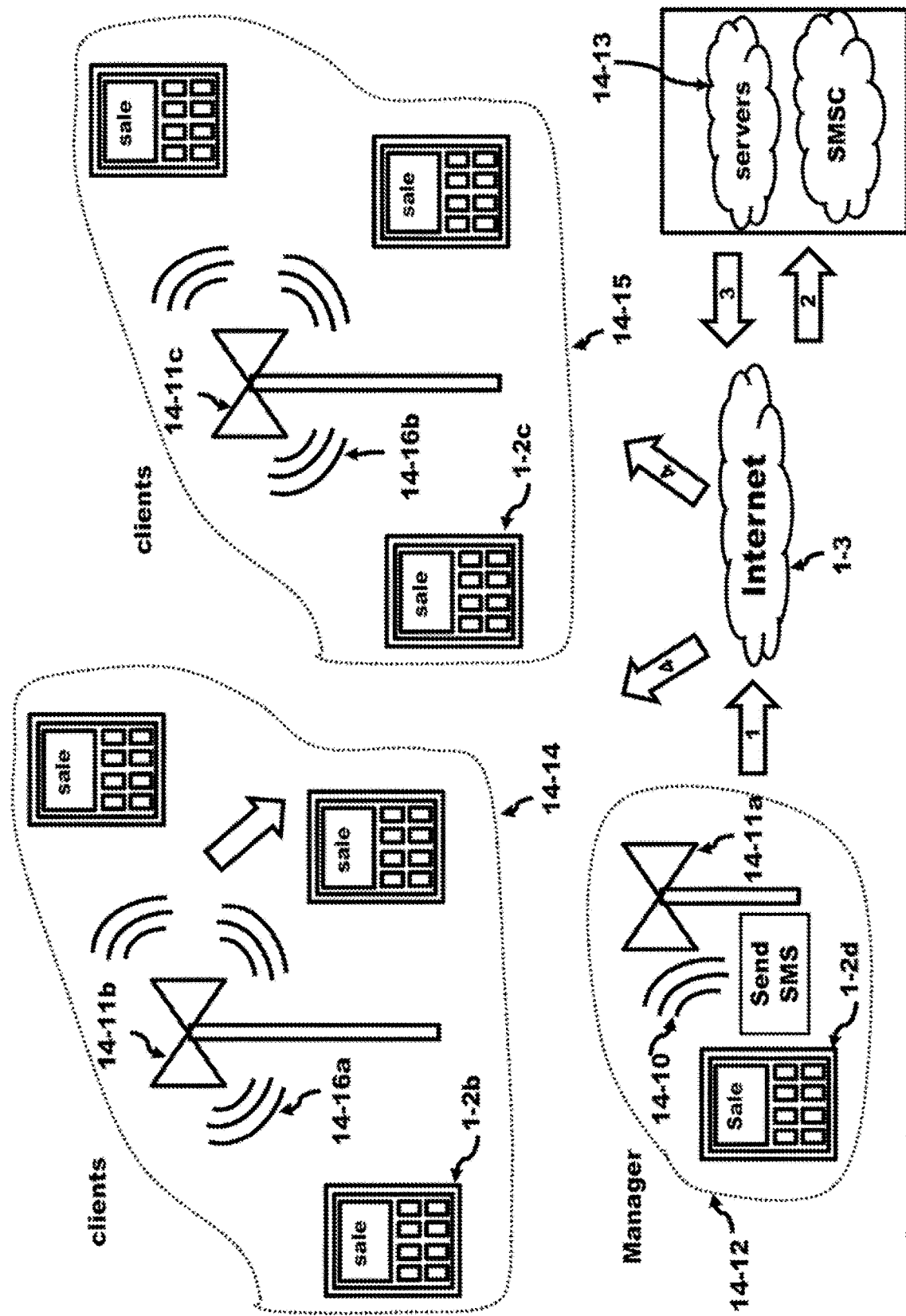
FIG. 14B illustrates a Manager Client Device sending SMS to update Application Clients running on Client Devices attached to the Internet in accordance with the present invention.

FIG. 14B presents one embodiment of coupling the Manager Client Device 1-2d of a Business Entity to their Clients (for example, 1-2b and 1-2c) via a communication network. The communication network comprises an Internet 1-3 coupled to base stations 14-11 to 14-11c. The manager 1-2d in region 14-12 sends 14-10 an SMS which is received by the base station 14-11a. The base station transfers (arrow 1) the SMS via the Internet 1-3 to the SMSC and eventually to the System Solution servers 14-13. The System Solution servers may generate the Updated Dynamic Layer or dynamically generate the Page Surfaces of the Application Clients and sends (arrow 3) the update and information through the Internet 1-3 to regions 14-14 and 14-15. The base station in these two regions receive the Updated Dynamic Layer or Updated Page Surfaces and respectively downloads 14-16a them to all the Client Devices 1-2b in region 14-14 and downloads 14-16b them to all the Client devices in region 14-15.

Figure 15:
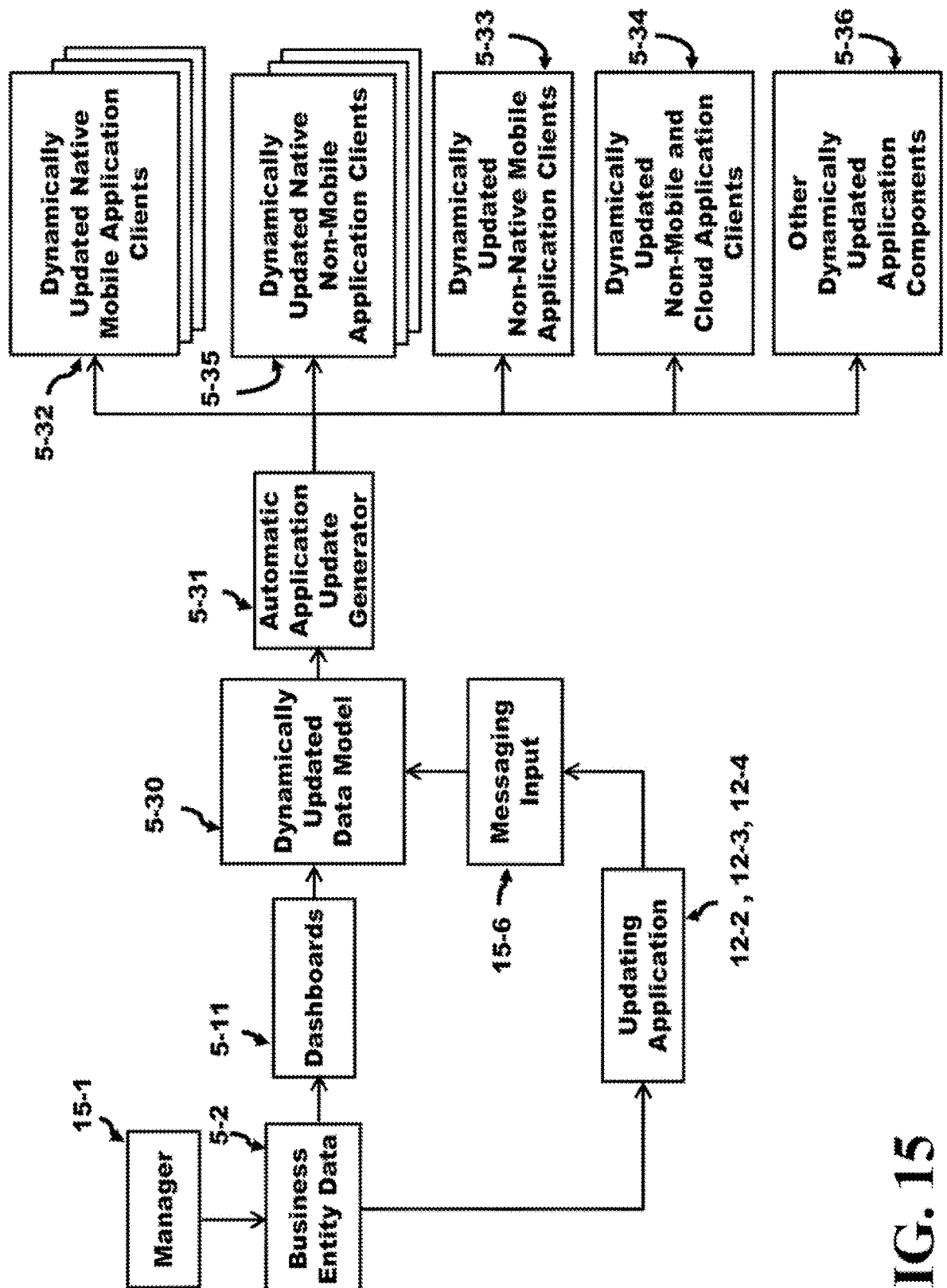
FIG. 15 shows an Update Application sending messaging input to a System Solution to dynamically update Native and Non-Native Application Clients in accordance with the present invention.

FIG. 15 presents how the Updating Application 12-2, 12-3, 12-4 is used in the flow that the System Solution uses to generate dynamically Updated Native and Non-Native Application Clients. In a preferred embodiment, the Business Entity 4-1 can generate dynamically Updated Native and Non-Native Application Clients using the newly created Updating Applications 12-2, 12-3, 12-4 (when smartphones or their equivalent are available) or using the previously described Dashboards 5-11 (when desktop computers are available), although other embodiments can be possible, for example, the desktop can use an Updating Application to create updated applications. The Updating Applications 12-2, 12-3, 12-4 that are automatically created in FIG. 12A are used by the Business Entity 4-1 to add, delete, or modify content, features, and services contained in the Dynamic Layer of the Two-Layer Native Application Clients and replace the existing set of Dynamic Layers in the Client Devices 1-2. This is illustrated by new path introduced by the Updating Application 12-2, 12-3, 12-4 that couples the Business Entity Data 5-2 to the Dynamically Updated Data Model 5-30. The System Solution allows the Business Entity 4-1 to modify the Data Model 5-4 and generate new Dynamic Layers via the Updating Application 12-2, 12-3, 12-4. The Updating Applications 12-2, 12-3, 12-4 generate Messaging Input 15-6 that contains Update Commands. The Messaging Input 15-6 is processed by the System Solution 13-1 and used to generate the Dynamically Updated Data Model 5-30. The Updating Applications 12-2, 12-3, 12-4 allow the Business Entity 4-1 to have control of what the Business Entity wants to present to their Customers. This is an Application (installed on the Manager's Client device) that manages another Application (by installing new Page Surfaces on the Client Devices of their Clients or by Dynamically updating the Dynamic Layer of the two Layer Application Client).

The Business Entity 4-1 using the Updating Application 12-2, 12-3, 12-4 generates the Dynamically Updated Data Model 5-30 which is then applied to the Automatic Application Update Generator 5-31 which is a sub-set of the Automatic Application Generator 5-5. The output of the Automatic Application Update Generator 5-31 generates a set of Dynamically Updated Native Mobile Application Clients 5-32, a set of Dynamically Updated Native Non-Mobile Application Clients 5-35, Dynamically Updated Non-Native Mobile Application Client 5-33, Dynamically Updated Non-Mobile and Cloud Application Clients 5-34 and Other Dynamically Updated Application Components 5-36. The set of Dynamically Updated Native Mobile Application Clients 5-32 and the set of Dynamically Updated Native Non-Mobile Application Clients 5-33 are the updated Dynamic Layers of the corresponding Two-Layer Native Application Clients 6-6. Once this sequence has been established, the Business Entity can manipulate the Business Entity Data 5-2 applied to the Update Applications 12-2, 12-3, 12-4 or the Dashboards 5-11 which can continuously and automatically update the various Application Clients that this particular system generates.

Figure 16:
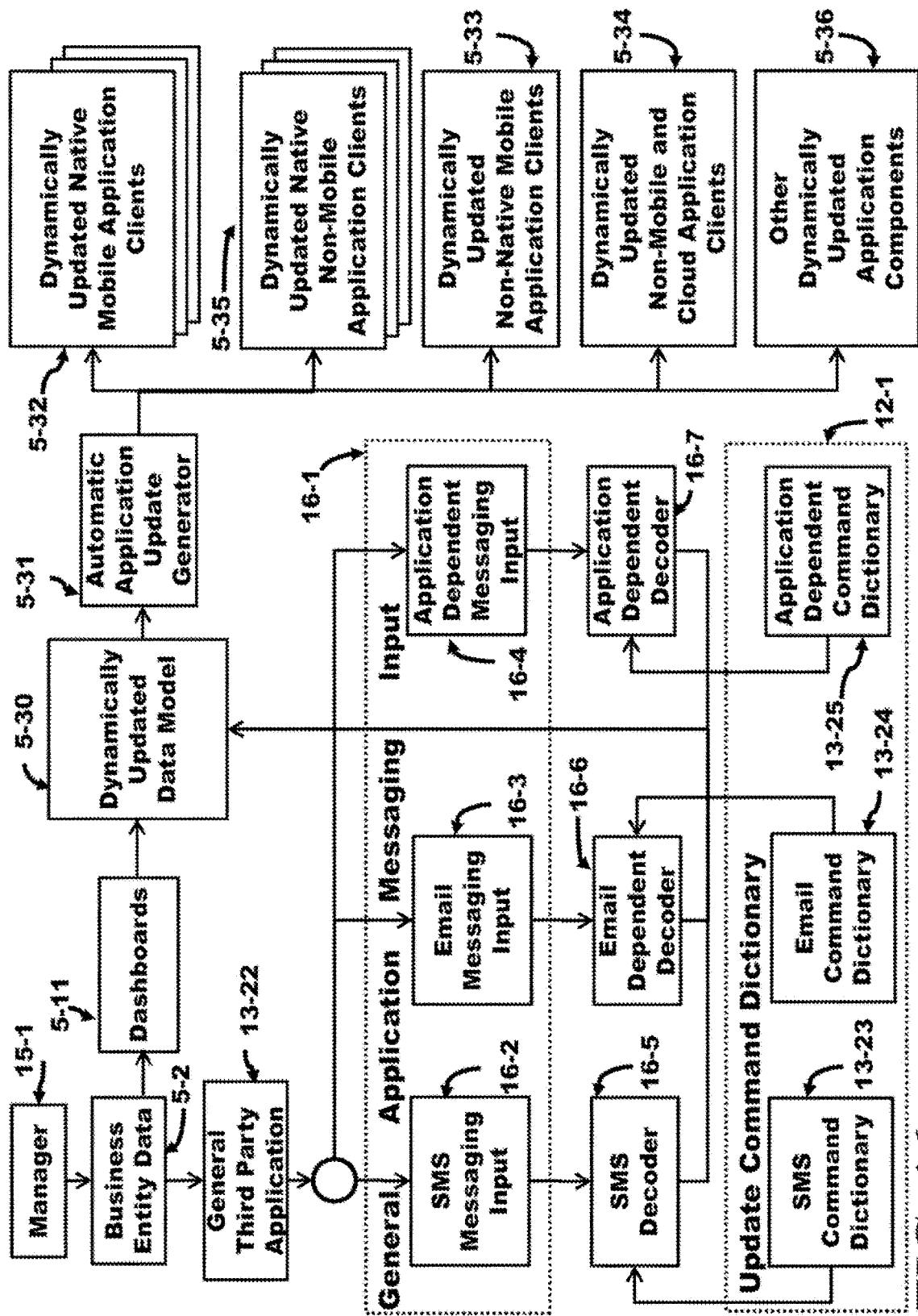
FIG. 16 shows a General Third Party Application sending different types of messaging inputs to a System Solution containing a corresponding Command Dictionary and a corresponding Decoder to dynamically update Native and Non-Native Application Clients in accordance with the present invention.

FIG. 16 presents how a General Third Party Application 13-22 in conjunction with an Update Command Dictionary 12-1 is used in the flow that the System Solution uses to generate dynamically Updated Native and Non-Native Application Clients. The Business Entity 4-1 can generate dynamically Updated Native and Non-Native Application Clients using General Third Party Application 13-22 in conjunction with an Update Command Dictionary 12-1 (when smartphones or their equivalent are available) or using the previously described Dashboards 5-11 (when desktop computers are available) to add, delete, or modify content, features, and services contained in the Dynamic Layer of the Two-Layer Native Application Clients and replace the existing set of Dynamic Layers in the Client Devices 1-2. This is illustrated by new paths introduced by the General Third Party Application 13-22 that couples the Business Entity Data 5-2 to the Dynamically Updated Data Model 5-30. The specific path followed depends on the General Third Party Application 13-22 used. The General Third Party Application 13-22 generates General Application Messaging Input 16-1 that contains Update Commands. For example, a General SMS Third Party Application generates SMS Messaging Input 16-2, a General Email Third Party Application generates Email Messaging Input 16-3, and a different General Third Party Application generates an Application Dependent Messaging Input 16-4. The General Application Messaging Input 16-1 is processed by the System Solution 13-1 and used to generate the Dynamically Updated Data Model 5-30. The System Solution 13-1 processes the General Application Messaging Input 16-1 using a Decoder and an Update Command Dictionary 12-1 corresponding to the specific messaging input received. For example, the SMS Messaging Input 16-2 is processed using the SMS Command Dictionary 13-23 and the SMS Decoder 16-5, the Email Messaging Input 16-3 is processed using the Email Command Dictionary 13-24 and the Email Decoder 16-6, and the Application Dependent Messaging Input 16-4 is processed using the Application Dependent Command Dictionary 13-25 and the Application Dependent Decoder 16-7. Once the General Application Messaging Input 16-1 is decoded and the Update Command is processed by the System Solution 13-1, the System Solution generates the Dynamically Updated Data Model 5-30 to execute the desired Update Command.

The Business Entity 4-1 using the General Third Party Application 13-22 and Update Command Dictionary 12-1 generates the Dynamically Updated Data Model 5-30 which is then applied to the Automatic Application Update Generator 5-31 which is a sub-set of the Automatic Application Generator 5-5. The output of the Automatic Application Update Generator 5-31 generates a set of Dynamically Updated Native Mobile Application Clients 5-32, a set of Dynamically Updated Native Non-Mobile Application Clients 5-35, Dynamically Updated Non-Native Mobile Application Client 5-33, Dynamically Updated Non-Mobile and Cloud Application Clients 5-34 and Other Dynamically Updated Application Components 5-36. The set of Dynamically Updated Native Mobile Application Clients 5-32 and the set of Dynamically Updated Native Non-Mobile Application Clients 5-33 are the updated Dynamic Layers of the corresponding Two-Layer Native Application Clients 6-6. Once this sequence has been established, the Business Entity can manipulate the Business Entity Data 5-2 applied the General Third Party Application 13-22 and Update Command Dictionary 12-1 or the Dashboards 5-11 which can continuously and automatically update the various Application Clients that this particular system generates.

Validation procedures are required to insure that the Manager did not enter an erroneous Update Command or erroneous numerical values or parameters when it generated the Update Command using either the Updating Applications 12-2, 12-3, 12-4 or the General Third Party Application 13-22 and Update Command Dictionary 12-1. The validation procedure can be performed at the Manager Client Device 1-2*d*, at the Message Processing Server 13-14 which is part of the System Solution 13-1, or both.

Figure 17:
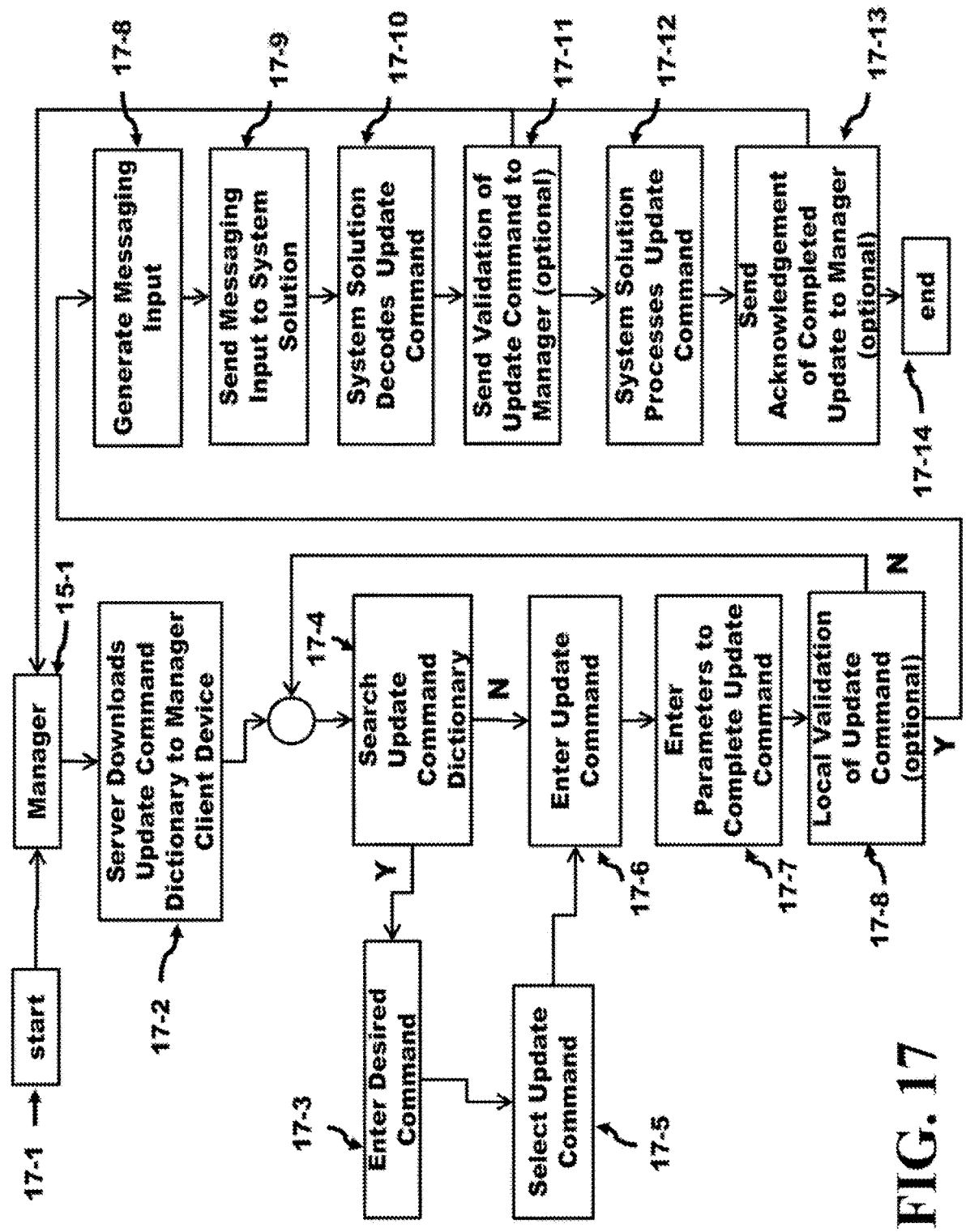
FIG. 17 illustrates how the Update Command Dictionary is used by a manager to generate messaging input and communicate with a System Solution to dynamically update Native and Non-Native Application Clients in accordance with the present invention and the procedures to validate the correctness of the update commands.

FIG. 17 illustrates an embodiment of a flowchart of the process that enables the Manager to use a General Third Party Application 13-22 and an Update Command Dictionary 12-1 to dynamically update the Native and Non-Native Application Clients generated by the System Solution 13-1. This flow also contains the validation procedures to verify the correctness of the Manager's input. The Manager Client Device 1-2*d* starts 17-1 and the Server Downloads Update Command Dictionary to Manager Client Device 17-2. The Update Command Dictionary 12-1 can be downloaded to the Manager Client Device 1-2*d* as a file downloaded to the device, or it can be simply sent to the Manager 15-1 as an email or other form of message. This Downloaded Update Command Dictionary 13-21 may be presented to the Manager 15-1 via the display interface in the Manager Client Device 1-2*d*. If the Manager 15-1 does not know the syntax to generate the desired Update Command, the Manager 15-1 performs a Search Update Command Dictionary 17-4 through the steps of Enter Desired Command 17-3 in the dictionary and Select Update Command 17-5 from the possible Update Commands in the Downloaded Update Command Dictionary 13-21. Once the Manager 15-1 learns the syntax to generate the desired Update Command, the Manager 15-1 generates the corresponding message containing the Update Command by performing the step Enter Update Command 17-6. If the desired Update Command requires to enter additional parameters, the Manager 15-1 also performs the step Enter Parameters to Complete Update Command 17-7. For example if a General SMS Third Party Application is used, a corresponding SMS containing the Update Command with the required parameters is generated. At this point, validation of the correctness of the Manager 15-1 input may be performed locally in the Manager Client Device 1-2*d* by performing the Local Validation of Update Command (optional) 17-8 step. For example, this step may consist of a message presented to the Manager 15-1 that show the generated Update Command and asking the Manager 15-1 to validate its correctness. If the Manager 15-1 finds an error, the Manager 15-1 may modify the Update Command by going back to step 17-4 or 17-6 (this latter path is not shown). If the Manager 15-1 validates the correctness of the Update Command, the Generate Messaging Input 17-8 step and the Send Messaging Input to System Solution 17-9 are performed.

Once the System Solution 13-1 receives the Messaging Input, it processes it as described in FIG. 16 by performing the System Solution Decodes Update Command 17-10 step. The System Solution may also send additional validation messages to the Manager 15-1 to further validate the correctness of the Update Command by performing the Send Validation of Update Command to Manager (optional) 17-11. The validation messages may consists of SMS, emails, or other forms of messages. Then, the System Solution implements the desired update by performing the System Solution Processes Update Command 17-12 step. In this step, the System Solution 13-1 generates the Dynamically Updated Data Model 5-30 and uses the Automatic Application Update Generator 5-31 to generate the dynamically updated Native and Non-Native Application Clients reflecting the desired Update Command. Once the System Solution 13-1 completes the execution of the desired update, it may send an acknowledgement to the Manager 15-1 by optionally perform the Send Acknowledgment of Completed Update to Manager (optional) 17-13. In this way, the Manager 15-1 is made aware that the desired Update Command has been executed. The acknowledgment may consist of SMS, emails, or other forms of messages. The process ends at 17-14.

Finally, it is understood that the above descriptions are only illustrative of the principle of the current invention. Various alterations, improvements, and modifications will occur and are intended to be suggested hereby, and are within the spirit and scope of the invention. This invention can, however, be embodied in many different forms and should not be construed as limited to the embodiments set forth herein. Rather, these embodiments are provided so that the disclosure will be thorough and complete, and will fully convey the scope of the invention to those skilled in the arts. It is understood that the various embodiments of the invention, although different, are not mutually exclusive. In accordance with these principles, those skilled in the art can devise numerous modifications without departing from the spirit and scope of the invention. According to one general aspect of this invention, a computer system may include instructions recorded on a computer-readable medium.

According to another general aspect, a computer program product may be tangibly embodied on a computer-readable medium and may include executable code that, when executed, is configured to cause a data processing apparatus to generate at the updated applications and executables required. Any memory may also be another form of computer-readable medium, such as a magnetic or optical disk. A computer program product can be tangibly embodied in an information carrier. The information carrier is a computer- or machine-readable medium, such as the memory, the storage device, or memory on processor. The computer program product may also contain instructions that, when executed, perform one or more methods, such as those described above. These computer programs (also known as programs, software, software applications or code) include machine instructions for a programmable processor, and can be implemented in a high-level procedural and/or object-oriented programming language, and/or in assembly/machine language. As used herein, any computer program product, apparatus and/or device (e.g., magnetic discs, optical disks, memory, Programmable Logic Devices (PLDs)) can be used to provide machine instructions and/or data to a programmable processor, including a machine-readable medium that receives machine instructions as a machine-readable signal. The term "machine-readable signal" refers to any signal used to provide machine instructions and/or data to a programmable processor. It will be understood that the System Solution may include any combination of hardware and/or software suitable for performing one or more tasks described elsewhere herein, e.g., one or more central processing units (CPUs) or microprocessors and optional memory configured to execute one or more tasks of creating the various executables (Applications, Servers, etc.) of the System Solution as they have been described herein. It is understood that data can also be communicated in the opposite direction, in which case transceiver will be the transmitting transceiver and transceiver the receiving transceiver. Furthermore, a network and a portable system can exchange information wirelessly by using communication techniques such as Time Division Multiple Access (TDMA), Frequency Division Multiple Access (FDMA), Code Division Multiple Access (CDMA), Orthogonal Frequency Division Multiplexing (OFDM), Ultra Wide Band (UWB), Wi-Fi, WiGig, Bluetooth, etc. The network can comprise the phone network, IP (Internet protocol) network, Local Area Network (LAN), ad hoc networks, local routers and even other portable systems. In addition, the term "Mobile Client Device" can be used for mobile devices such as cellphone, tablets, etc. "Non-Mobile Client Device" can be used for non-mobile devices such as desktops. "Cloud Client Device" can be used for the device formed in the Cloud. At other instants the term "Client Device" can imply either the "Mobile Client Device," "Non-Mobile Client Device" or "Cloud Client Device." The name of many of the blocks in the figures describes the functionality, behavior, or operation of the block. It is also understood that an application running on a client device can be replaced transparently (while the application is running) with some or all of an updated application.

The elements of the following glossary can include any additional content in the specification not hereinafter captured. The U.S. patent application Ser. No. 13/833,589 titled "Apparatus for Single Workflow for Multi-Platform Mobile Application Creation and Delivery", U.S. patent application Ser. No. 13/833,669 titled "Method for Single Workflow for Multi-Platform Mobile Application Creation and Delivery" and the U.S. patent application Ser. No. 13/833,775 titled "Dynamic User Interface Delivery System" all filed on Mar. 15, 2013, are incorporated in reference in their entirety.

Glossary of Terms

Analytics consists of functionality to collect and process analytics data on consumer engagement and usage in the Application Clients and transmit that data to the Application Server, and functionality to store and process analytics the received analytics data in the Application Server.

Application (APP) is a computer program that runs on a Client device.

Application Server is a logic and data structure which uses a number of basic server functional blocks to implement the required functionality. A server is a sub-set representation of a Computer hardware, which can contain software and a database. Application store is a site that where APPS are be submitted, approved, available for client device use.

Automatic Application Generator extracts the data from the Data Model which is now well structured and in known memory positions and automatically creates a plurality of Application Components. The Automatic Application Generator uses the data according to the Service Representation desired by the Business Entity to generate the desired Application.

Automatic Application Server Generator generates the Application Servers where the final output of the generator is the Retailer Application Server Logic, the Retailer Application Server Database, the Consumer Application Server Logic, the Consumer Application Server Database and the Automatic Dashboard Generator. The Automatic Application Server Generator contains Server Functional Blocks and a Server Orchestration Controller that applies the final output to the Server Generator.

Automatic Application Update Generator is a sub-set of the Automatic Application Generator. The output of the Automatic Application Update Generator generates sets of all Updated Clients (Native, Non-native, non-mobile and cloud) and an Updated Searchable Application Representation. Is used by the Business Entity to manipulate the business data applied to the Dashboards and continuously and automatically update the various Application Clients.

Automatic Client Generator uses the Client Data Model to generate the Application Client which is used to create the Native Client Translation and Generator.

Automatic Dashboard Generator uses the Common Data Model 16-23 to generate the Dashboards. The Automatic Dashboard Generator contains a Dashboard Widget which feeds into a Dashboard Generator Controller. The output of the Dashboard Generator Controller and the output of the Dashboard UI Generator Controller are applied to the Dashboard Generator. The output of the Dashboard Generator generates the Dashboards Automatic Data Model Generator places the widely varying and random data positioning from any Business Entity into a well-defined Data Model. The random data positioning of the Service Representation selected by the Business Entity and the Business Entity Data on one side of the Data Model is translated into a well-defined memory structure on the other side of the Data Model. The Automatic Data Model Generator analyzes the information from the Business Entity Data and the Service Representation and segments the information automatically into memory into pre-arranged slots. The output of the Automatic Data Model Generator with a well formatted memory structure is used to create the Data Model. The Automatic Data Model Generator identifies the blocks that are used by each Service. The Automatic Data Model Generator goes over the list of Configuration Parameters and determines the Input Method by looking at Service Integration Points, and Service Presentation (note that Presentation Templates defines which parameters can be entered via the Dashboards). The Automatic Data Model Generator determines the Dynamic Property by looking at Service Features. The Dynamic Property defines when the value for the parameter is entered and when it can (or cannot) be changed.

Basic Server Functional Blocks provide functions related to servers in terms of management, filtering, synchronization, statistics, likelihood, etc. and help the Automatic Application Server Generator to generate the Application Servers. Some examples include: personalization management, Multi-Platform Synchronization, Two-Way Communications, Image Recognition, etc. The Basic Server Functional Blocks are used to help the Automatic Application Server Generator to generate the Application Servers.

Business Account and Business Profile comprises the Business Account and the Business Profile. The Business Account is used to store information in the System Solution Database regarding the Business Entity as a customer of the System Solution, such as management, billing, and sales information. The Business Profile stores relevant Business Entity Data and all the information relevant to run the Services provided by the Business Entity and implemented in the Application.

Business Entity is a System Solution customer. Examples of Business Entities are: retailers, manufacturers, schools, museums, franchises, and individuals.

Business Entity Data contains specific data pertaining to the Business Entity that is relevant to run the Services implemented in the Application. Examples of Business Entity Data are inventory, locations of stores, price of goods, etc.

Business Objectives is self-explanatory and are objectives of the business entity.

Business Portal includes a number of interfaces for the Business Entity to view the processed Analytics Data and for the Business Entity to enter Business Data and manage its Business Profile.

It also includes interfaces for the Business Entity to access the Web and Mobile Dashboards and other tools that the Business Entity uses to manage, monitor, and update the Services implemented in its Application. The Business Portal also includes interfaces for the Business Entity to manage its Searchable Application Representation. The Business Portal used by the Business Entity handles: sales, marketing, customer service and support, appointments, analytics, feedback, and other customer facing tasks.

Client device is a hardware device with an operating system and embedded software. Client device are partitioned into Native Mobile Clients, Non-Mobile and Cloud Application Clients, and Non-Native Mobile Application Clients.

Client Data Model includes several structures: Functional Description, Configuration Parameters, Integration Point Parameters and Presentation Attributes. The Client Data Model is the portion of the Data Model that is relevant for the generation and operation of the Application Clients.

Client/Server Protocol is a communication mechanism between the Application Client and the Application Server.

Cloud Application Client can be in the Cloud, but in this case the Client Device is a "virtual" Client Device. The "virtual" Client Device has a way to provide access to the Application Client running in the cloud via a physical Client Device. The Cloud can run a portion of the Application Client in the server while the remaining portion of the Application Client can run on the client, simultaneously. In this regard, the server becomes a client/server system within the network.

Common Data Model includes several structures: Functional Description, Configuration Parameters, Integration Point Parameters and Presentation Attributes.

Configuration Parameters is a list of all the Parameters: (Name, Type and Value), (Input Method), and (Dynamic Property). These are needed to implement the selected Flavor(s) and Features. Each configuration Parameter is described by (Name, Type and Value) which are derived from the Service Configuration. Service Configuration depends on Service Features and Service Flavors. Type specifies the format of the parameter and whether the parameter is an input (i.e., a value needs to be entered for that Parameter) or an output (i.e., a value is generated and displayed for that Parameter by the Service). The (Input Method) for each Parameter specifies how (and by whom) the parameter value is entered. The value can be entered via a Service Integration Points, or via a Service Internal Interfaces, or via a Dashboard, or by the End User via the Application Client, or be derived by the Business Entity Data. The Automatic Data Model Generator goes over the list of Configuration Parameters and determines the Input Method by looking at Service Integration Points, and Service Presentation (note that Presentation Templates defines which parameters can be entered via the Dashboards). The (Dynamic Property) defines when the value for the parameter is entered and when it can (or cannot) be changed. The Automatic Data Model Generator determines the Dynamic Property by looking at Service Features. The Dynamic Property of a parameter can be one of: a Settings where the value has to be entered before the Service is presented to any end user (e.g., the address of a store for a Service that should be offered only in that store); or an Initialization where the value has to be entered before the Service is presented to a specific End User (e.g., the barcode identifying a specific consumer in an Electronic Loyalty Card Run Time); or a value can be entered at any time (e.g., the data describing a new Promotion) The Dynamic Property also defines whether the value can be changed and when.

Consumer Application Server supports the services presented to the users by the Mobile Application Clients, Non-Mobile Application Clients, and Cloud Clients and are hosted in a multi-tenant environment in the Cloud, but each Business Entity "feels" like it is provided dedicated Retailer and Consumer Application Servers or run on servers owned by the Business Entity. The server supports the Services implemented in the Application and presented to the consumers via all Mobile, Non-Mobile, and Cloud Clients. The server sends to the Mobile Client only incremental updates, with a "minimum" amount of information which maximizes the bandwidth usage of this interface. The Mobile Client and the Consumer Application Server follow a simple Update Strategy to update the Pages and content in the Mobile Client. The Mobile Client also follows a greedy Persistency Strategy, to keep in memory as much information as possible to be displayed while requesting for fresher copies of certain Elements and Sub-Elements. The server contains functionality to run the Application for each Business Entity and to manage the End Users (i.e., Consumers) of the Application.

Dashboards are provided and filled by the Business Entity who are the End Users of the Dashboards. The Dashboards are installed on a plurality of servers coupled to the Internet. The Business Entity using the Dashboard and Business Entity Data via the System Solution to automatically generate an Updated Data Model. The Updated Data Model and an Automatic Application Update Generator automatically generates a set of Updated Applications Clients. The newly generated Updated Application Components replace the corresponding existing Application Components. In some cases, these Updated Application Components do not need an approval from the Application Store and can be directly downloaded to Client Devices. The Updated Applications Clients include an Updated Native Mobile Application Client, an Updated Non-Native Mobile Application Client, an Updated Non-Mobile Application Client and an Updated Cloud Application Client. Each of the Updated Applications Clients are downloaded to a corresponding Client Device via a Communication network. The Dashboards are controllers and the Business Entity may use the Dashboards via a web interface running in a web browser or via a mobile interface. Such a mobile interface may simply consist of a mobile version of a web interface, or be integrated in a "management version" of the Mobile Application Client itself, or grouped in a separate tablet or smartphone application. The Dashboards can be used by the Business Entity to generate a new set of Native Mobile Application Clients containing the added, deleted, or modified content, features, and services. The Dashboards used by the Business Entity to update and recreate the features of the Native Mobile Application Clients, Non-Native Mobile Application Clients, Non-Mobile and Cloud Application Clients and the Searchable Application Representation.

Data Model has a structure that is uniform between any and all different Business Entities and the selected Services. The uniformity in the structure of the Data Model can now be capitalized. The data outputs of the Data Model presents data to the inputs of the Automatic Application Generator in a well-organized structure. The Data Model consists of the Common Data Model that couples to the Server Data Model and the Client Data Model.

Dynamic Layer does not run directly on the Operating System, but instead runs on the Native Layer by making use of software libraries and functional blocks provided in the Native Layer. The Dynamic Layer does not need to be downloaded from the Application Store, but can be downloaded directly from an Application Server that is part of the System Solution. The Dynamic Layer of the Two-Layer Native Application Client consists of the Page Surfaces of all the Pages comprised in the Two-Layer Native Application Client.

Dynamically Updated Data Model consists of functionality to collect and process analytics data on consumer engagement and usage in the Application Clients and transmit that data to the Application Server, and functionality to store and process analytics the received analytics data in the Application Server.

Dynamically Updated Native Mobile Application Clients are the updated Dynamic Layers of the corresponding Two-Layer Native Application Clients Dynamically Updated Native Non-Mobile Application Clients (set of) are the updated Dynamic Layers of the corresponding Two-Layer Native Application Clients.

Dynamically Updated (prefix) implies Mobile and Non-Mobile Clients are capable to update their content and functionality "dynamically" and efficiently, under the control of the Application Server, so as to provide a very engaging experience to the Consumers. The Dynamic architecture is designed to support "dynamic" experiences in the most efficient and responsive way possible. The objective is to enhance the Client user experience in terms of response time while maintaining the dynamic nature of portions of the Client. The structure of the Dynamic Architecture allows identifying the Elements and Sub-Elements in Pages that are most likely to change.

Functional Block Chain defines in which order the blocks should be used (if there is a hierarchy). Since the Services can be hierarchical, the Functional Description is also hierarchical. In the case of a Service that uses other Services, the Automatic Data Model Generator identifies the blocks that are used by each Service. The Functional Description consists of a series of checkmarks that identify which blocks are used and in which order (if there is a hierarchy).

Functional Description defines the functionality that needs to be provided by the Application. The Functional Description comprises the Functional Block Chain, which is the list of Basic Server Functional Blocks and Native Client Functional Blocks that need to be used by the Automatic Application Generator to generate all the components of the Application. The Functional Description is derived by the Automatic Data Model Generator from the selected Service Flavors, Service Features and Service Internal Interfaces. For every one of the Service Flavors and Service Features, there is a list in memory that defines the Functional Blocks that should be used.

Integration Point Parameters are the Configuration Parameters that are entered via Service Integration Points. Each Configuration Parameter is described by its corresponding Name, Type and Value that are derived from the Service Configuration. Service Configuration depends on Service Features and Service Flavors. The Integration Point Parameters has a corresponding Dynamic Property is derived in the same way as mentioned in Configuration Parameters. In the Integration Point Parameters, the whole Integration Interface is stored in the Data Model. For example, all the fields and formats of all the messages are in the Integration Interface of the Integration Point Parameters.

Native Application Client is an APP downloaded from the Application store unto a client device and the APP is currently unalterable and runs on the operating system of the client device.

Native Application Client is compiled to run on the Operating System of the Client Device. The Native Application Client needs to be downloaded to the Client Device and installed on the Client Device in order to run on the Client Device. The Native Application Client can be divided into a plurality of Pages. Each of the Pages can be divided into a Page Surface and a Page Foundation, and grouping all the Page Surfaces to constitute the Dynamic Layer and all Page Foundations to constitute the Native Layer of the Native Application Client. The client now contains a "native" application coupled to the Operating System of the Client Device. The Native Mobile Application Client executable depends on the Operating System (OS), for example, an iPhone would require a different executable than an Android phone.

Native Client Translation and Generator create the Native Mobile Client, the Non-Mobile and Cloud Application Clients and the Non-Native Mobile Application Clients.

Native Layer runs directly on the Operating System of the Client Device by using the system libraries that are part of the Operating System. The Operating System in turn runs on the hardware. The Native Layer is an executable that depends on the Client Device and needs to be downloaded and installed on the Client Device using an installation manager external to the Two-Layer Native Application Client. The Native Layer needs to be downloaded from the Application Store. The Native Layer of the Two-Layer Native Application Client consists of the Page Foundations of all the Pages comprised in the Two-Layer Native Application Client.

Native Mobile Application Client, examples include applications for an iPhone, a Blackberry, an Android and an iPad. A plurality of other combinations of other Application Clients is possible. The Native Application Client is currently unalterable. Once the application is downloaded and if the user of the Client Device desires a feature change in the Native Application Client, the user must go back to the application store.

Non-Mobile Application Client has the features of the other Application Client but is non-mobile.

Non-Native Application Client does not run directly on the Operating System of the Client Device, but instead uses a web browser installed on the Client Device in order to run. The Non-Native Application Client is an executable based on a programming language that is understood by a web browser running on the Client Device and runs on a browser.

Non-Native Mobile Application Client has an executable based on a programming language that is understood by a web browser running on the Client Device.

Operating System (OS) runs in the Client Device and is closely coupled with the hardware, especially in case of Mobile Client Devices. The hardware comprises at least one processor operating under the Operating System. The processor is coupled to at least one memory and at least one communication link via at least one bus. At least one communication link couples the Client Device to the outside world through a wired and/or wireless interconnection via the transceiver. The Client Device offers the user at least one mode of input and one mode of output. The Operating System provides a set of system libraries, which the Native Application Client use.

Page Foundation is part of the Native Layer and includes the Native Logic. Page Foundation cannot be changed without submitting the updated Application Client to Application Store.

Page Surface is part of the Dynamic Layer. Page Surfaces can be changed dynamically and can be changed via, at least by, the Dashboards.

Presentation Attributes comprise the Page Relationships. The User Interface in the Application Client consists of a collection of "Pages" (the notion of Page is similar to the one in a website, each Page presents a User Interface to one or more Services and the end user can navigate from one Page to another). The Presentation Template in the Service Presentation consists of one or more Pages. The Template also defines the relationships among those Pages (e.g., there is a button in a Page that, when tapped, leads to another Page). The Template defines Primary Service Presentation Rules (which consists of one or more Pages) and Highlighters (which typically are displayed in yet other Pages). Page Relationships are derived from the Presentation Templates. The Page Relationships are a matrix where the rows are the starting Pages and the columns are the ending Pages and the values in the matrix describe how any two Pages are connected. The relationship between Pages can be constant (i.e., there is a button in a Page that always appears and leads to the other Page), or conditional (i.e., there is a button in a Page that appears only if certain conditions are verified). Navigation Conditions are conditional relationships that correspond to Navigation Conditions in the Presentation Template. For each Navigation Condition, there is a Parameter that contains a Value that is used to compute the Navigation Condition at runtime.

Retailer Application Server is used by the Business Entity to monitor and manage the Application, including all the Application Clients and are hosted in a multi-tenant environment in the Cloud, but each Business Entity "feels" like it is provided dedicated Retailer and Consumer Application Servers or run on servers owned by the Business Entity. The server contains a Searchable Application Representation and a Business Portal. The Retailer Application Server is connected to the Dashboards.

Searchable Application Representation is associated with each Mobile Application and makes the corresponding Mobile Application Client and the content contained in such Mobile Application Client searchable by search engines. SEO techniques can be used in the System Solution Searchable Application Representation to boost the search results of the corresponding Mobile Application Client and content. Searchable Application Representation for each Business Entity is generated by the System Solution when the Application for that Business Entity is created.

Security provides security and privacy in all communications between Application Clients and Application Servers for each Business Entity. Security also guarantees that there is no communication between Retailer Application Servers or Consumer Application Servers associated with different Business Entities and that Retailer Databases and Consumer Databases associated with different Business Entities are kept separate. The System Solution offers basic protection against Denial of Service (DoS) attacks for each System Solution Application.

Service accomplishes a certain task or function or activity, for example, receiving and redeeming an electronic coupon on the Service Consuming Entity's cellphone. Services can be chained together to form a new Service.

Server Data Model includes several structures: Functional Description, Configuration Parameters, Integration Point Parameters and Presentation Attributes. The Server Data Model is the portion of the Data Model that is relevant for the generation and operation of all parts of the system other than the Application Clients.

Service Internal Interfaces define the hierarchy of Services that are needed (if any) to build a certain Service.

Service Representation is a high-level description of the functionality that the Business Entity wants to be implemented in the application. The Service Representation_defines which Services are included in the Application according to the interest of the Business Entity. The Service Representation uniquely defines the desired functionality and contains sufficient information for the System Solution to automatically generate a Data Model corresponding to the Application. The Service Representation includes a set of Service Specifications, which specify the desired Service Features, Service Configuration, Service Interfaces, and Service Presentation that are implemented in the Application.

System Solution is formed from the computing device and a dedicated server comprising Computer hardware using Software, Server and a Data Base. The Computing hardware may be located next to the computing device or via an Internet coupled to a dedicated bank of Computer hardware. The System solution offers the beneficial use to the Business entity by providing Applications for the Business Entity. The Applications provided by the System Solution comprise a plurality of Application Components, and include Application Clients that run on Mobile, Non-Mobile, and Cloud Client Devices. The System Solution is the owner of all Application Components automatically generated by the System Solution. The System Solution creates and hosts Applications for different Business Entities (each Business Entity is a System Solution customer). The term Retailer is used loosely as a synonym for Business Entity. The System Solution Consumer Application Server supports the services presented to the users by the Mobile Application Clients, Non-Mobile Application Clients, and Cloud Clients, while the System Solution Retailer Application Server is used by the Business Entity to monitor and manage the Application, including all the Application Clients. The System Solution provides a complete environment for the creation, hosting, updating, and management of the Application. All Application Servers generated by the System Solution (specifically, the System Solution Consumer Application Server and System Solution Retailer Application Server) for all Business Entities are hosted in a multi-tenant environment in the Cloud, but each Business Entity "feels" like it is provided dedicated Retailer and Consumer Application Servers. The System Solution architecture also applies with minor changes to a scenario where the System Solution Consumer Application Server and System Solution Retailer Application Server run on dedicated servers owned by the Business Entity, rather than in the Cloud. In this scenario, the System Solution has access to control and offer beneficial use for those servers that are coupled to the Cloud. The Computing device and Computer hardware offers Service Representation software and at least one mode of input to input Business Entity Data to automatically generate Service data and place it into a Data Base. The Data Base has a well-defined structure. Then, the Computing device and Computer hardware use the Data Base to automatically generate the Application from the Services that were selected in the Service Representation by the Business Entity. The automatically generated Application comprises a plurality of Application Components, including Application Servers, Native and Non-Native Mobile Application Clients, Non-Mobile and Cloud Application Clients, Client/Server Protocols, management components, and other components. The computing device and Computer hardware offer the ownership, control and beneficial use of this inventive idea. The System Solution offers any Business Entity the ability of automatically generating their own Applications based on selected service parameters. These Applications provide executables for Mobile, Non-Mobile and Cloud Client Devices. These Application Clients can then be downloaded onto the Client devices for the Customers use. the System Solution with at least one first server automatically generates Application Components from a Data Model, a Communication network that couples the plurality of Client Devices, a plurality of Computer hardware, the at least one first server and the at least one Computing device together to deploy the Application Components, a first part of the Application Components deployed to the plurality of Computer hardware to create a first plurality of Application Servers retaining the first part of the Application Components, a second part of the Application Components deployed to the at least one first server, and a corresponding portion of the second part of the Application Components couples to a corresponding Client Device in the plurality of Client Devices via the Communication network. The System Apparatus further comprising a plurality of Validation Controllers to show a validity and a consistency of each of the Application Components. The System Apparatus further comprising a Service Representation and a Business Entity Data automatically generate the Data model. The System Apparatus wherein the first part of the Application Components comprises a Retailer Application Server and a Retailer Application Server Database, a Consumer Application Server and a Consumer Application Server Database created by an Automatic Application Server Generator coupled to a Server Data Model. The System Apparatus wherein the first part of the Application Components comprises a Client Server Protocol and Security created by an Automatic Protocol Generator coupled to a Common Data Model. The System Apparatus wherein the first part of the Application Components comprises Dashboards created by an Automatic Dashboards Generator coupled to a Common Data Model. The System Apparatus wherein the second part of the Application Components comprises an Analytics, a Native Mobile Application Client, a Non-Native Mobile Application Client, a Non-Mobile Application Client and a Cloud Application Client created by an Automatic Client Generator coupled to a Client Data Model. The System Apparatus wherein the first part of the Application Components comprises a Searchable Application Representation created by an Automatic Searchable Application Representation Generator coupled to a Common Data Model. The System Apparatus wherein the Data Model comprises a Common Data Model, a Server Data Model and a Client Data Model, and outputs of the Data Model are partitioned between a Common Data Model output, a Server Data Model output and a Client Data Model output, wherein the Data Model comprises a Functional description, Configuration Parameters, Integration Point Parameters and Presentation Attributes. The System Apparatus wherein the Client Device is a mobile device, a wearable device, a non-mobile device, or a Cloud device coupled to the Communication network. The System Apparatus further comprising a first Client Device with a first Operating System is downloaded with at least one Native Mobile Application, and a second Client Device with a second Operating System is downloaded with at least one Non-Native Mobile Application, wherein the second part of the Application Components comprises the at least one Native Mobile Application and the at least one Non-Native Mobile Application. The apparatus wherein the Service Representation comprises a high-level feature list includes a Service Black Box Description, Service Flavors, Service Features, a Service Configuration, Service User Interfaces, Dashboards, Service Integration Points, Service Internal Interfaces, Service Presentation and a Service Status. The apparatus wherein the Data Model comprises a Common Data Model, a Server Data Model and a Client Data Model, and outputs of the Data Model are partitioned between a Common Data Model output, a Server Data Model output and a Client Data Model output, wherein the apparatus of the Data Model comprises a Functional Description, Configuration Parameters, Integration Point Parameters and Presentation Attributes.

Two-Layer Native Application Client which is a Native Application Client that consists of two layers: a Dynamic Layer and a Native Layer running on a Client Device. The Native Layer and the Dynamic Layer together implement the functionality and user experience offered by the Two-Layer Native Application Client.

Update Manager in the Native Application Client, while running on the Client Device, requests and downloads an updated Dynamic Layer from an Application Server which is part of the System Solution. The Update Manager is contained in the Native Layer and uses a Dynamic Update Protocol. The update manager is internal in the Native Layer of the Two-Layer Native Application Client. In some cases, only the Page Surfaces that are part of the updated Dynamic Layer is requested and downloaded as desired by the End User. An Update Manager in the Native Layer of the plurality of Client Devices insures that the Updated Dynamic Layer is downloaded to the plurality of Client Devices from the Application Server bypassing an approval process of the Application Store, and wherein the Updated Dynamic Layer updates the existing Dynamic Layer in the Two-Layer Native Application Client while the Two-Layer Native Application Client is running on the plurality of Client Devices. The update manager, an external installation manager software or an update manager software running on the Operating System of the Client Device can delete the existing Native Application Client, download and re-install the updated Native Application Client, and complete the update process. The Update Manager in a Native Layer can also run a Dynamic Update Protocol with the Application Server, checking the Application Server with the Dynamic Update Protocol continuously for Updated Page Surfaces or new Page Surfaces, downloading only the Updated Page Surfaces or the new Page Surfaces automatically to a Dynamic Layer of a Two-Layer Application Client, and checking continuously and downloading the Updates to the Two-Layer Application Client from the Application Server.

Updated Data Model is then used by the System Solution to automatically generate via the dashboard an Updated Application. Such an Updated Application consists of a plurality of Updated Application Components including a set of Updated Native Mobile Clients, Non-Native Mobile Clients, Non-Mobile and Cloud Mobile Clients, and other components. The newly generated Updated Application Components replace the corresponding existing Application Components.

Updated Dynamic Layer bypasses the Application Store to make it available for download to the Client Device. By modifying the Dynamic Layer, the Business Entity modifies the functionality and user experience offered by the Native Application Client to the end user. The Updated Dynamic Layer is available for download directly from an Application Server that is part of the System Solution or is owned by the Business Entity. The new version of the Updated Dynamic Layer of the previous Dynamic Layer is made available for download to the Client Device without having the Business Entity submit it for approval to the Application Store. The updated Dynamic Layer is downloaded and installed in the Client Device while the Two-Layer Native Application Client is running on the Client Device. The update of the existing Dynamic Layer can be achieved using an update manager that is internal in the Native Layer of the Two-Layer Native Application Client. Once the Updated Dynamic Layer is installed on the Client Device, the new application client functionality and new user experience is provided to the end user. The updated Dynamic Layer can be downloaded and installed in the Client Device "automatically" by the Two-Layer Native Application Client using an update manager internal to the Native Layer of the Two-Layer Native Application Client. The Updated Dynamic Layer provides New Functionality of the Native Application client as desired by the Business Entity who modifies the Dynamic Layer. The updated Dynamic Layer does not need to be submitted by the Business entity to the Application Store to make it available for download to the Client Device. By modifying the Dynamic Layer, the Business Entity modifies the functionality and user experience offered by the Native Application Client to the end user. The Updated Dynamic Layer is stored on an Application Server, and the System Apparatus further comprising an Update Manager in the Native Layer of the plurality of Client Devices to insure that the Updated Dynamic Layer is downloaded to the plurality of Client Devices from the Application Server (owned by the System Solution or by the Business Entity) by bypassing an approval process of the Application Store, and wherein the Updated Dynamic Layer updates the existing Dynamic Layer in the Two-Layer Native Application Client while the Two-Layer Native Application Client is running on the plurality of Client Devices.

Validation Controllers show a validity and a consistency of the Updated Data Model, and the plurality of Validation Controllers show the validity and the consistency of the set of Updated Applications Clients.

We claim:

1. A method of using a backend server to enable a first application running on a first client device to cause a download of an updated application on a second client device, the method comprising:
   receiving, by the first client device, a dictionary of update commands from the backend server;
   selecting, by a user, an update command from the dictionary of update commands at the first client device;
   using the first client device to send the selected update command to the backend server; and
   receiving, by the second client device the updated application from the backend server based on the selected update command.

2. The method of claim 1, further comprising the steps of:
   running a second application on the second client device; and
   replacing the second application running on the second client device with the updated application.

3. The method of claim 1, further comprising instructing the backend server to generate the updated application from the selected update command.

4. The method of claim 1, further comprising the steps of:
   sending the selected update command via a Short Message Service (SMS) communication mechanism.

5. The method of claim 1, further comprising the steps of:
   translating the selected update command to a corresponding update to be added to the updated application.

6. The method of claim 1, wherein the first application is a General Third Party Application.

7. The method of claim 1, wherein the first client device is a Manager Client Device and the second client device is a Customer Client Device.

8. A method of using a backend server to and a dictionary to generate an updated application, the method comprising:
   downloading a dictionary of update commands from the backend server to a first client device;
   receiving, by the backend server, an update command selected by a user from the dictionary of update commands from the first client device;
   using a decoder and the selected update command on the backend server to generate an updated data model replacing an existing data model; and
   using the updated data model to generate the updated application.

9. The method of claim 8, further comprising the steps of:
   running a second client device with an application;
   downloading the updated application from the backend server to the second client device; and
   replacing the application running on the second client device with the updated application.

10. The method of claim 9, wherein the updated application is generated using the backend server.

11. The method of claim 8, further comprising the steps of:
    sending the selected update command via a Short Message Service (SMS) communication mechanism.

12. The method of claim 8, further comprising the steps of
    decoding a value using the decoder selected from the group consisting of SMS, email, Application, chat, messenger and Voice-to-Text dependent decoders.

13. The method of claim 8, further comprising the steps of:
    translating the selected update command into the updated data model by using the dictionary selected from the group consisting of SMS, email, Application, chat, messenger and Voice-to-Text command dictionaries.

14. The method of claim 8, further comprising the steps of:
    using the backend server to generate a Dynamically Updated (DU) Data Model to execute a desired Update Command to generate the updated application selected from the group consisting of DU Native Mobile Application Clients (AP), DU Native Non-Mobile AP, DU Non-Native Mobile AP, DU Non-Mobile AP, DU Cloud AP, and DU Application Components.

15. An apparatus of a backend server comprising:
    a first client device configured to run a first application;
    the backend server configured to download a dictionary comprising a plurality of update commands to the first client device,
    the first client device further configured to present the plurality of update commands to a user, wherein the user selects an update command from the plurality of update commands;
    the first client device further configured to upload a selected update command to the backend server; and
    the backend server configured to generate an updated application based on the selected update command.

16. The apparatus of claim 15, further comprising:
    a second application configured to run on a second client device, wherein
    the second application running on the second client device is replaced with s the updated application.

17. The apparatus of claim 15, wherein a second client device is configured to receive the updated application from the backend server.

18. The apparatus of claim 15, further comprising:
    a communication mechanism configured to send the selected update command, wherein the communication mechanism is selected from the group consisting of Short Message Service (SMS), email, Application Dependent Messaging, chat, messenger and Voice-to-Text.

19. The apparatus of claim 18, further comprising:
    a corresponding update translated from the selected update command by the backend server and added to the updated application.

20. The apparatus of claim 18, wherein the first application is a General Third Party Application.

* * * * *